(12) United States Patent
Malmloff et al.

(10) Patent No.: US 11,980,291 B2
(45) Date of Patent: May 14, 2024

(54) ACCESSORIES FOR A STANDING DESK

(71) Applicant: Deflecto, LLC, Indianapolis, IN (US)

(72) Inventors: Craig R. Malmloff, Fishers, IN (US); Christopher S. Stuart, Noblesville, IN (US); Gretchen Russell, Zionsville, IN (US)

(73) Assignee: DEFLECTO, LLC, Indianapolis, IN (US)

( * ) Notice: Subject to any disclaimer, the term of this patent is extended or adjusted under 35 U.S.C. 154(b) by 0 days.

(21) Appl. No.: 17/829,460

(22) Filed: Jun. 1, 2022

(65) Prior Publication Data
US 2023/0389703 A1 Dec. 7, 2023

(51) Int. Cl.
*F16B 2/06* (2006.01)
*A47B 97/00* (2006.01)
*F16M 13/02* (2006.01)

(52) U.S. Cl.
CPC ........... *A47B 97/00* (2013.01); *F16M 13/022* (2013.01); *A47B 2200/0085* (2013.01)

(58) Field of Classification Search
CPC ............ A47B 97/00; A47B 2200/0085; F16M 13/022
See application file for complete search history.

(56) References Cited

U.S. PATENT DOCUMENTS

| 2,726,837 | A | * | 12/1955 | Jameson | A63F 3/06 248/231.71 |
| 7,100,999 | B2 | | 9/2006 | Stravitz | |
| 9,743,758 | B2 | | 8/2017 | Johnson et al. | |
| 10,492,601 | B2 | | 12/2019 | Mirth et al. | |
| 11,109,704 | B2 | * | 9/2021 | Mandich | A47D 5/00 |
| 11,134,777 | B2 | | 10/2021 | Knapp et al. | |
| 2009/0008521 | A1 | * | 1/2009 | Lee | F16M 13/00 248/226.11 |
| 2009/0014622 | A1 | * | 1/2009 | Merritt | A47G 23/0225 248/689 |
| 2014/0203033 | A1 | * | 7/2014 | Schmidt | B65F 1/141 220/737 |
| 2021/0061554 | A1 | * | 3/2021 | Moore | F16M 13/02 |
| 2021/0364122 | A1 | | 11/2021 | Dowd et al. | |

FOREIGN PATENT DOCUMENTS

| CN | 203647012 | 6/2014 |
| JP | 2008191437 | 8/2008 |

* cited by examiner

*Primary Examiner* — Amy J. Sterling
(74) *Attorney, Agent, or Firm* — Barnes & Thornburg LLP

(57) ABSTRACT

A desk accessory is adapted for use with a desk. The desk accessory includes a frame and a clamp. The frame is adapted to support at least one object relative to a tabletop of the desk located above an underlying floor.

20 Claims, 46 Drawing Sheets

ACCESSORIES FOR A STANDING DESK

FIELD OF THE DISCLOSURE

The present disclosure relates generally to desks, and more specifically to desk accessories.

BACKGROUND

Office spaces, including desks, can often become cluttered with office supplies or other work materials. Therefore, people may use office organizers to help with office organization. These office organizers may have compartments for storing office supplies and/or other personal objects.

However, there office organizers may also take up space on the desk space, leaving no room for doing actual work. Moreover, these office organizers are often not secured to the desk, which may be important if the desk is a convertible sit to stand desk or has a sit to stand riser on the desk.

SUMMARY

The present disclosure may comprise one or more of the following features and combinations thereof.

A desk accessory may comprise a frame adapted to support at least one object relative to a tabletop of a desk located above an underlying floor and a clamp. The frame may be shaped to define at least one compartment space adapted to receive the at least one object. The clamp may include a stationary upper clamp arm that extends from the frame and a lower clamp arm slidably coupled to the frame below the stationary upper clamp arm.

In some embodiments, the upper clamp arm may be configured to be arranged over a topside surface of the tabletop so that the frame is located adjacent to an edge of the tabletop. The lower clamp arm may be configured to slide relative to the frame along an axis between a closed position and an open position. In the closed position, the lower clamp arm may confront the upper clamp arm. In the open position, the lower clamp arm may be in spaced apart relation to the upper clamp arm to define a gap therebetween.

In some embodiments, the desk accessory may further include clamp controller means for biasing the lower clamp arm toward the closed position. The clamp controller means may bias the lower clamp arm toward the closed position to cause the clamp to apply a clamp force on the tabletop when the edge of the tabletop is located in the gap between the upper and lower clamp arms so that the desk accessory is fixed relative to the tabletop.

In some embodiments, the clamp controller means may include at least one spring force element. The spring force element may be arranged to extend between and interconnect the frame and the lower clamp arm. The spring force element may be configured to provide a closing force to the lower clamp arm to urge the lower clamp arm toward the closed position to cause the clamp to apply the clamp force on the tabletop.

In some embodiments, the upper clamp arm may be integrally formed with the frame. The upper clamp arm may be integrally formed with the frame to form a single-piece component.

In some embodiments, the lower clamp arm may include a guide plate, a lower clamp head, and a clamp handle. The guide plate may extend axially relative to the axis along a backside surface of the frame. The lower clamp head may extend from a first end of the guide plate away from the frame parallel to the upper clamp arm. The clamp handle may extend from a second end of the guide plate away from the frame. The second end of the guide plate may be spaced apart axially from the first end of the guide plate.

In some embodiments, the clamp handle may be configured to be engaged by a user to apply an opening force to the lower clamp arm. The opening force applied to the lower clamp arm may be greater than the closing force applied by the spring to cause the lower clamp arm to move from the closed position to the open position.

In some embodiments, the clamp controller means may further include at least one guide rail that extends from the backside surface of the frame and at least one guide channel formed in the guide plate of the lower clamp arm. The guide rail may be located in the guide channel to couple the lower clamp arm to the frame and to guide movement of the lower clamp arm as the lower clamp arm slides between the closed position and the open position.

In some embodiments, the clamp may further include a lower grip coupled to a topside surface of the lower clamp arm that faces the upper clamp arm. The lower grip may be configured to engage an underside surface of the tabletop to minimize sliding of the desk accessory relative to the desk when the edge of the tabletop is located in the gap and the lower clamp arm is in the closed position.

In some embodiments, the clamp may further include an upper grip coupled to an underside surface of the upper clamp arm that faces the lower clamp arm. The upper grip may be configured to engage the topside surface of the tabletop to minimize sliding of the desk accessory relative to the desk when the edge of the tabletop is located in the gap.

In some embodiments, the clamp controller means includes two spring force elements. Each of the spring force elements may be arranged to extend between and interconnect the frame and the lower clamp arm. The spring force elements may be configured to provide the closing force to the lower clamp arm to urge the lower clamp arm toward the closed position to cause the clamp to apply the clamp force on the tabletop.

In some embodiments, the upper clamp arm may be integrally formed with the frame to form a single-piece component. The upper clamp arm may be shaped to define at least one compartment space adapted to receive at least one object.

In some embodiments, the clamp controller means may include at least one guide rail that extends from a backside surface of the frame that faces the lower clamp arm and at least one guide channel formed in the lower clamp arm. The guide rail may be located in the at least one guide channel to couple the lower clamp arm to the frame and to guide movement of the lower clamp arm as the lower clamp arm slides between the closed position and the open position.

In some embodiments, the clamp may include a lower grip. The lower grip may be coupled to a topside surface of the lower clamp arm that faces the upper clamp arm. The lower grip may be configured to engage an underside surface of the tabletop to minimize sliding of the desk accessory relative to the desk when the edge of the tabletop is located in the gap and the lower clamp arm is in the closed position.

In some embodiments, the clamp may further include an upper grip. The upper grip may be coupled to an underside surface of the upper clamp arm that faces the lower clamp arm. The upper grip may be configured to engage the topside surface of the tabletop to minimize sliding of the desk accessory relative to the desk when the edge of the tabletop is located in the gap.

According to another aspect of the present disclosure, a desk accessory may include a frame, a clamp including an upper clamp arm that extends from the frame and a lower clamp arm slidably coupled to the frame below the stationary upper clamp arm, and clamp controller means for biasing the lower clamp arm toward a closed position. The frame may be adapted to support at least one object relative to a tabletop of a desk located above an underlying floor. The lower clamp arm or the clamp may be configured to slide relative to the frame along an axis between the closed position in which the lower clamp arm confronts the upper clamp arm and an open position in which the lower clamp arm is in spaced apart relation to the upper clamp arm to define a gap therebetween. The clamp controller means may bias the lower clamp arm toward the closed position to cause the clamp to apply a clamp force on the tabletop when the edge of the tabletop is located in the gap between the upper and lower clamp.

In some embodiments, the clamp controller means may include at least one spring force element. The spring force element may be arranged to extend between and interconnect the frame and the lower clamp arm. The spring force element may be configured to provide a closing force to the lower clamp arm to urge the lower clamp arm toward the closed position to cause the clamp to apply the clamp force on the tabletop.

In some embodiments, the lower clamp arm may include a guide plate, a lower clamp head, and a clamp handle. The guide plate may extend axially relative to the axis along a backside surface of the frame. The lower clamp head may extend from a first end of the guide plate away from the frame parallel to the upper clamp arm. The clamp handle may extend from a second end of the guide plate away from the frame.

In some embodiments, the second end of the guide plate may be spaced apart axially from the first end of the guide plate. The clamp handle may be configured to be engaged by a user to apply an opening force to the lower clamp arm that is greater than the closing force applied by the spring to cause the lower clamp arm to move from the closed position to the open position.

In some embodiments, the clamp controller means may further include at least one guide rail and at least one guide channel. The guide rail may extend from a backside surface of the frame that faces the lower clamp arm. The guide channel may be formed in the lower clamp arm. The guide rail may be located in the at least one guide channel to couple the lower clamp arm to the frame and to guide movement of the lower clamp arm as the lower clamp arm slides between the closed position and the open position.

In some embodiments, the clamp may include a lower grip coupled to a topside surface of the lower clamp arm that faces the upper clamp arm. The lower grip may be configured to engage an underside surface of the tabletop to minimize sliding of the desk accessory relative to the desk when the edge of the tabletop is located in the gap and the lower clamp arm is in the closed position.

In some embodiments, the clamp may include an upper grip coupled to an underside surface of the upper clamp arm that faces the lower clamp arm. The upper grip may be configured to engage the topside surface of the tabletop to minimize sliding of the desk accessory relative to the desk when the edge of the tabletop is located in the gap.

In some embodiments, the upper clamp arm may be integrally formed with the frame. The upper clamp arm may be integrally formed with the frame to form a single-piece component.

These and other features of the present disclosure will become more apparent from the following description of the illustrative embodiments.

DETAILED DESCRIPTION OF THE DRAWINGS

Figure 1:
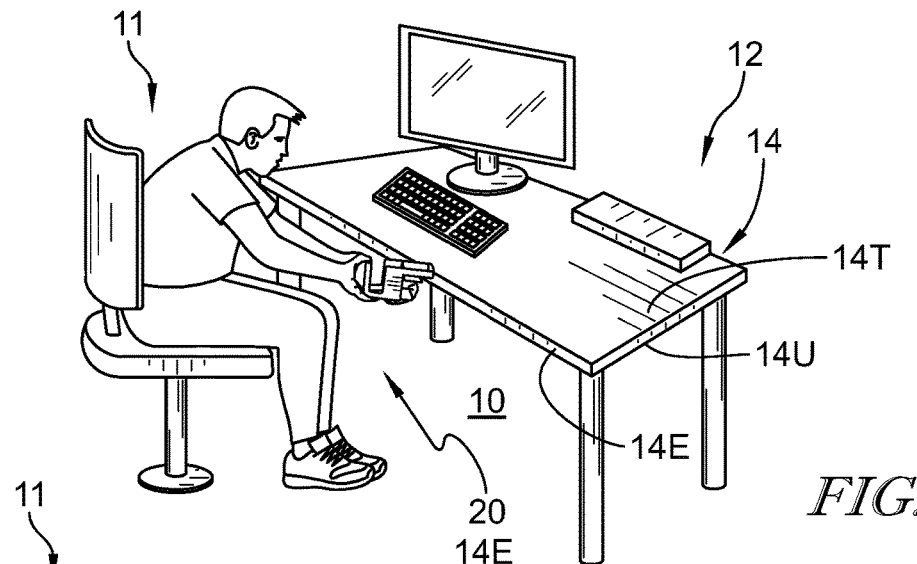
FIG. 1 is a perspective view of a user working at desk about to couple a desk accessory to an edge of a tabletop of the desk to provide additional office organization without taking up additional space on the tabletop of the desk.

For the purposes of promoting an understanding of the principles of the disclosure, reference will now be made to a number of illustrative embodiments illustrated in the drawings and specific language will be used to describe the same.

Figure 10:
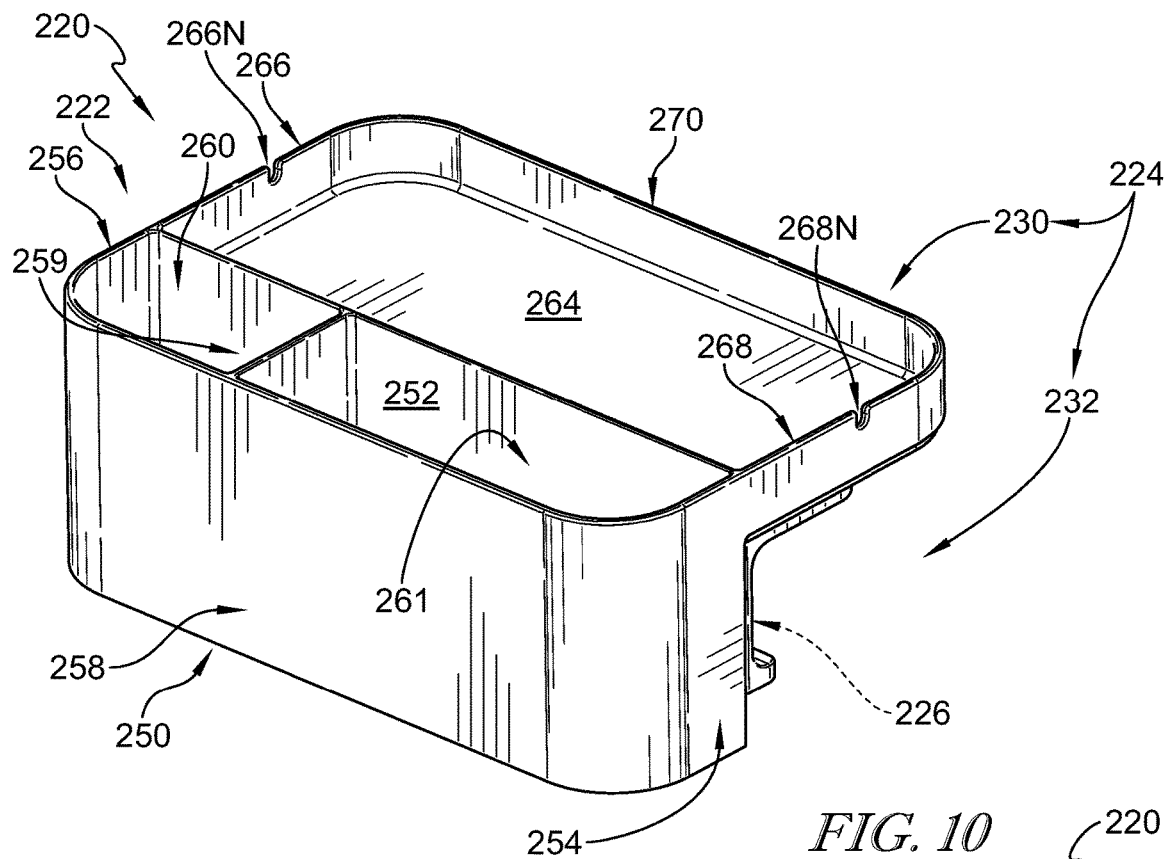
FIG. 10 is a front perspective view of another embodiment of a desk accessory showing the desk accessory comprises a frame shaped to define multiple compartment spaces of different sizes that are adapted to receive different office supplies.
Figure 11:
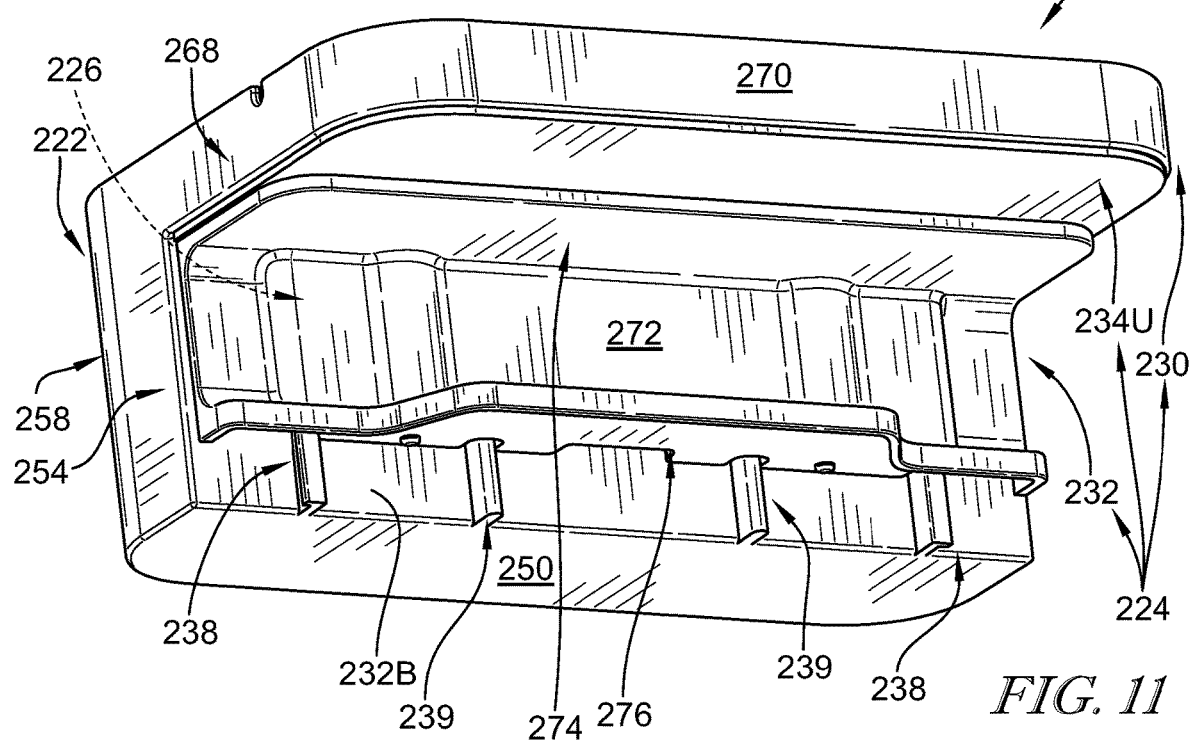
FIG. 11 is a rear perspective view of the desk accessory of FIG. 10 showing the desk accessory further comprises a clamp including an upper clamp arm that extends from the frame and a lower clamp arm including a clamp head that extends along and is parallel to the upper clamp arm, a clamp handle that is spaced apart axially from the clamp head, and a guide plate that extends between and interconnects the clamp head and the clamp handle along a backside surface of the frame.
Figure 12:
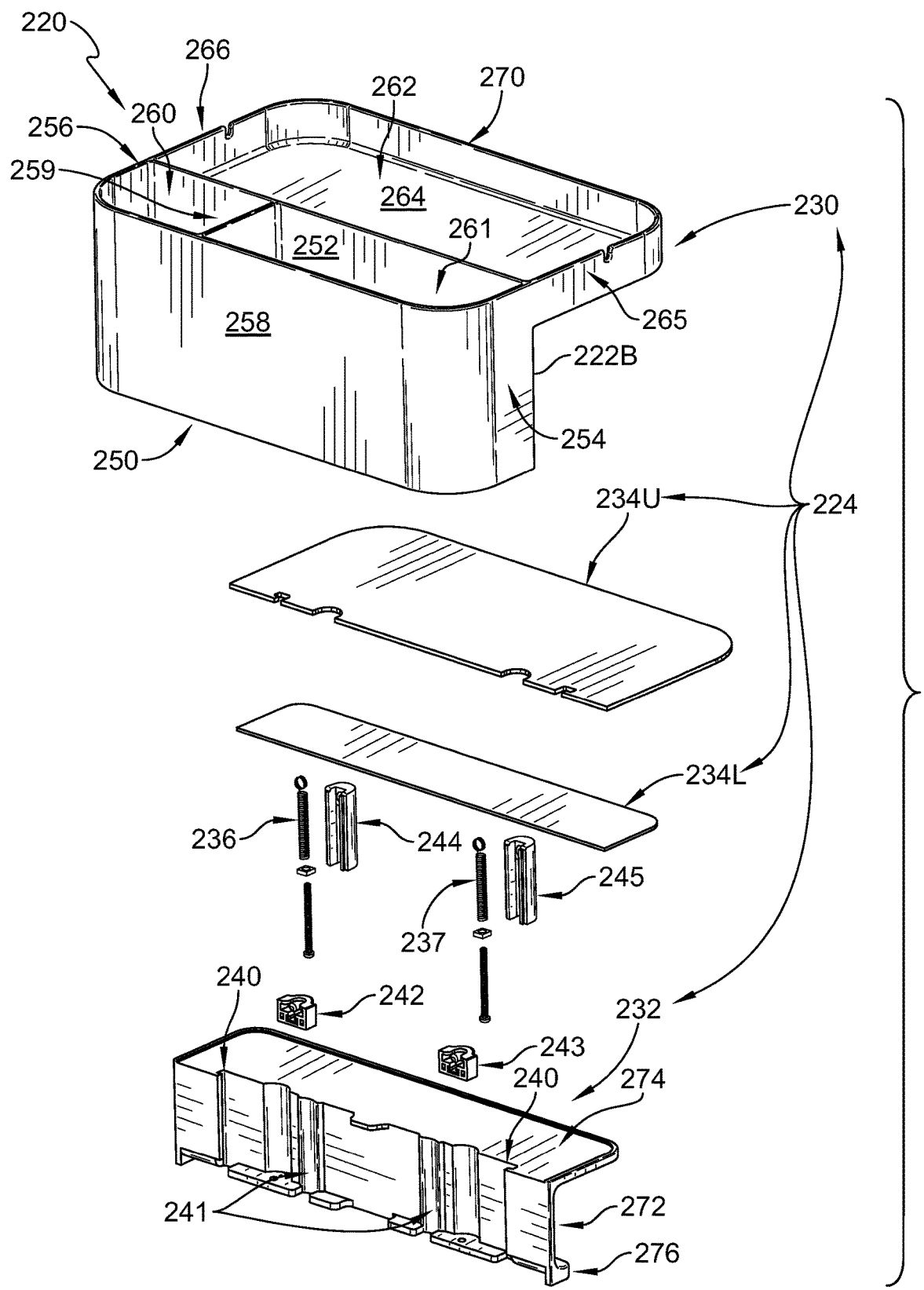
FIG. 12 is an exploded view of the desk accessory of FIG. 10 showing the desk accessory includes the frame, the clamp including the upper and lower clamp arms, and a clamp controller for biasing the lower clamp arm toward the closed position to cause the clamp to apply the clamp force on the tabletop when the edge of the tabletop is located in the gap between the upper and lower clamp arms, and further showing the clamp controller includes two biasing springs.
Figure 13:
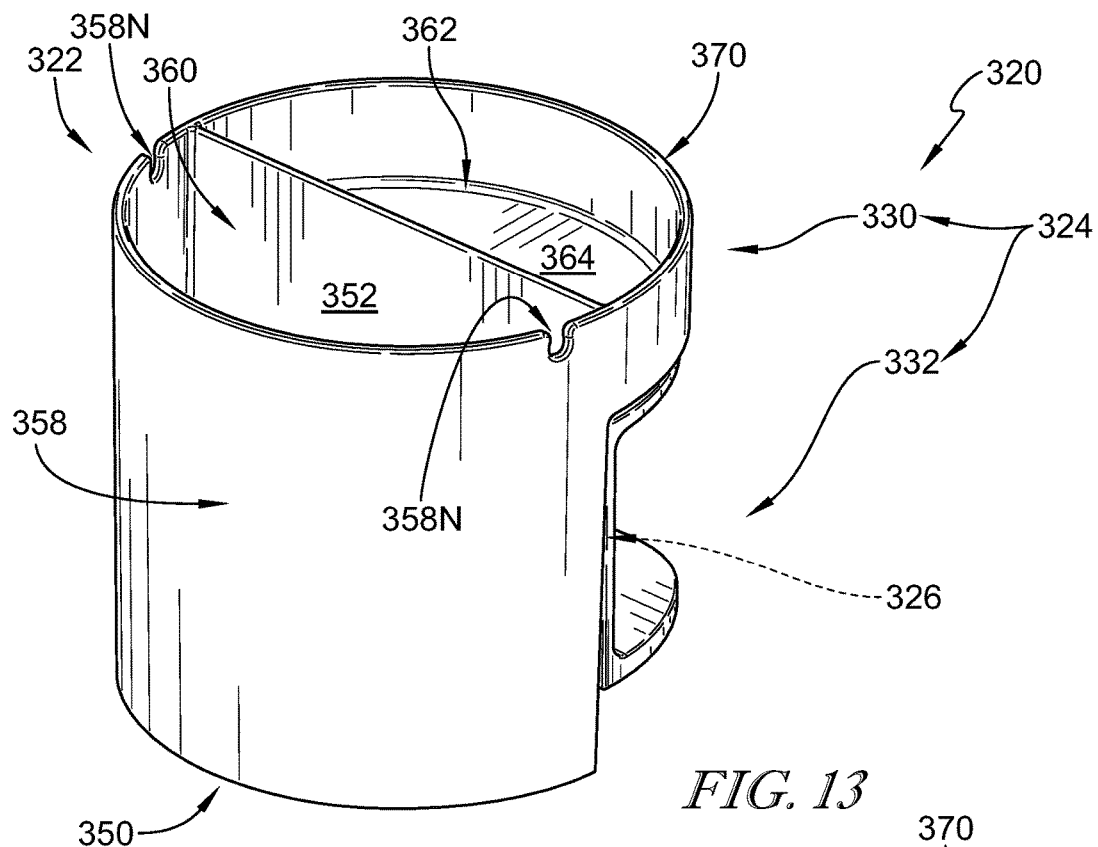
FIG. 13 is a front perspective view of another embodiment of a desk accessory showing the desk accessory comprises a circular frame shaped to define a compartment space adapted to receive smaller office supplies.
Figure 14:
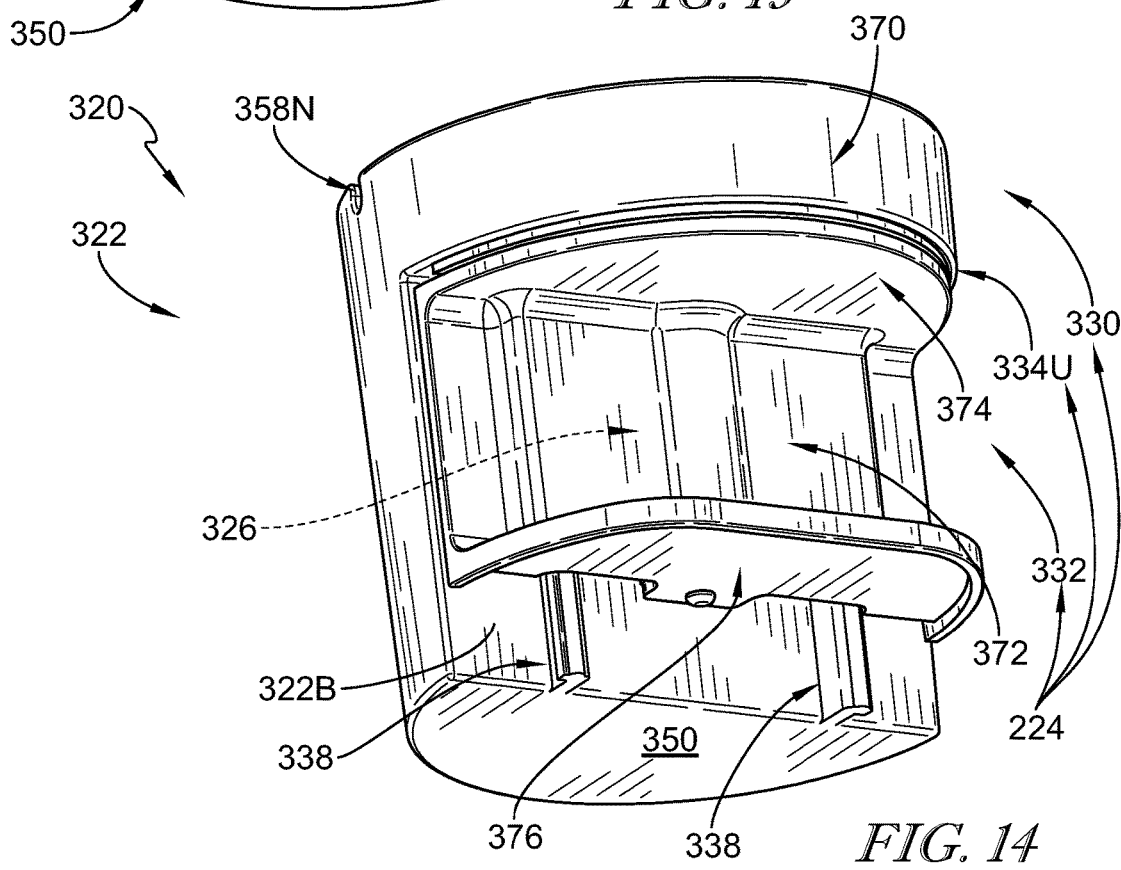
FIG. 14 is a rear perspective view of the desk accessory of FIG. 13 showing the desk accessory further comprises a clamp including an upper clamp arm that extends from the frame and a lower clamp arm including a clamp head that has the same contour shape as the upper clamp arm, a clamp handle that is spaced apart axially from the clamp head, and a guide plate that extends between and interconnects the clamp head and the clamp handle along a backside surface of the frame.
Figure 15:
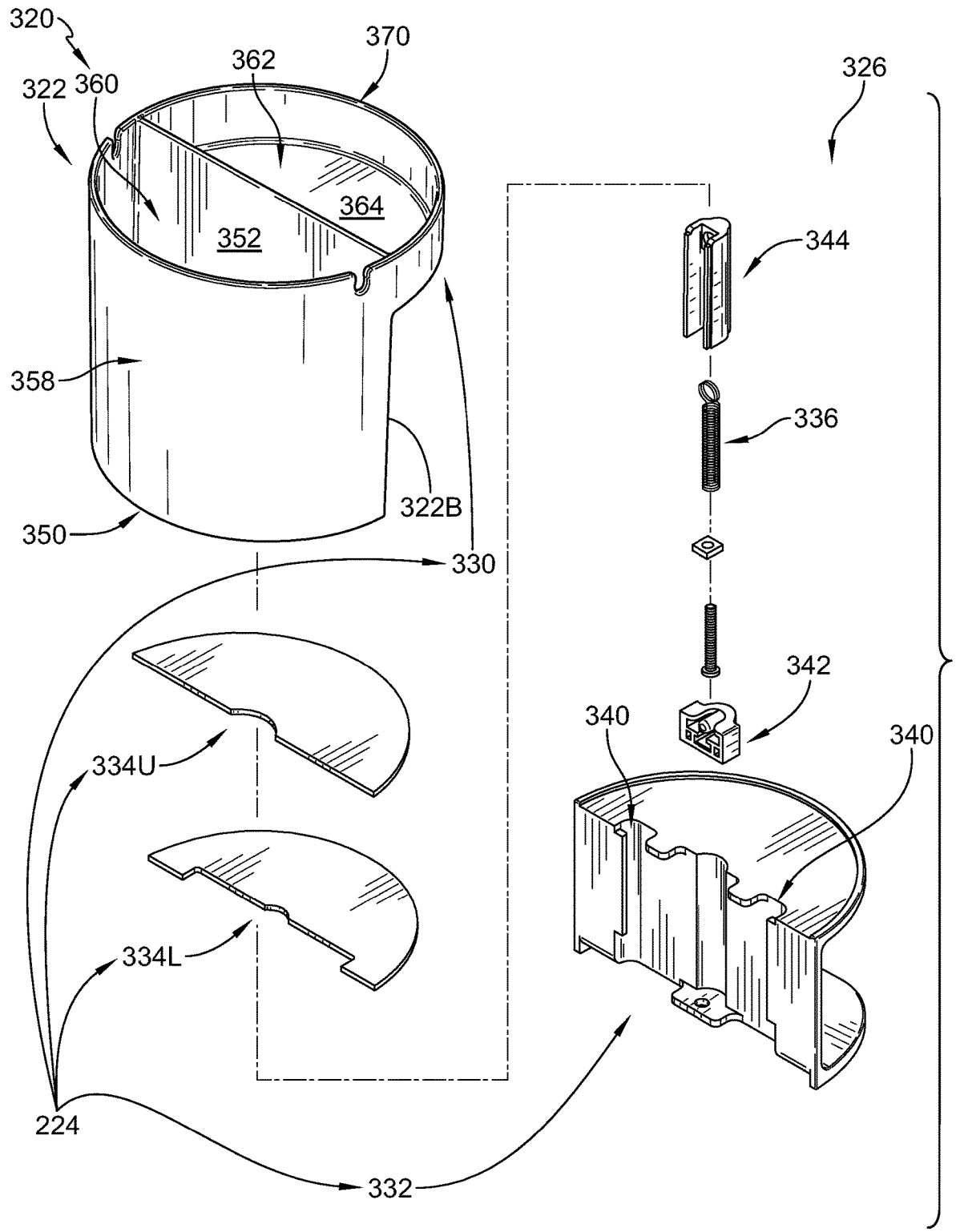
FIG. 15 is an exploded view of the desk accessory of FIG. 13 showing the desk accessory includes the circular frame, the clamp including the upper and lower clamp arms, and a clamp controller for biasing the lower clamp arm toward the closed position to cause the clamp to apply the clamp force on the tabletop when the edge of the tabletop is located in the gap between the upper and lower clamp arms.
Figure 16:
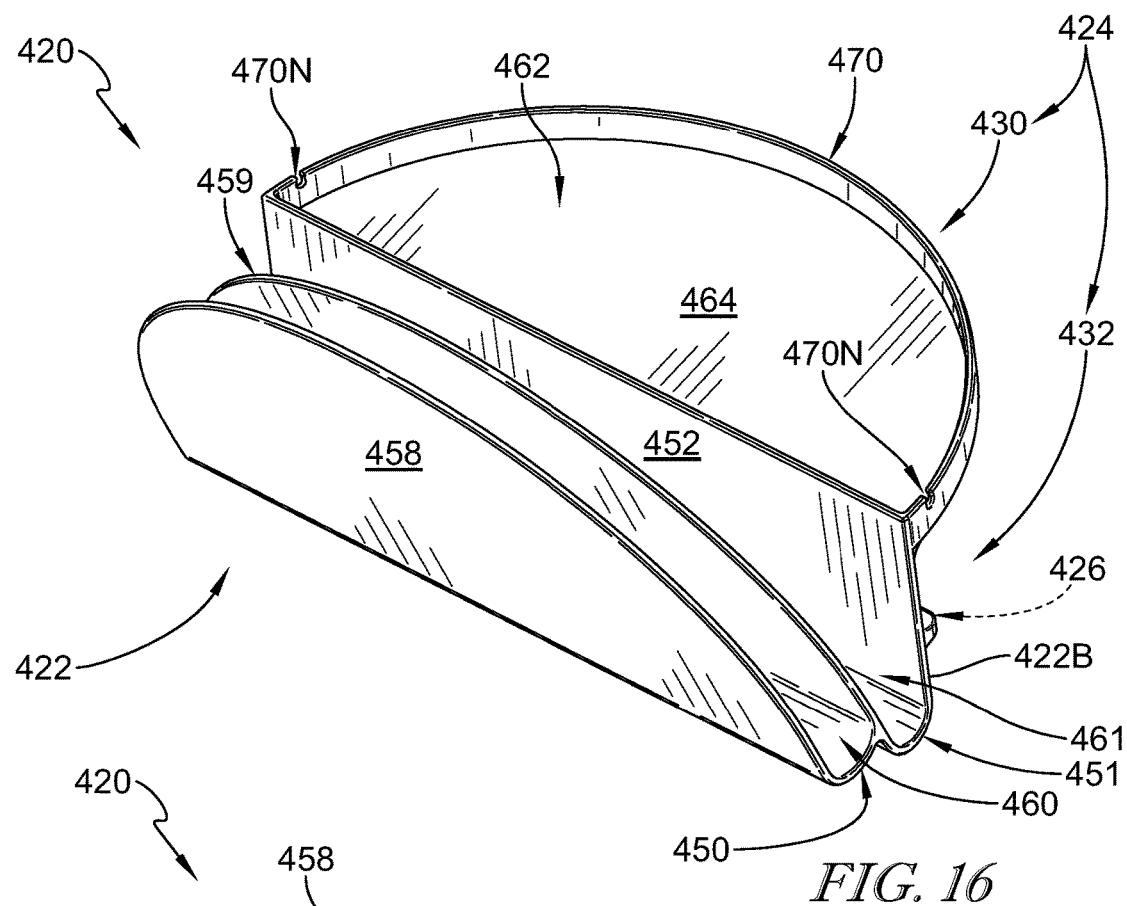
FIG. 16 is a front perspective view of another embodiment of a desk accessory showing the desk accessory comprises a frame shaped to define a plurality of compartment spaces adapted to receive office files.
Figure 17:
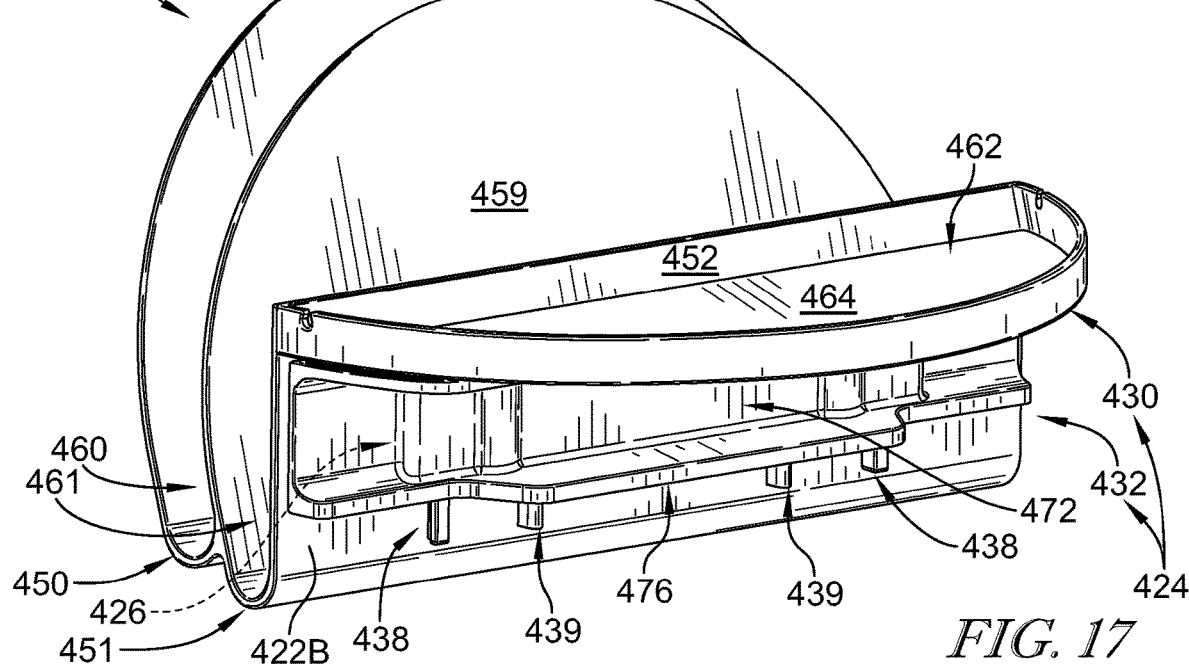
FIG. 17 is a rear perspective view of the desk accessory of FIG. 16 showing the desk accessory further comprises a clamp including an upper clamp arm that extends from the frame and a lower clamp arm coupled to the frame below the upper clamp arm.
Figure 18:
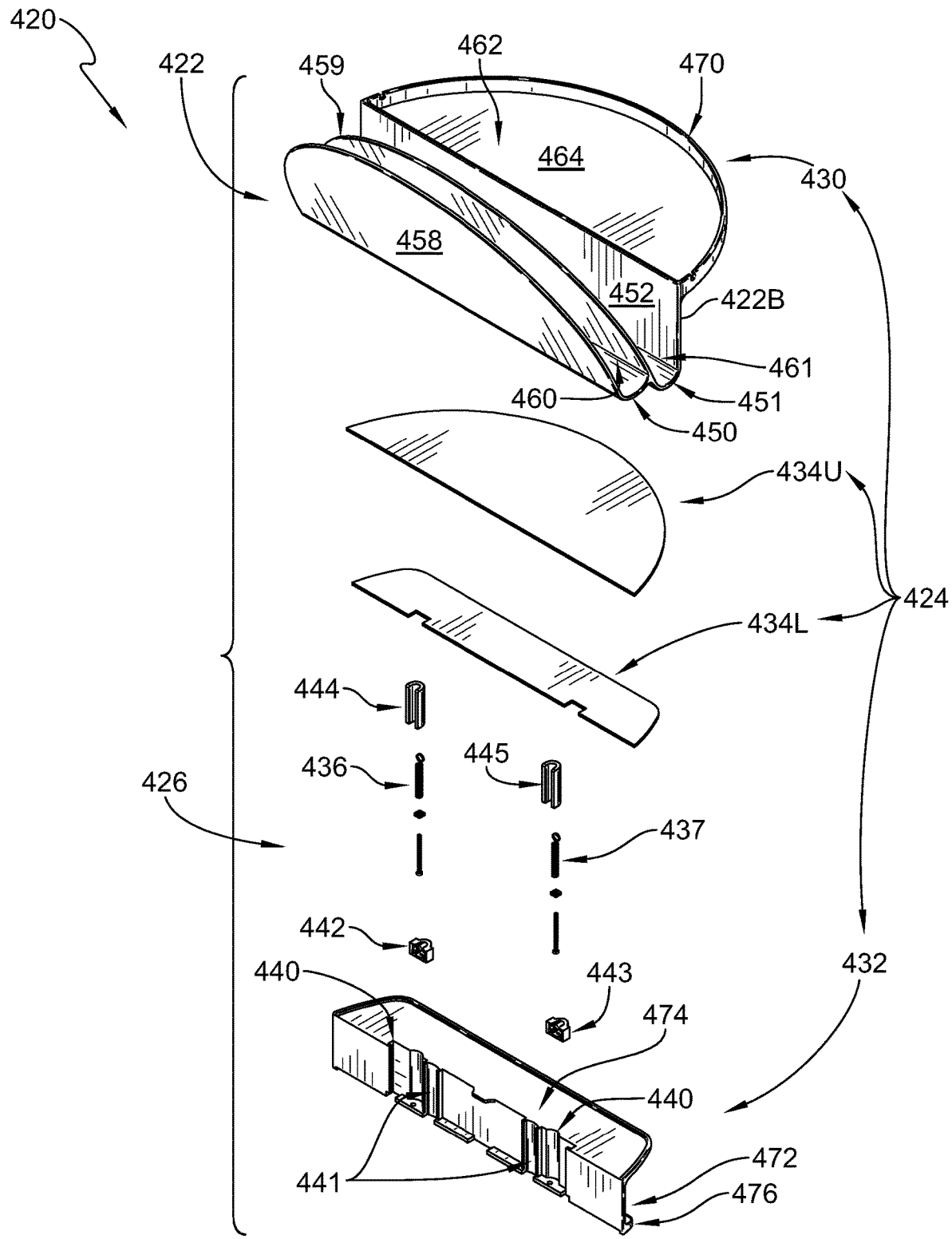
FIG. 18 is an exploded view of the desk accessory of FIG. 15 showing the desk accessory includes the frame, the clamp including the upper and lower clamp arms, and a clamp controller for biasing the lower clamp arm toward the closed position to cause the clamp to apply the clamp force on the tabletop when the edge of the tabletop is located in the gap between the upper and lower clamp arms, and further showing the clamp controller includes two biasing springs.
Figure 19:
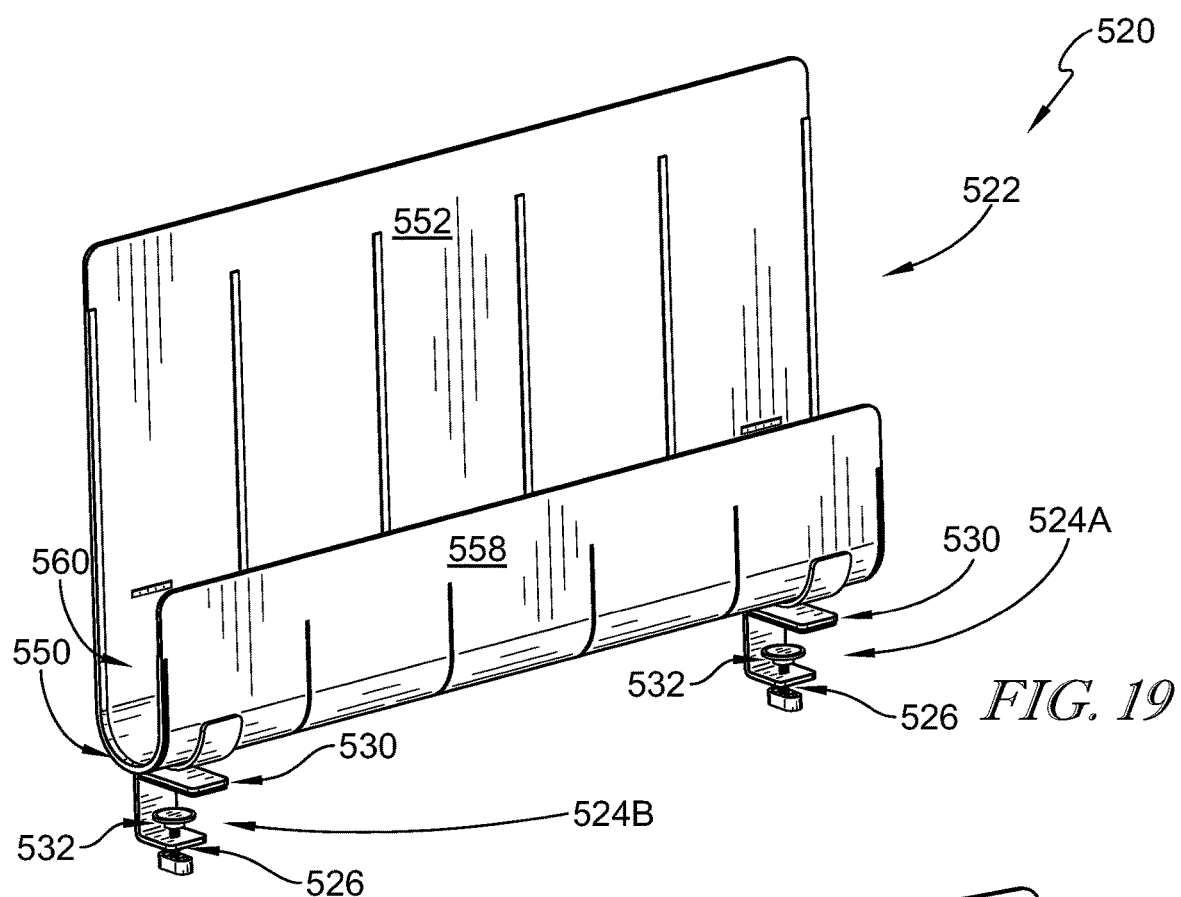
FIG. 19 is a front perspective view of another embodiment of a desk accessory showing the desk accessory comprises a frame, a clamps, and a clamp controller, the clamp controller includes a set screw configured to be manually adjusted to apply a clamp force to a tabletop of the desk to fix the frame to the desk.
Figure 20:
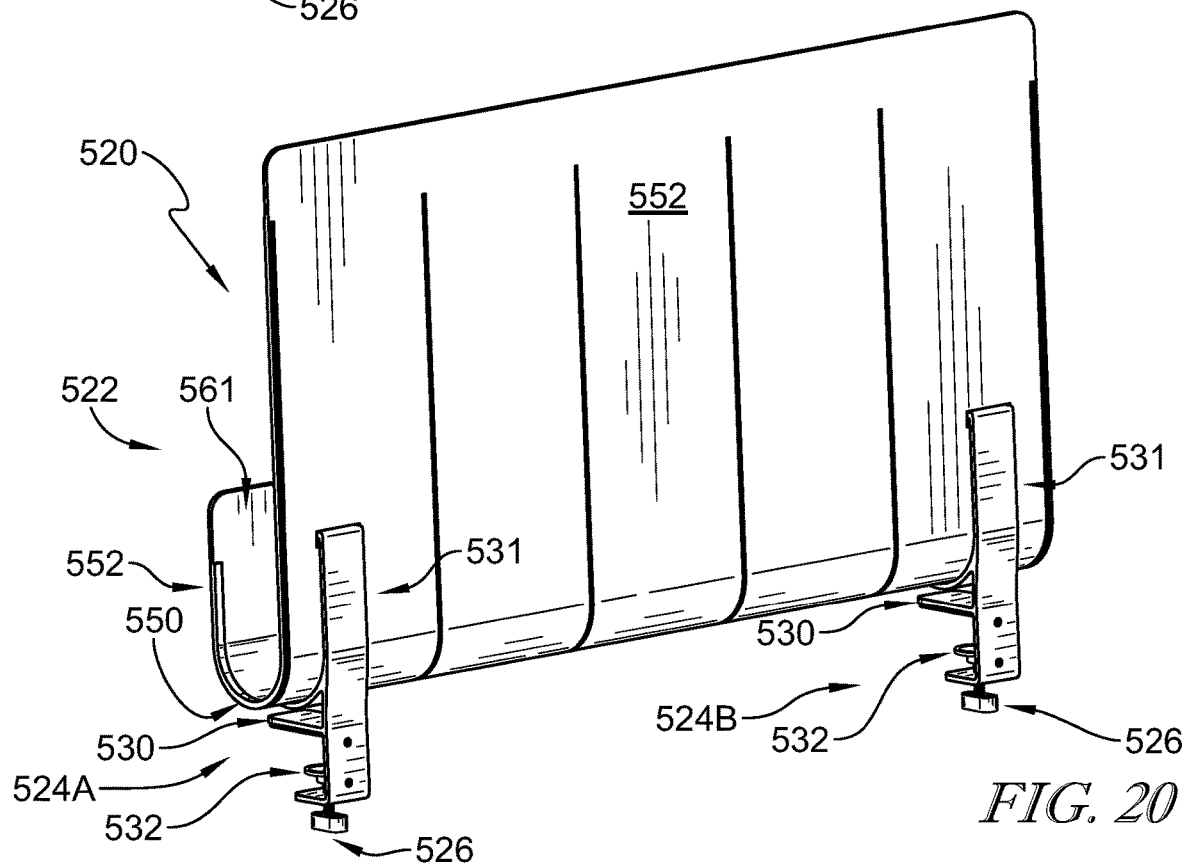
FIG. 20 is a rear perspective view of the desk accessory of FIG. 19 showing the clamp includes a fixed upper arm coupled to the frame and configured to engage a topside surface of the tabletop and a lower clamp arm configured to move relative to the fixed upper clamp arm.
Figure 21:
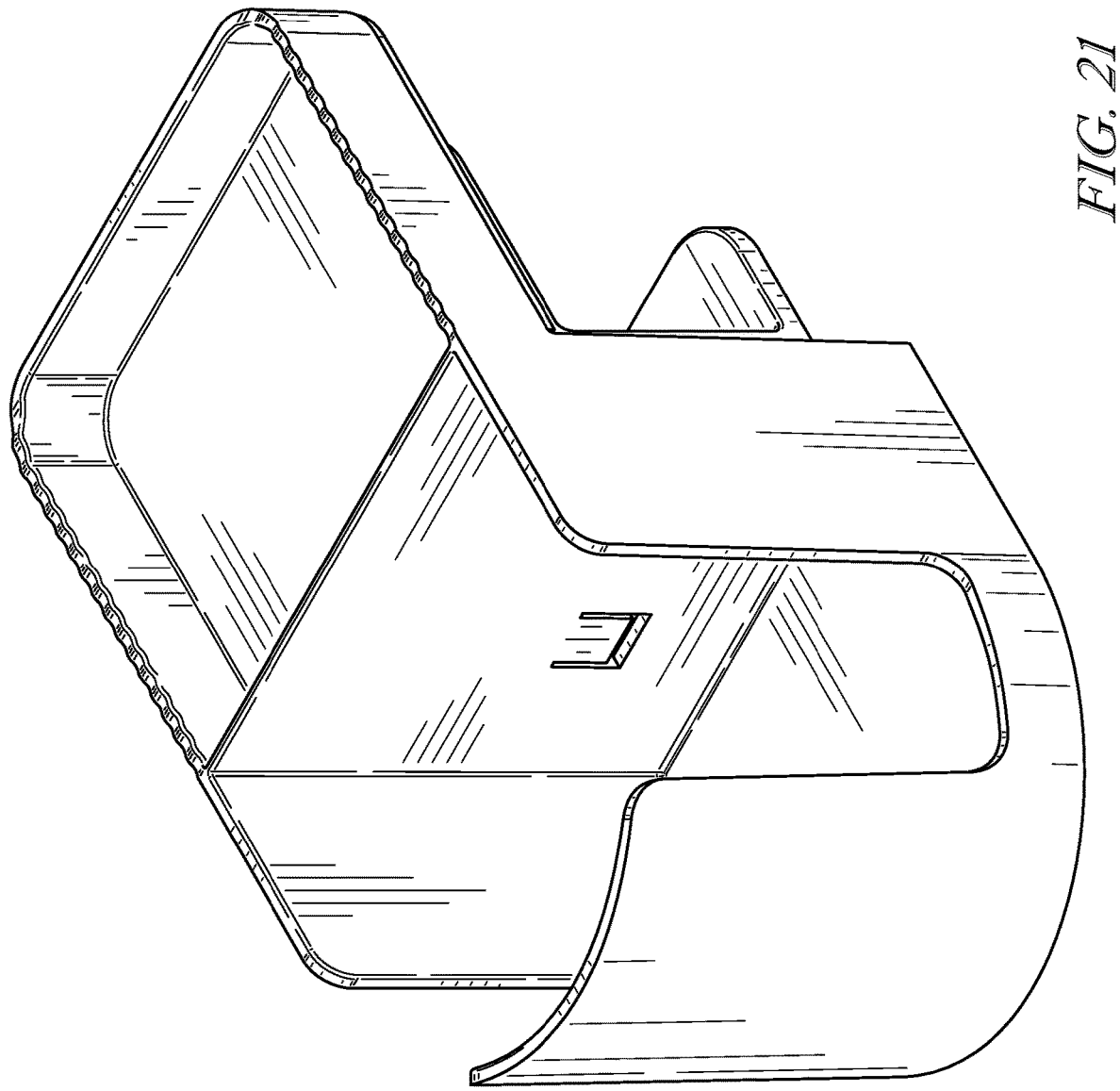
FIG. 21 is a perspective view of a desk accessory.
Figure 22:
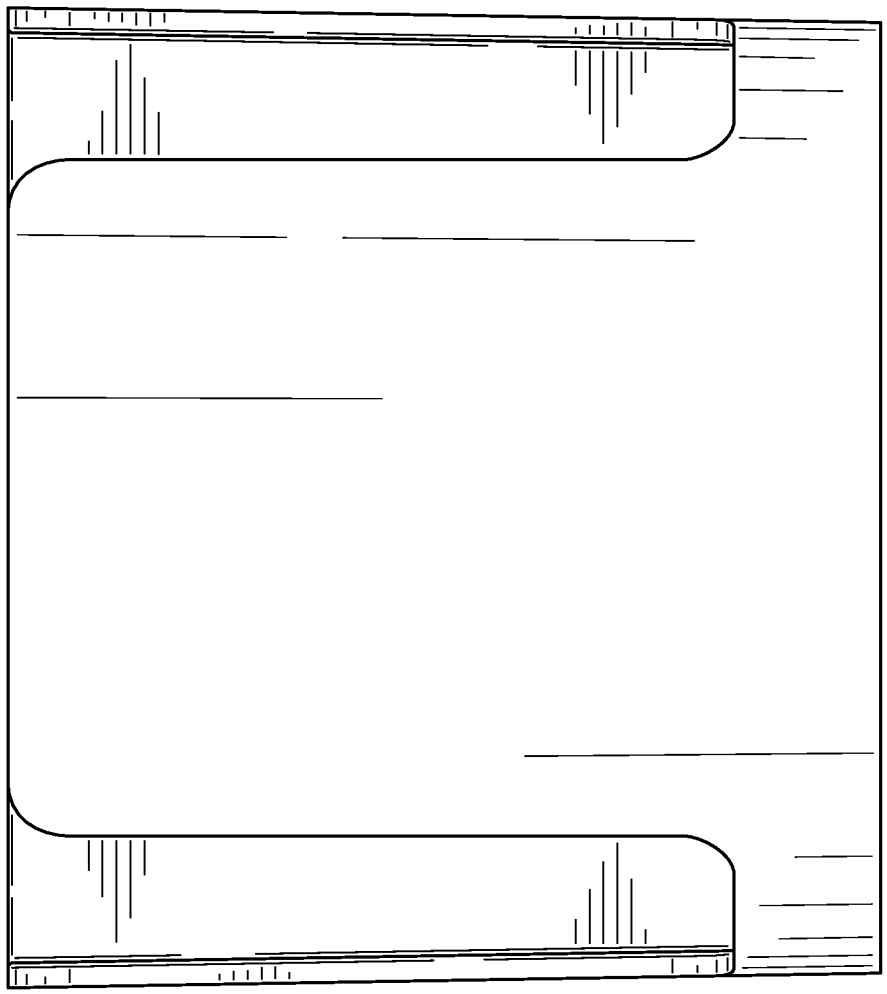
FIG. 22 is a front view thereof.
Figure 23:
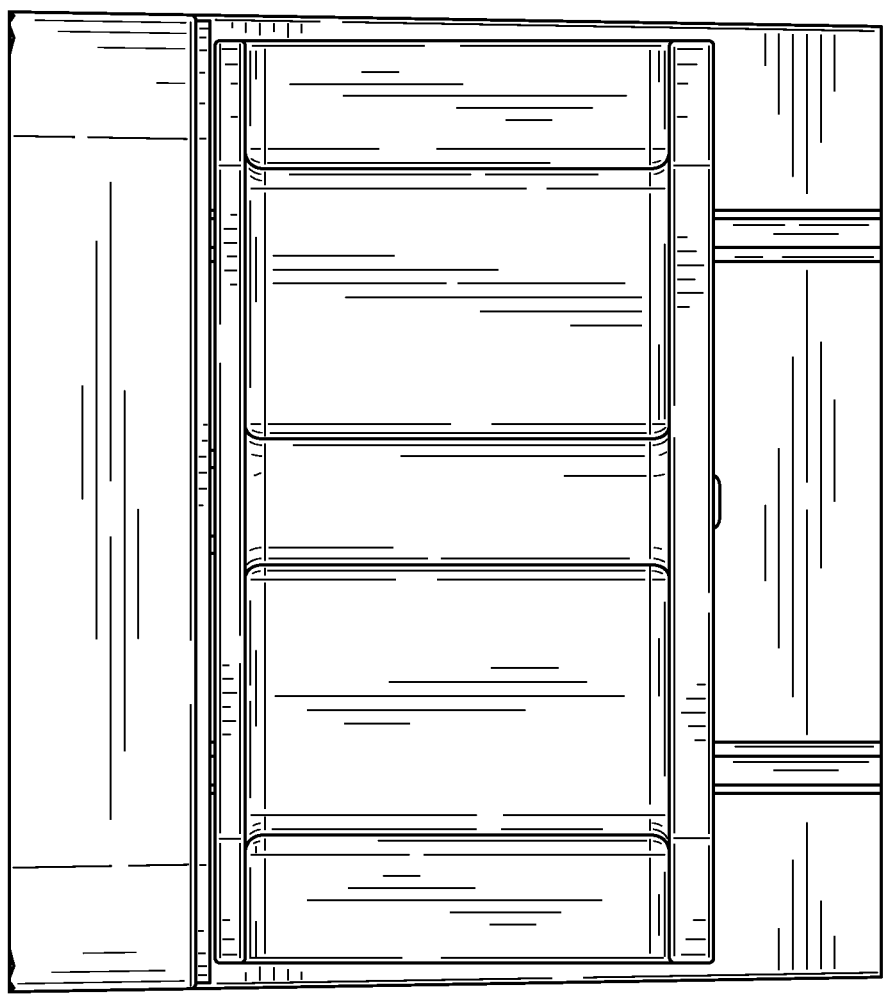
FIG. 23 is a rear view thereof.
Figure 24:
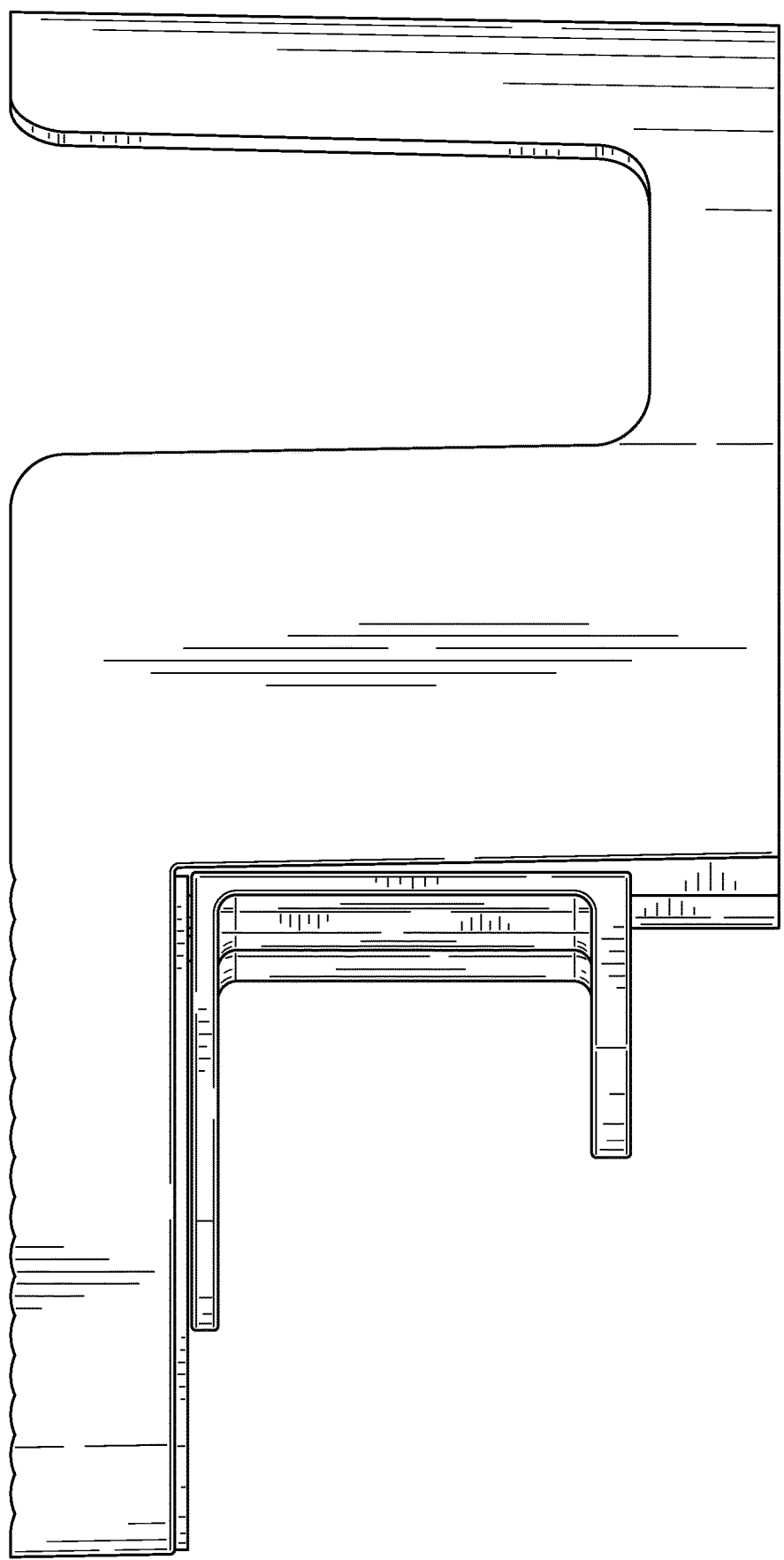
FIG. 24 is a left side view thereof.
Figure 25:
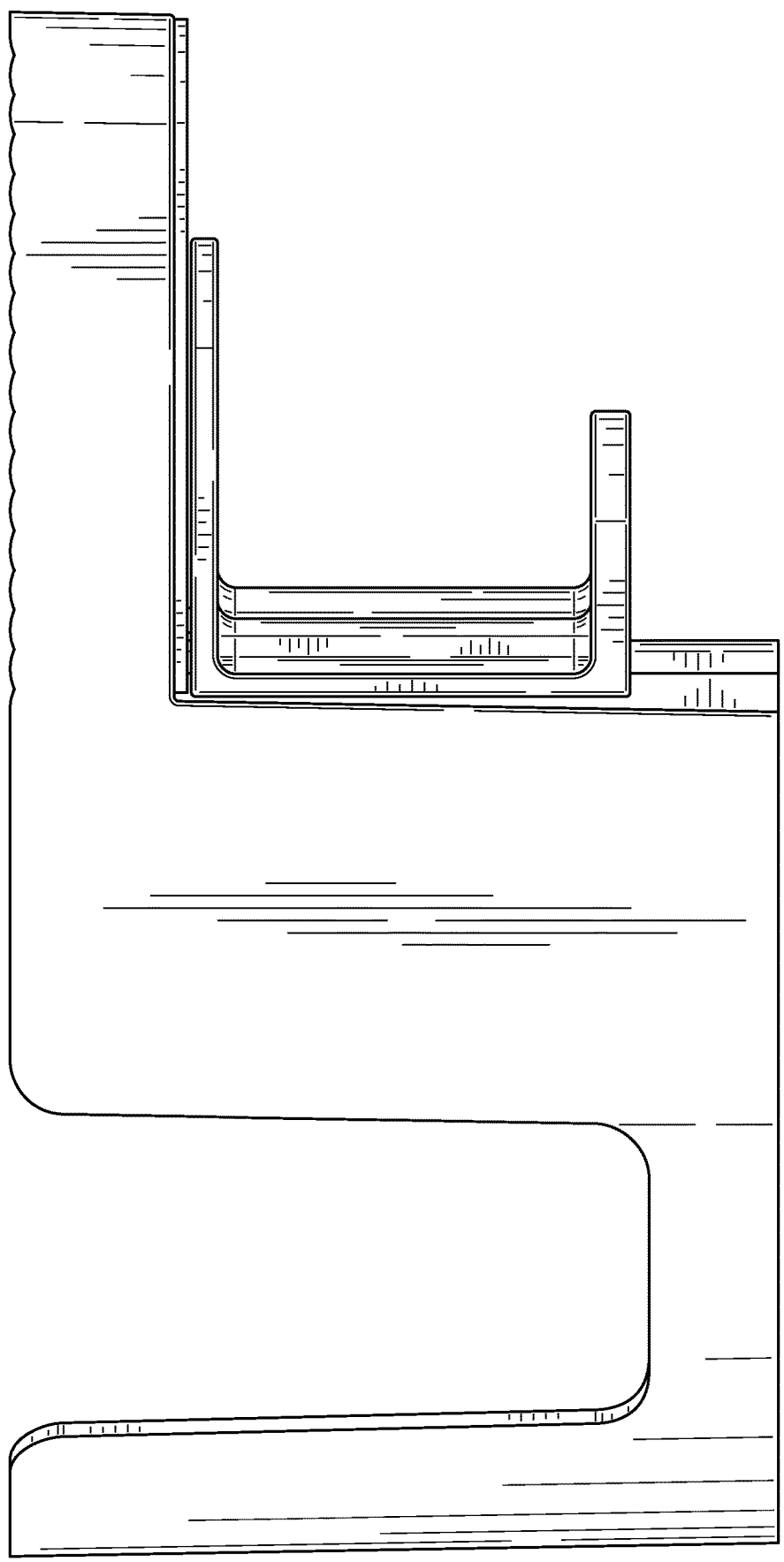
FIG. 25 is a right side view thereof.
Figure 26:
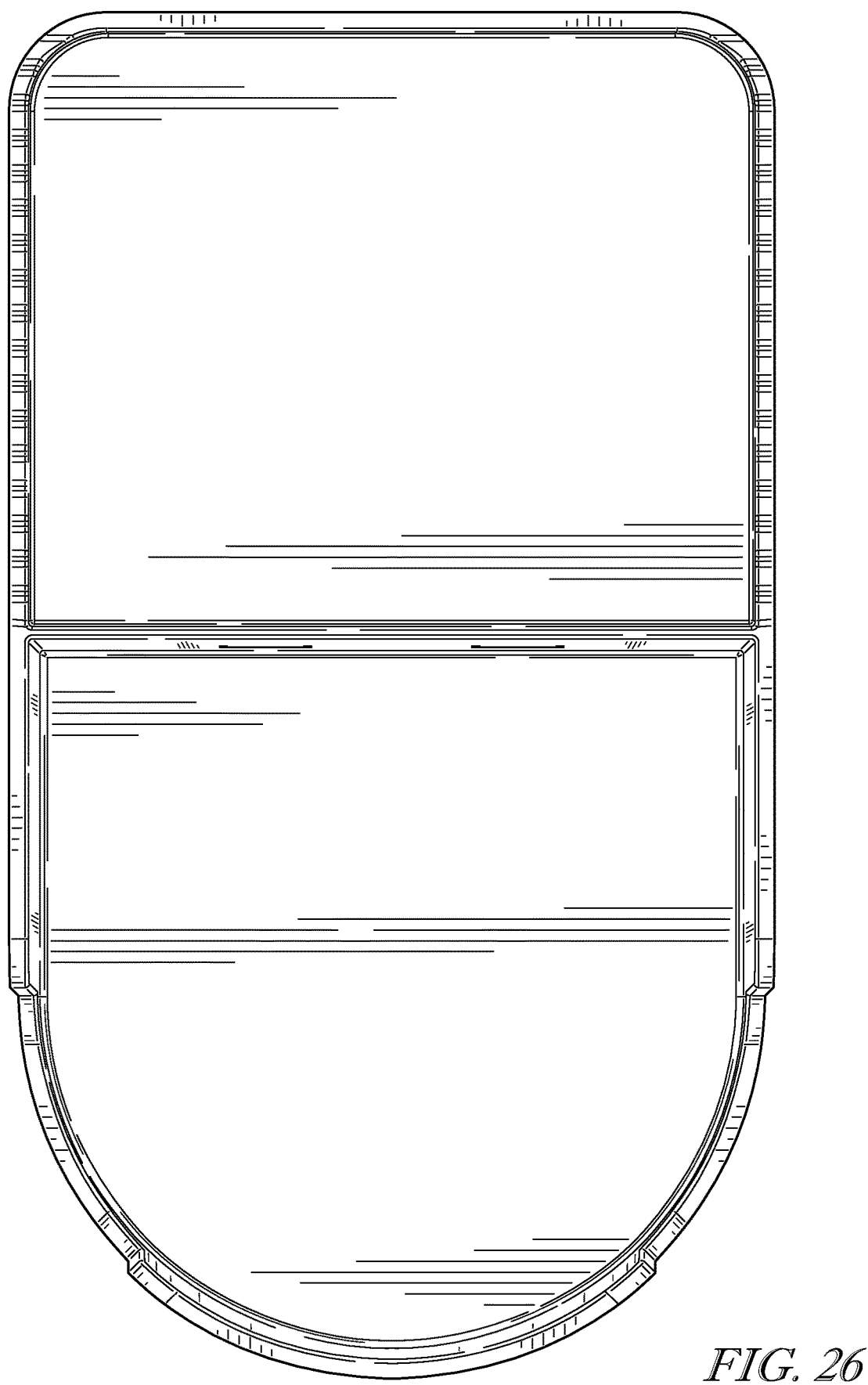
FIG. 26 is a top view thereof.
Figure 27:
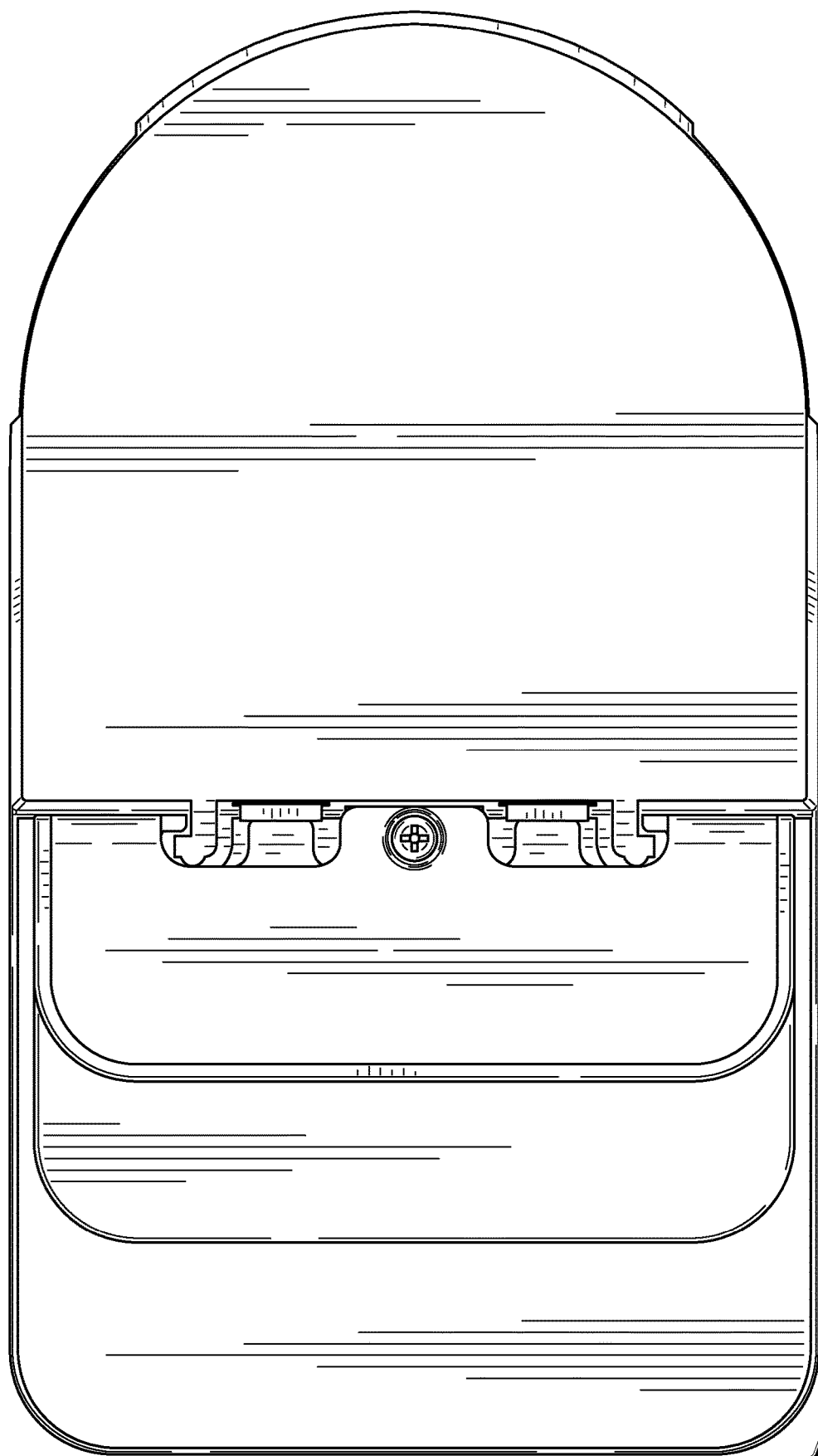
FIG. 27 is a bottom view thereof.
Figure 28:
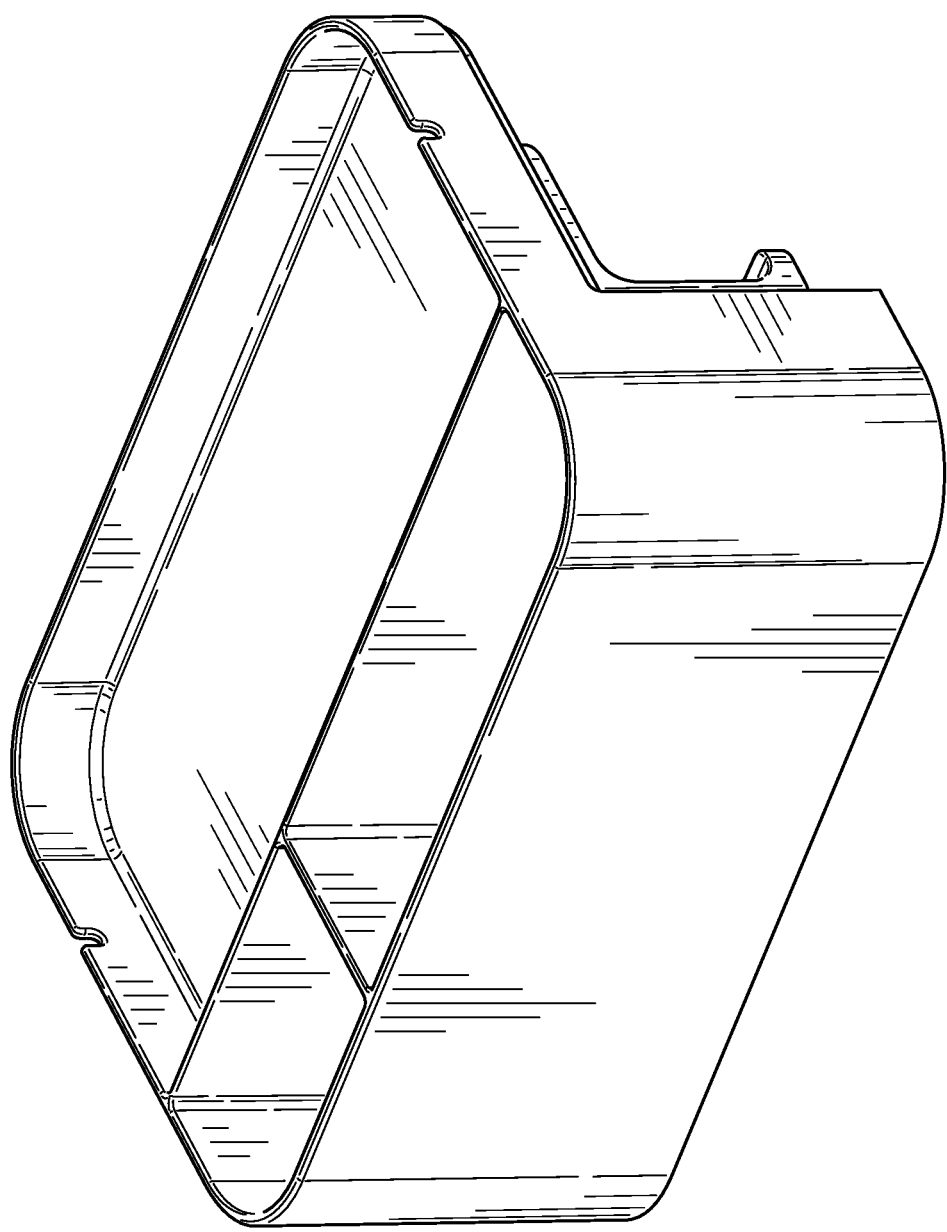
FIG. 28 is a perspective view of a desk accessory.
Figure 29:
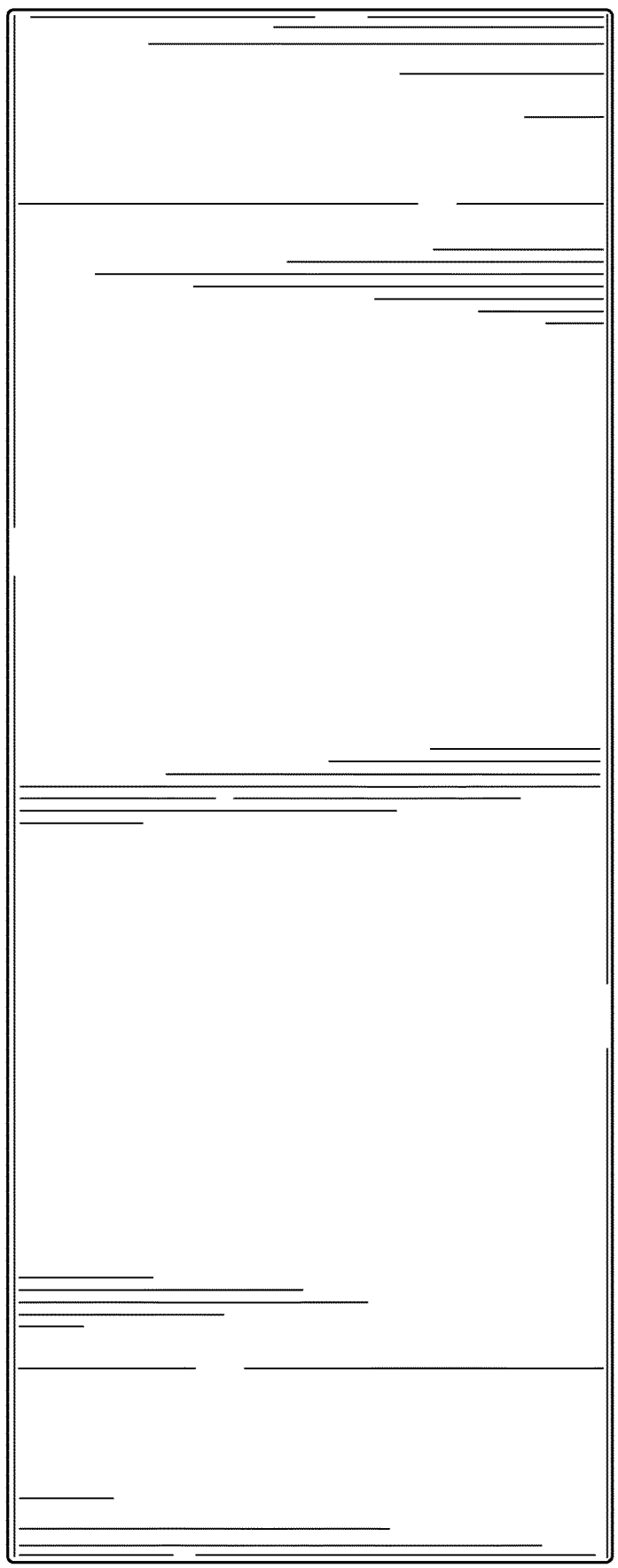
FIG. 29 is a front view thereof.
Figure 30:
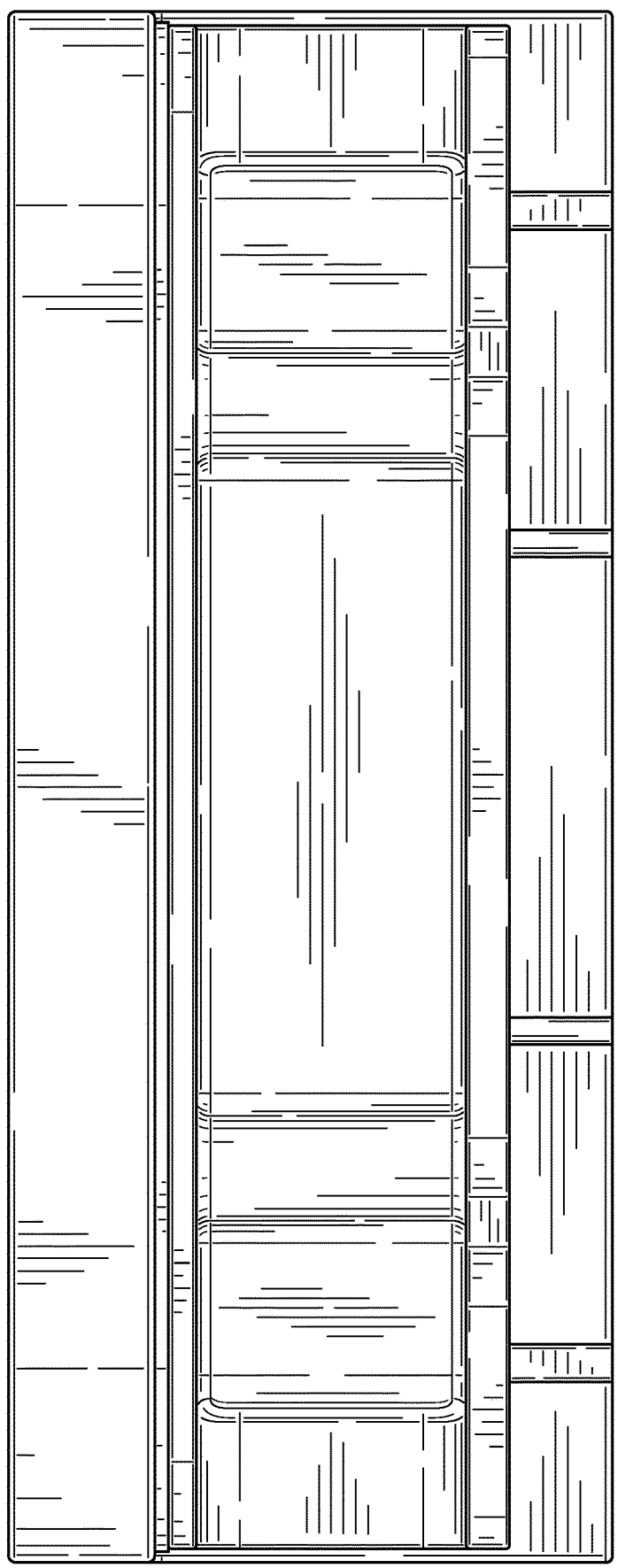
FIG. 30 is a rear view thereof.
Figure 31:
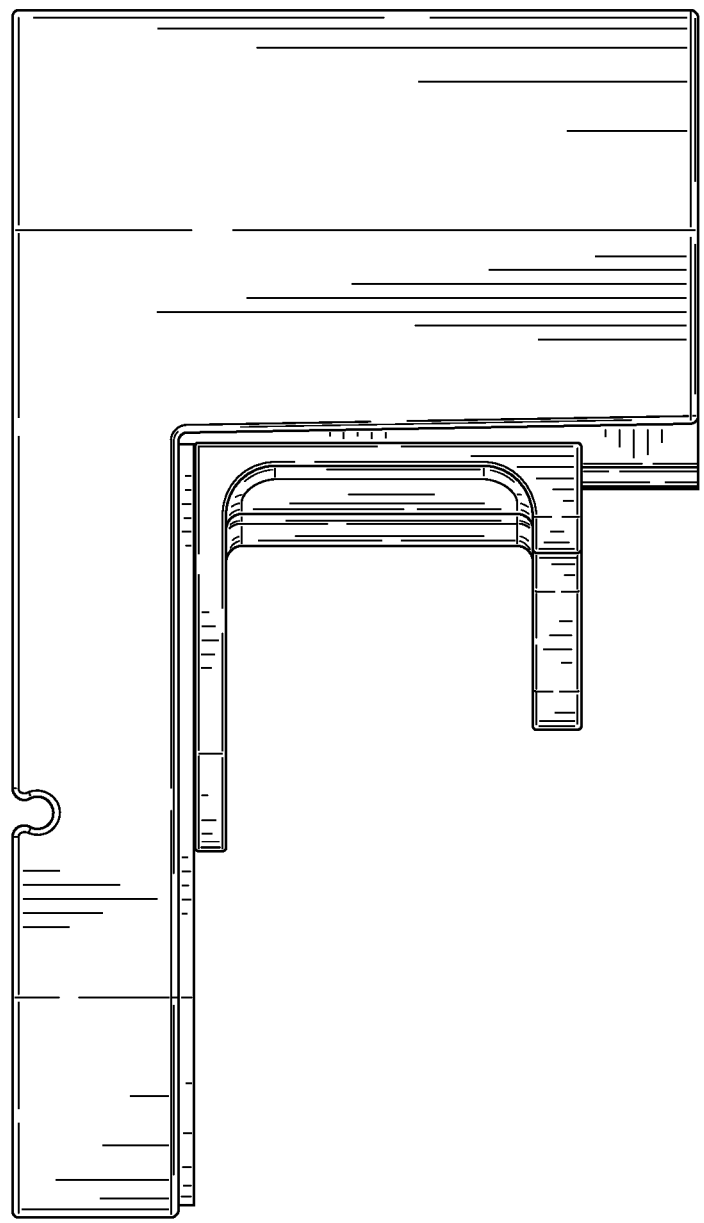
FIG. 31 is a left side view thereof.
Figure 32:
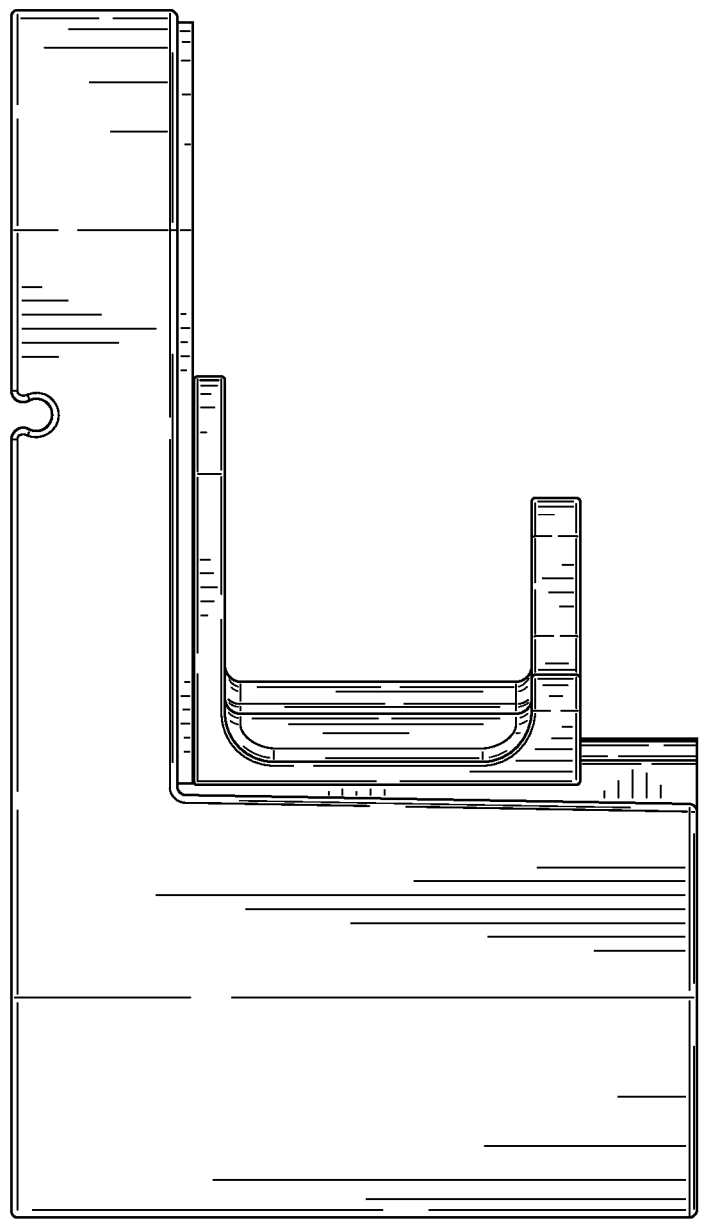
FIG. 32 is a right side view thereof.
Figure 33:
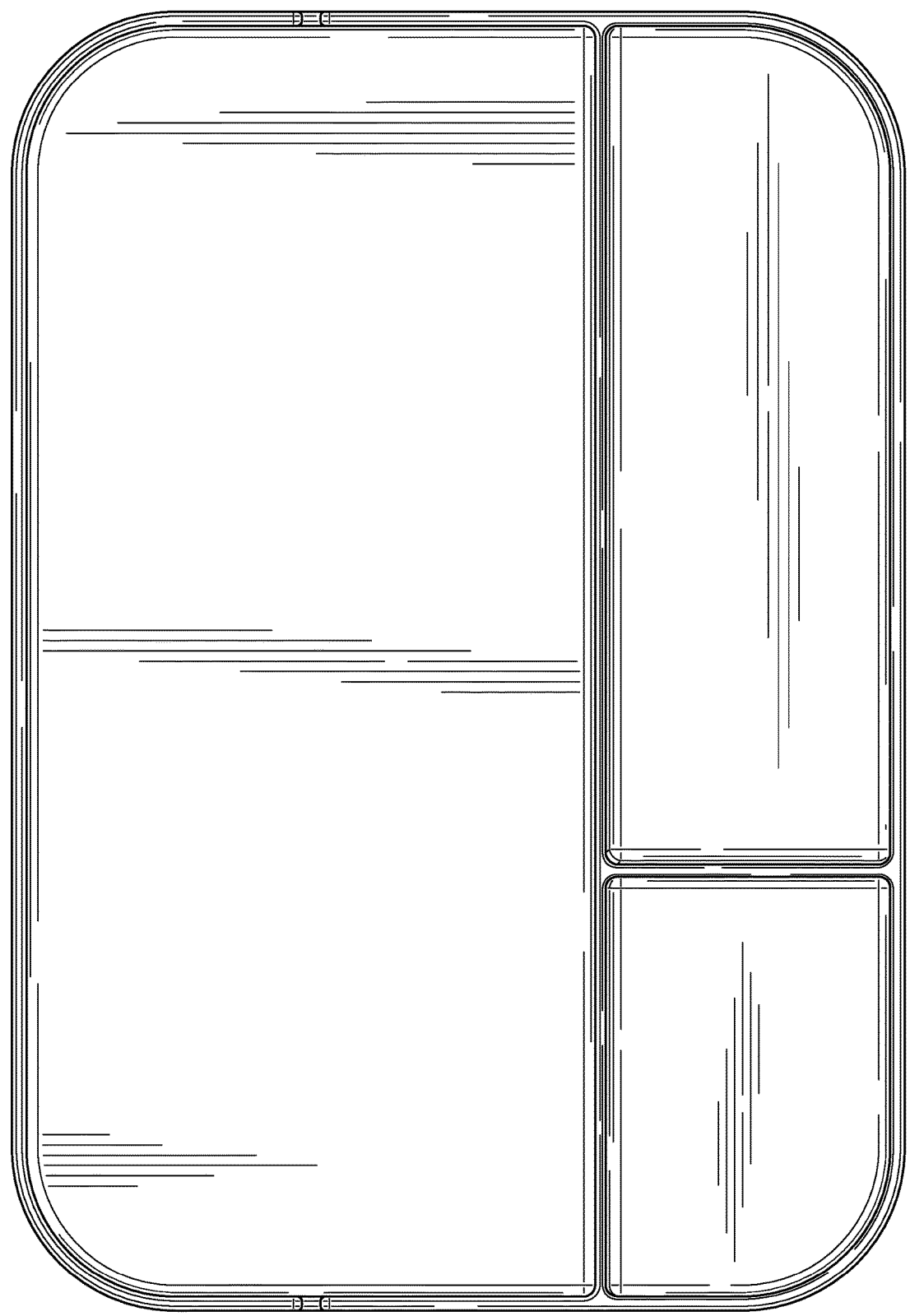
FIG. 33 is a top view thereof.
Figure 34:
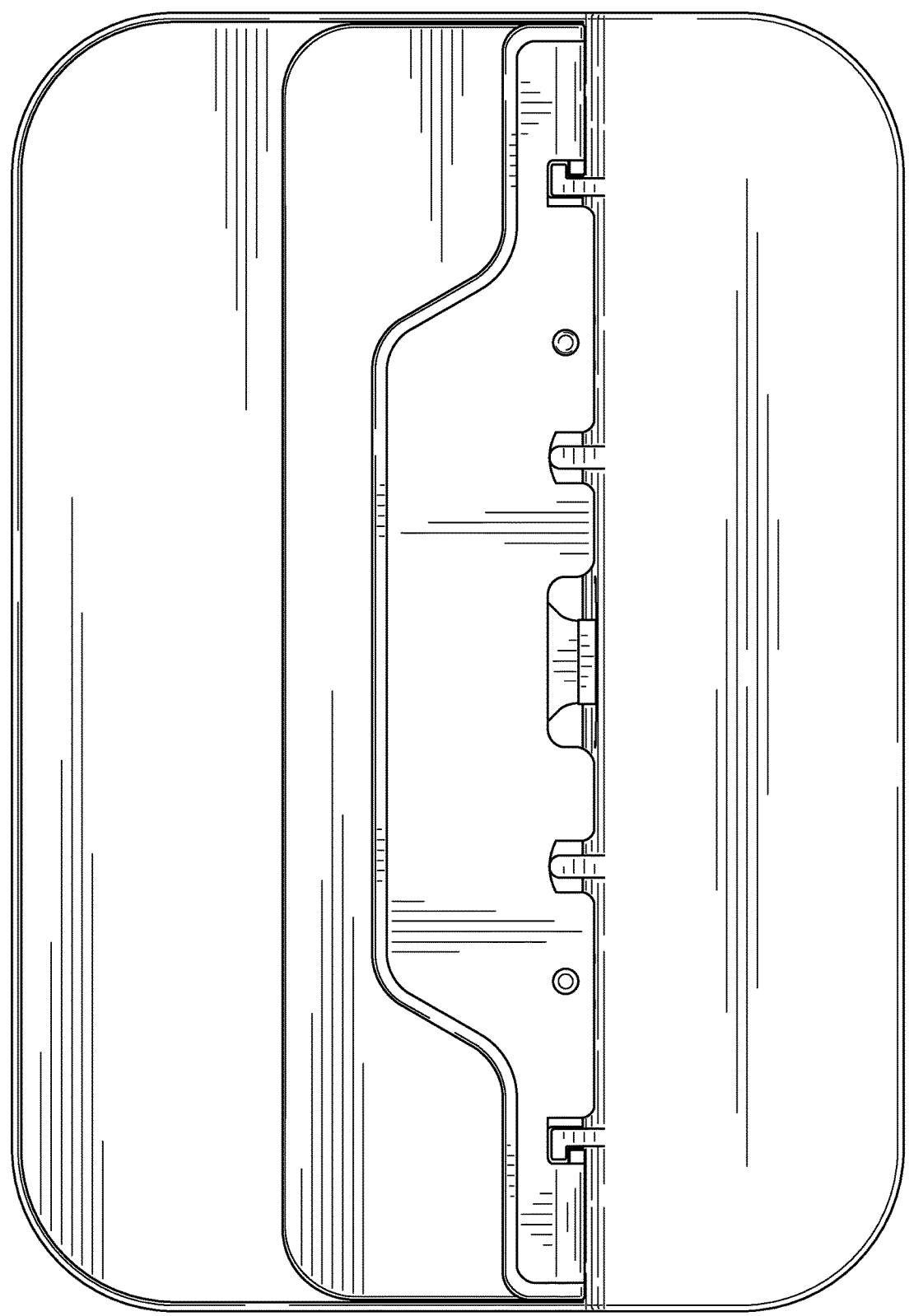
FIG. 34 is a bottom view thereof.
Figure 35:
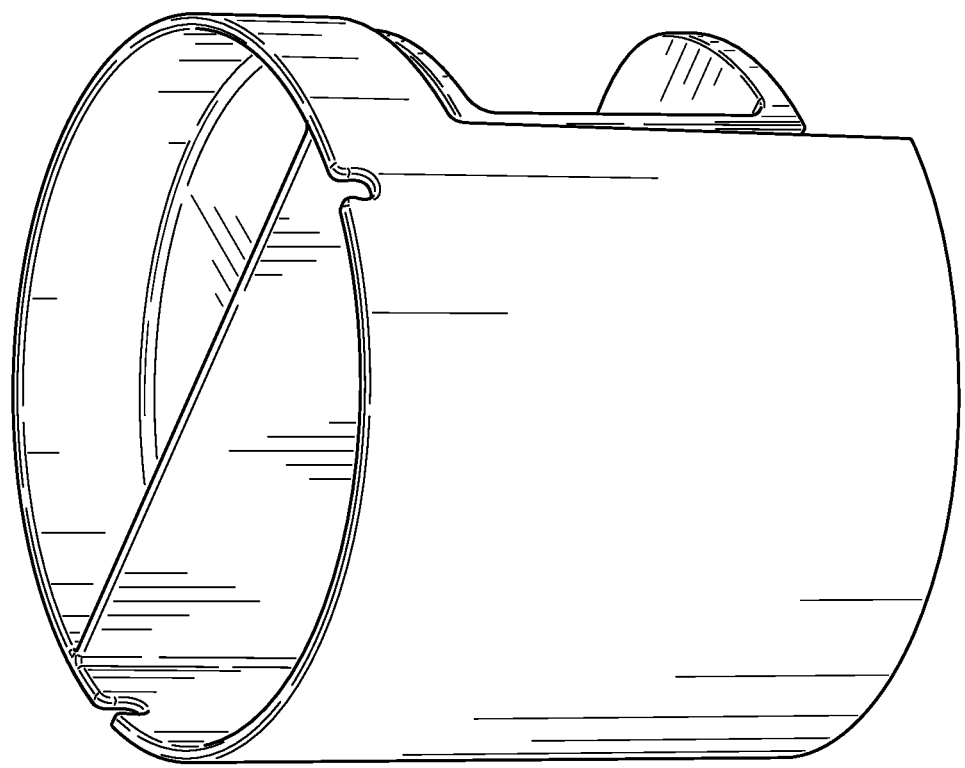
FIG. 35 is a perspective view of a desk accessory.
Figure 36:
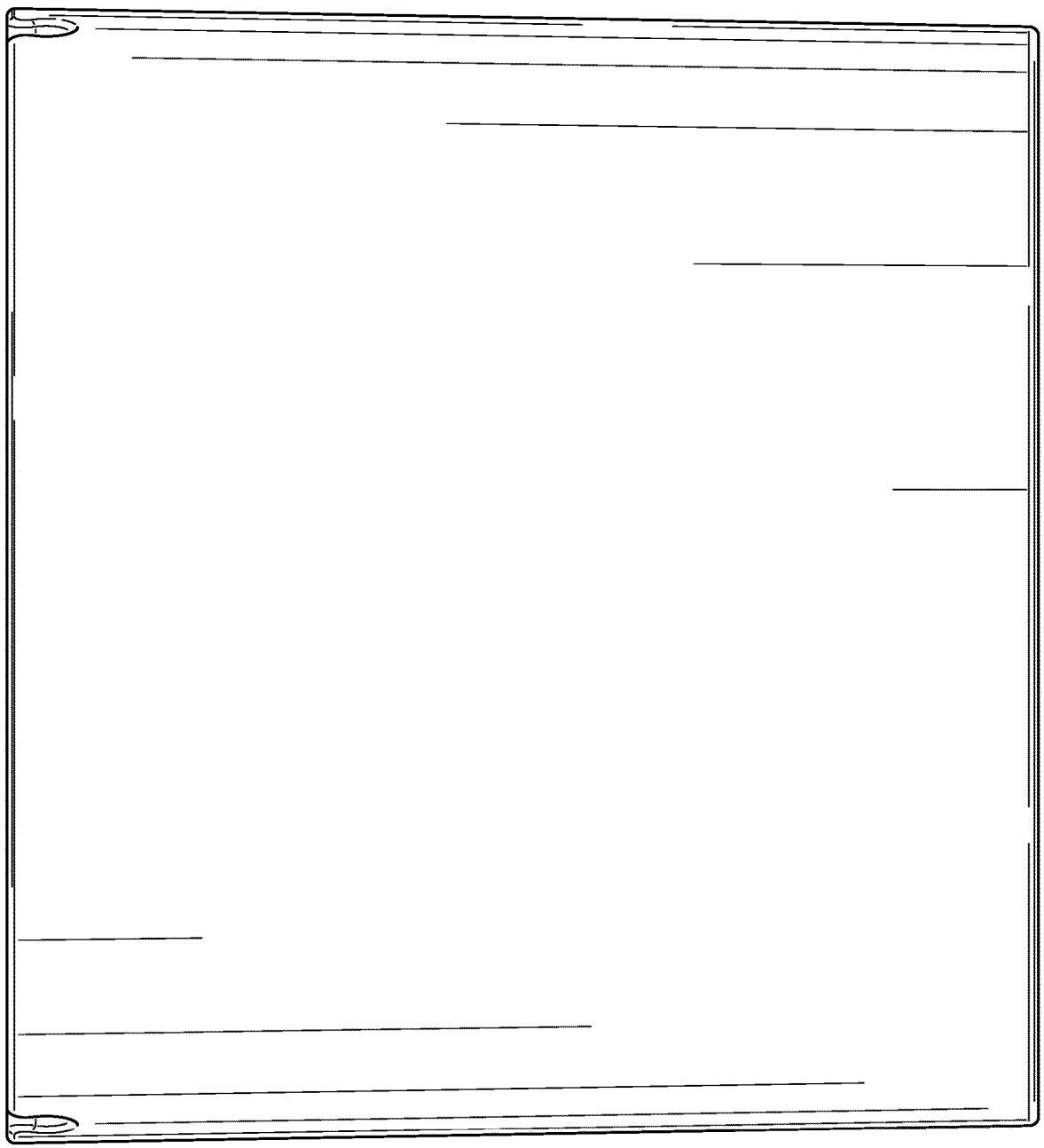
FIG. 36 is a front view thereof.
Figure 37:
FIG. 37 is a rear view thereof.
Figure 38:
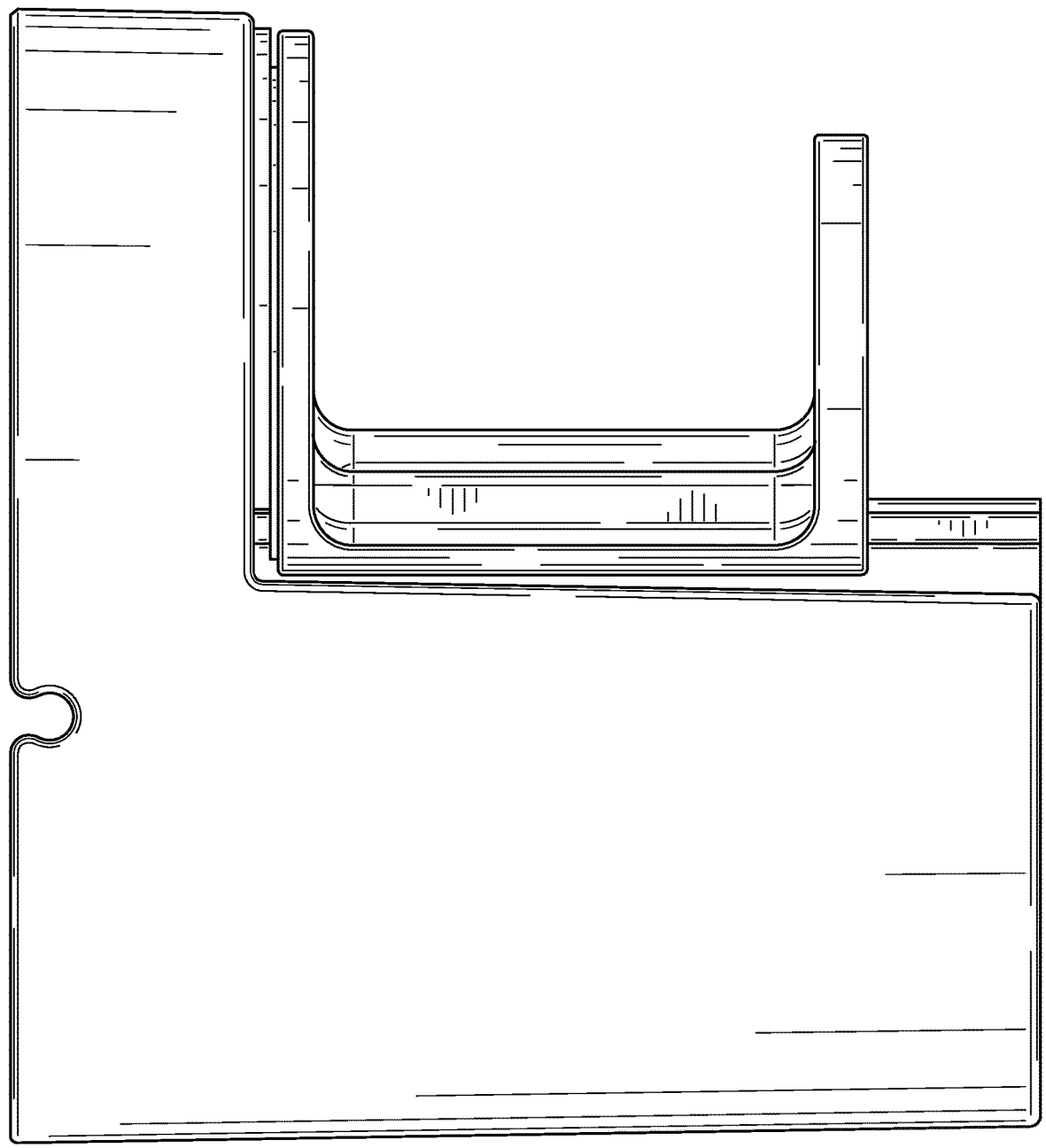
FIG. 38 is a left side view thereof.
Figure 39:
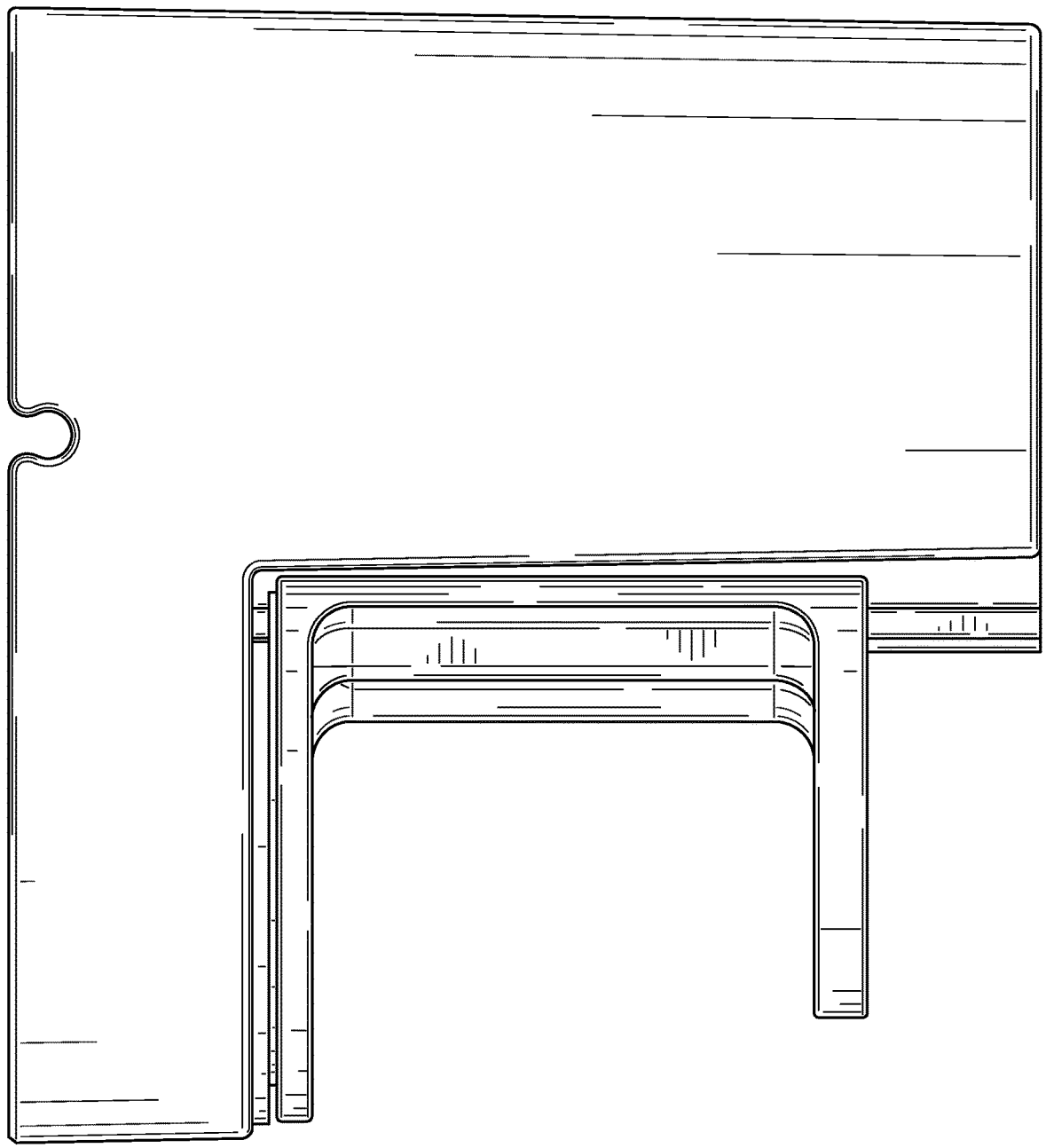
FIG. 39 is a right side view thereof.
Figure 40:
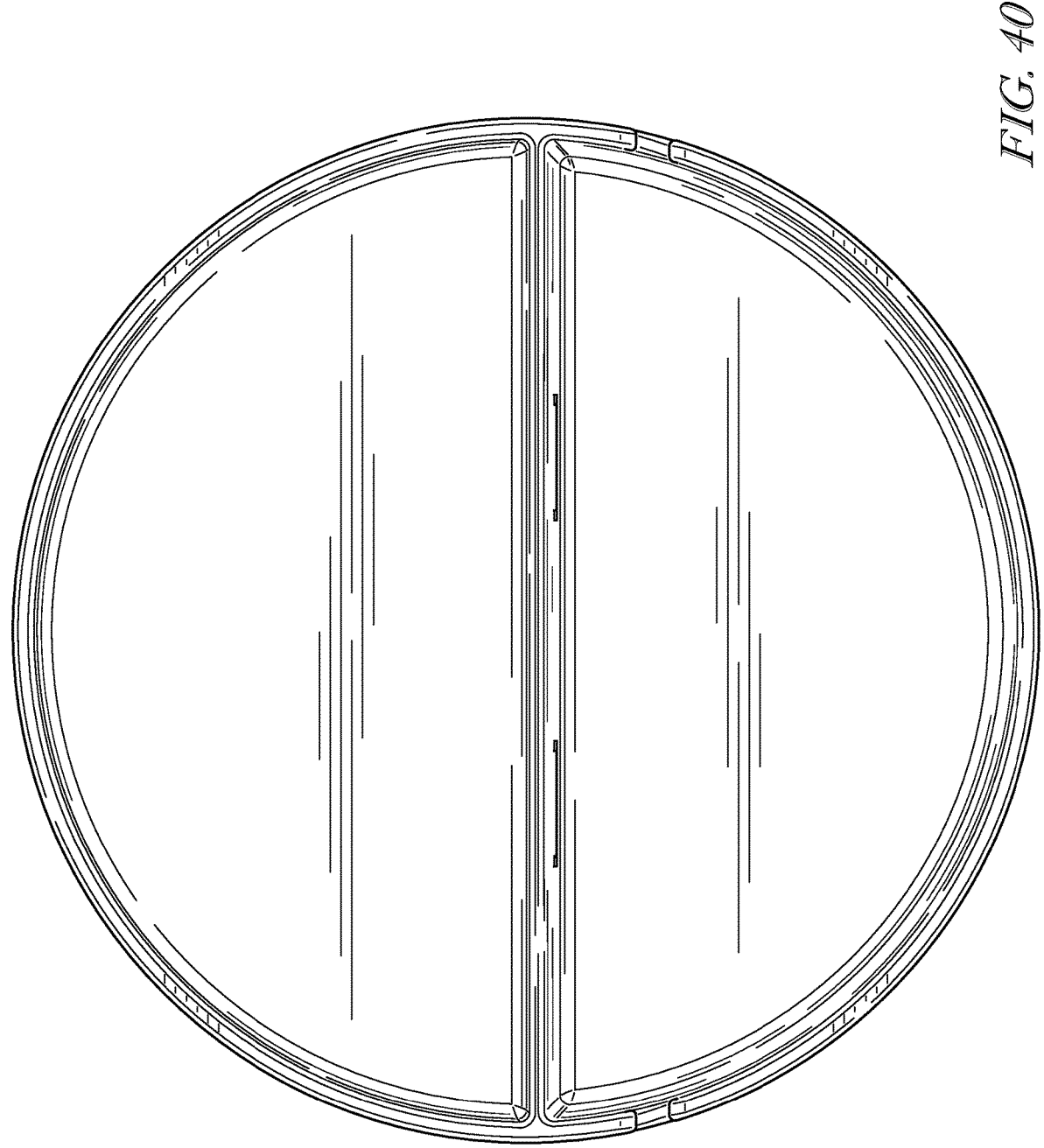
FIG. 40 is a top view thereof.
Figure 41:
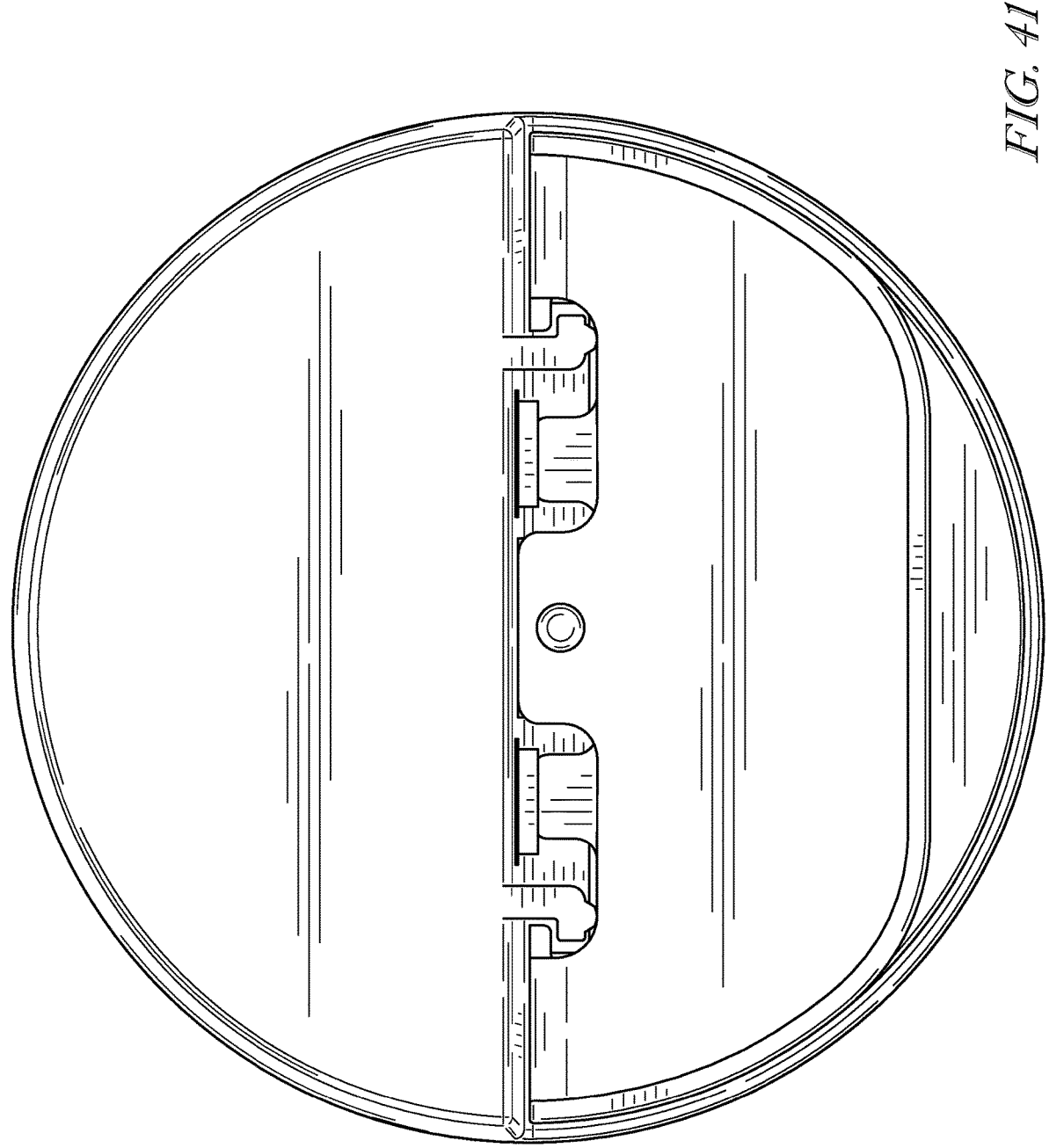
FIG. 41 is a bottom view thereof.
Figure 42:
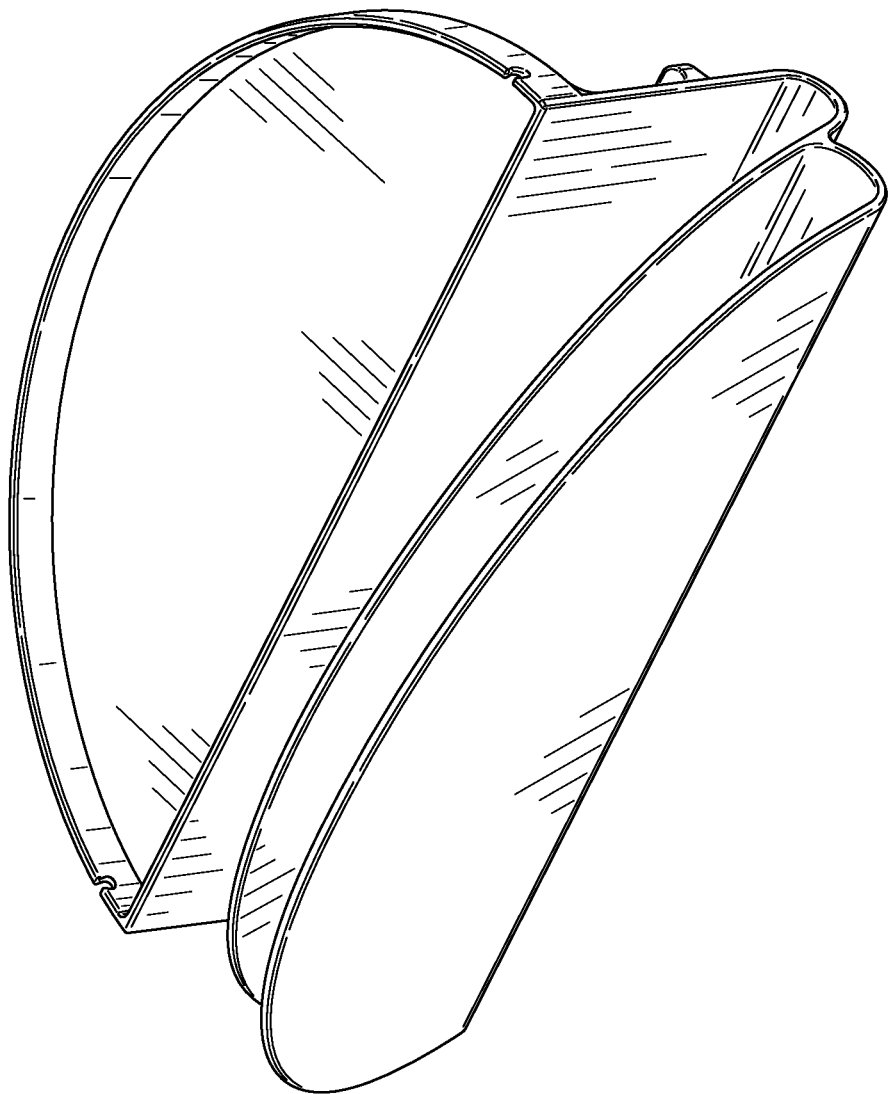
FIG. 42 is a perspective view of a desk accessory.
Figure 43:
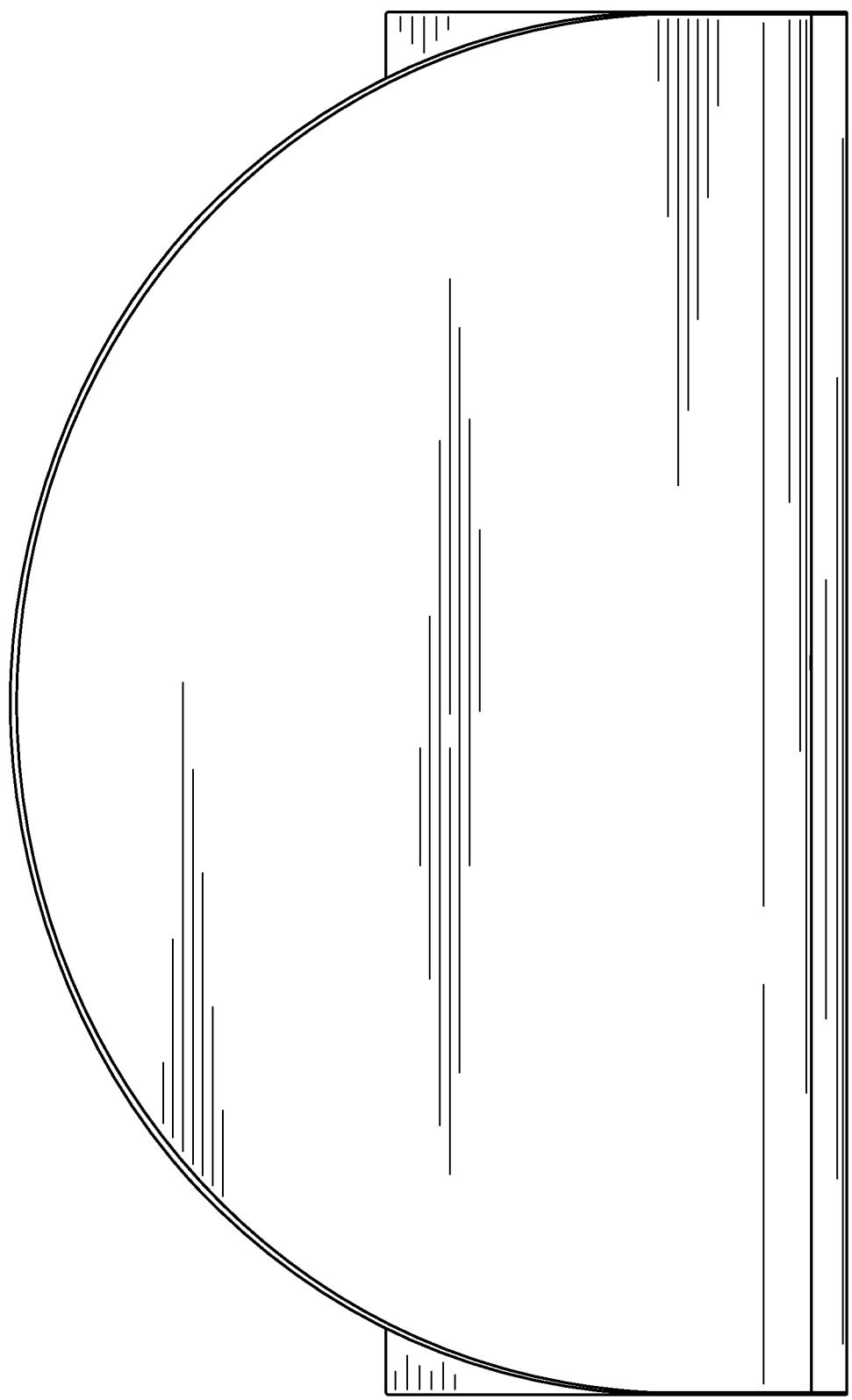
FIG. 43 is a front view thereof.
Figure 44:
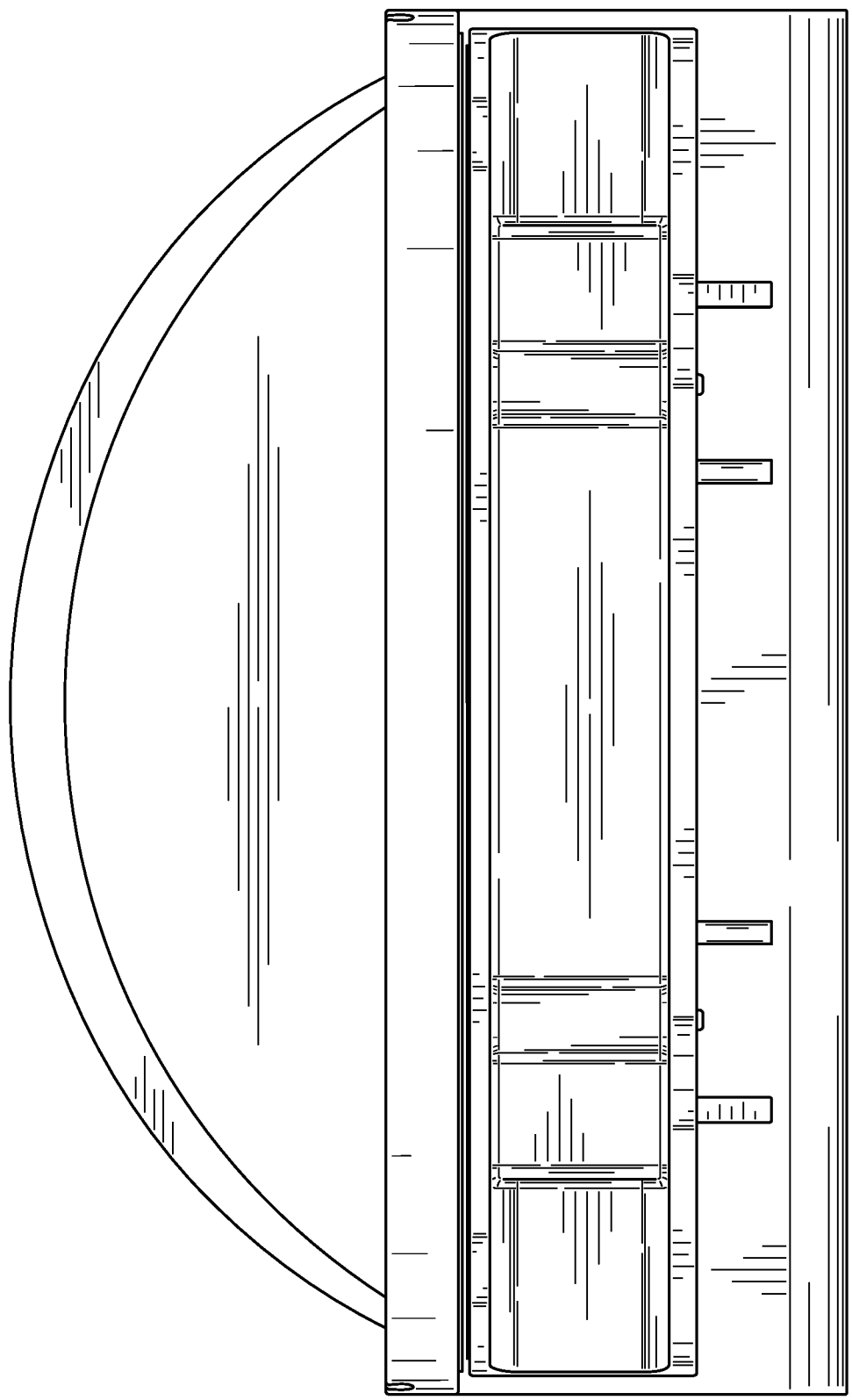
FIG. 44 is a rear view thereof.
Figure 45:
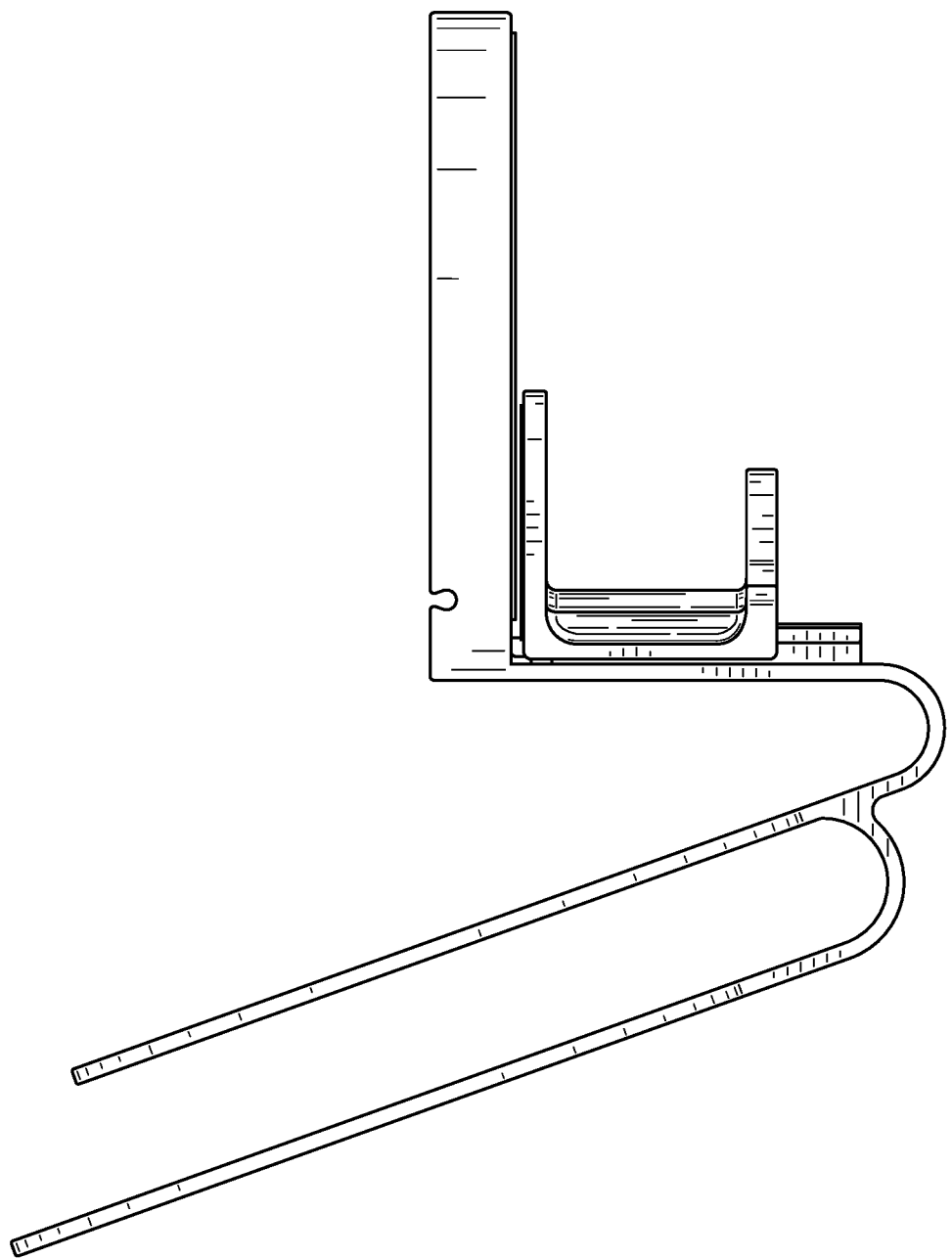
FIG. 45 is a left side view thereof.
Figure 46:
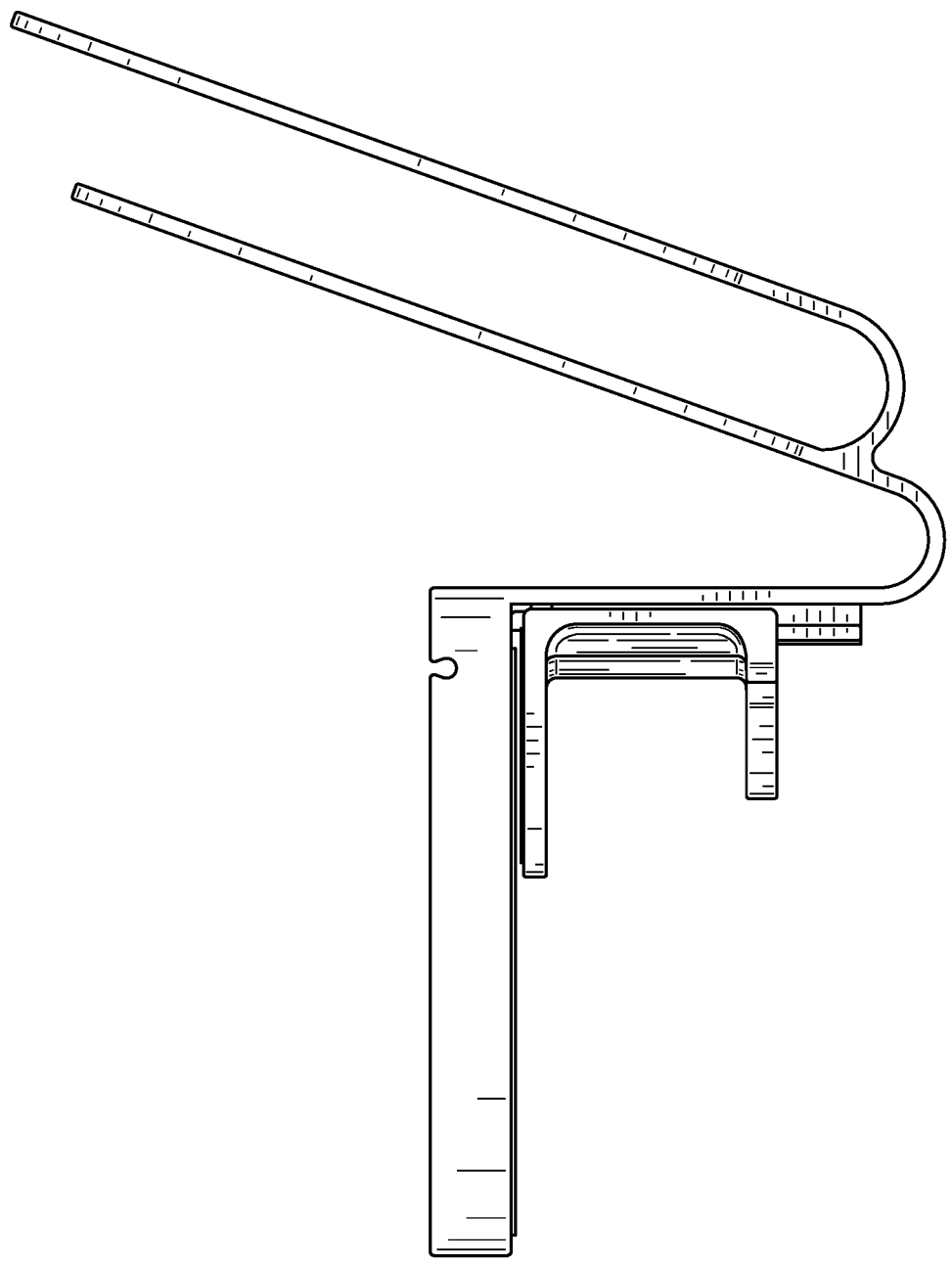
FIG. 46 is a right side view thereof.
Figure 47:
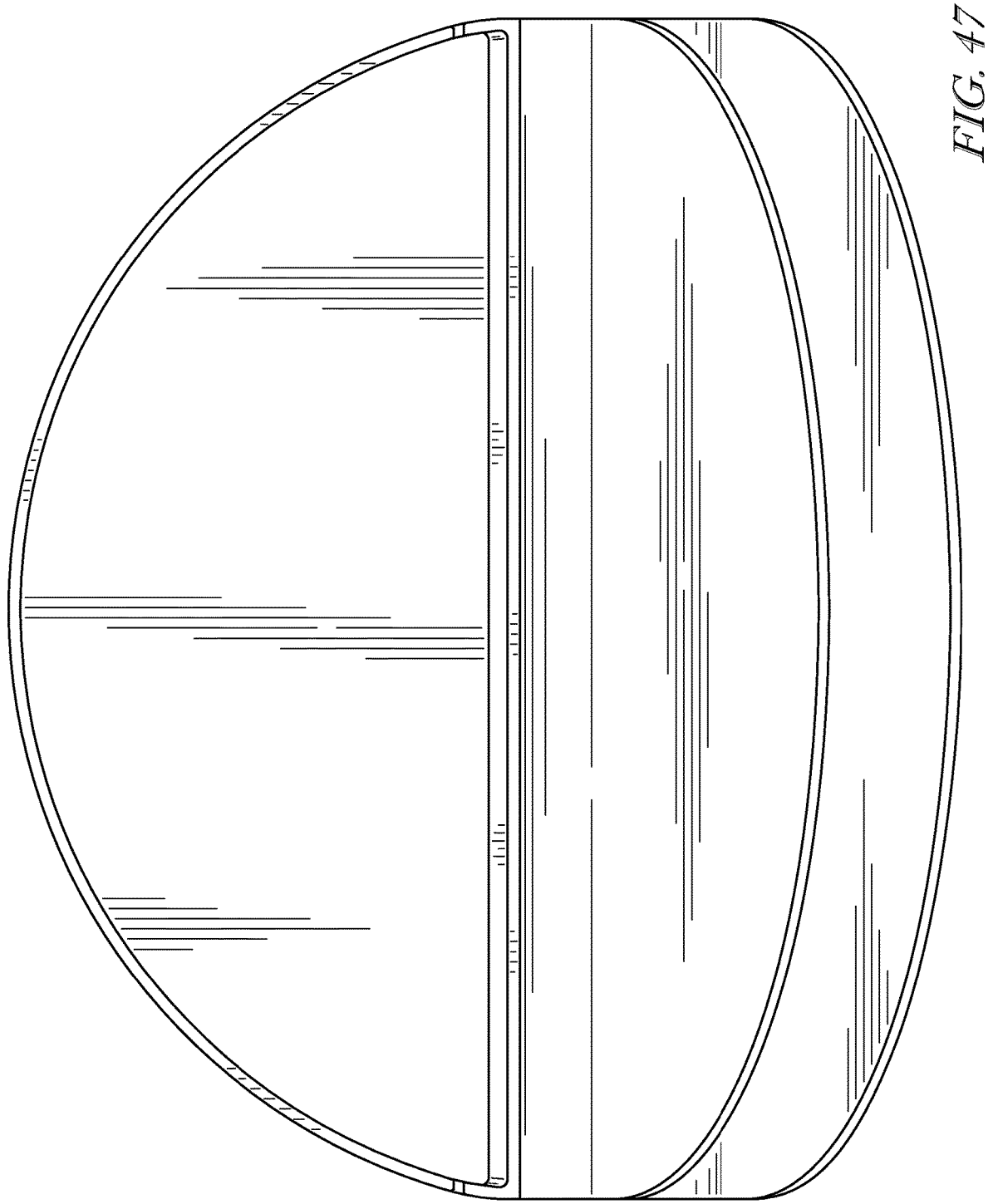
FIG. 47 is a top view thereof.
Figure 48:
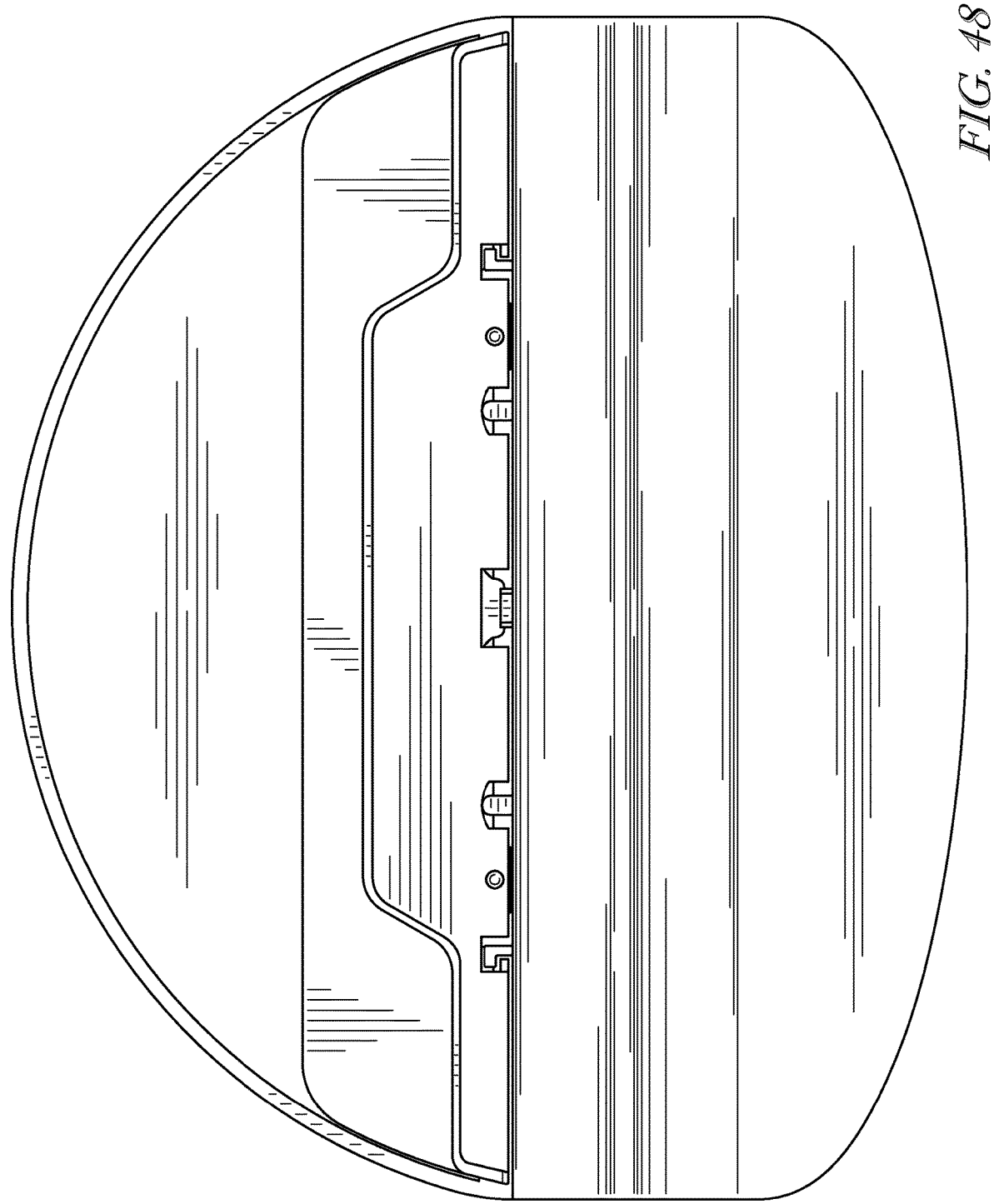
FIG. 48 is a bottom view thereof.
Figure 49:
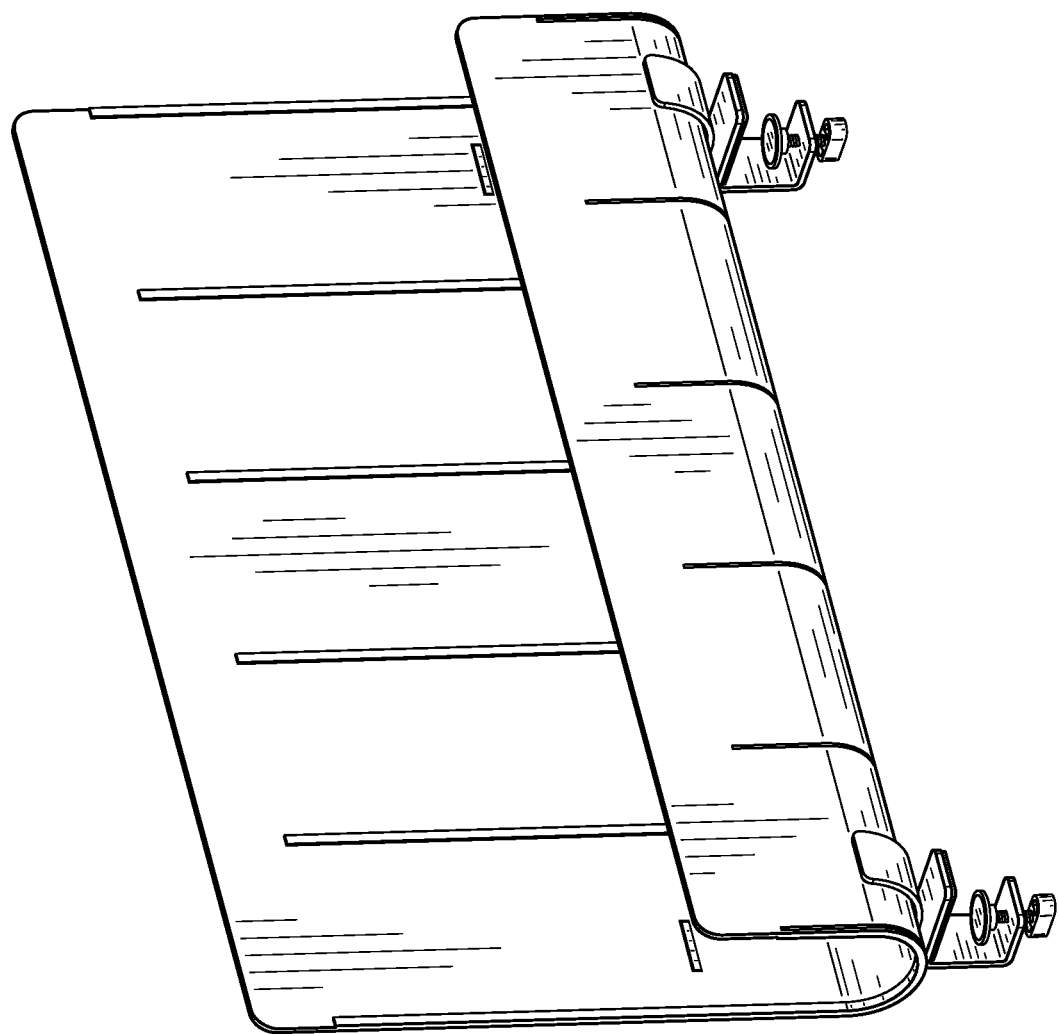
FIG. 49 is a perspective view of a desk accessory.
Figure 50:
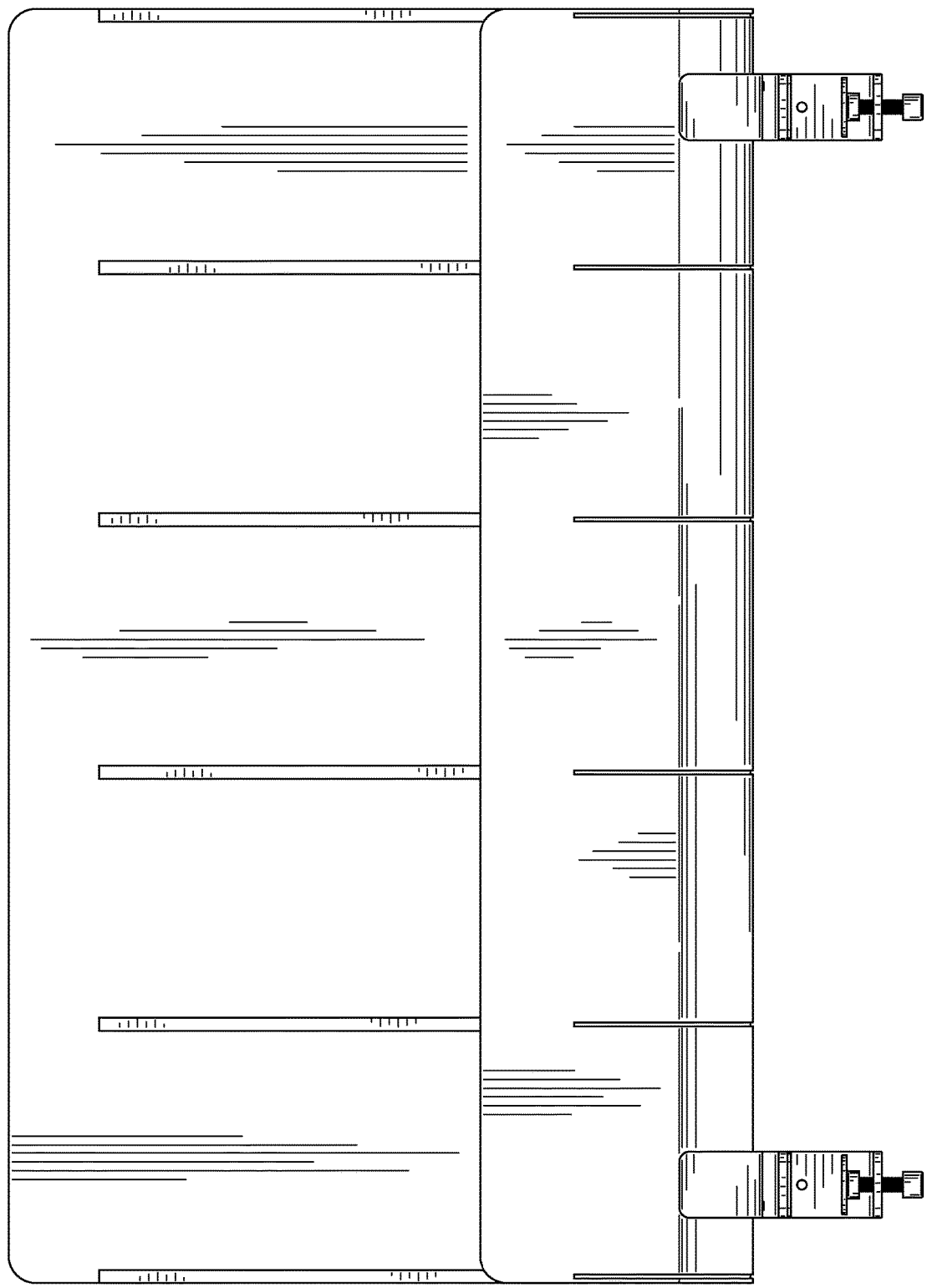
FIG. 50 is a front view thereof.
Figure 51:
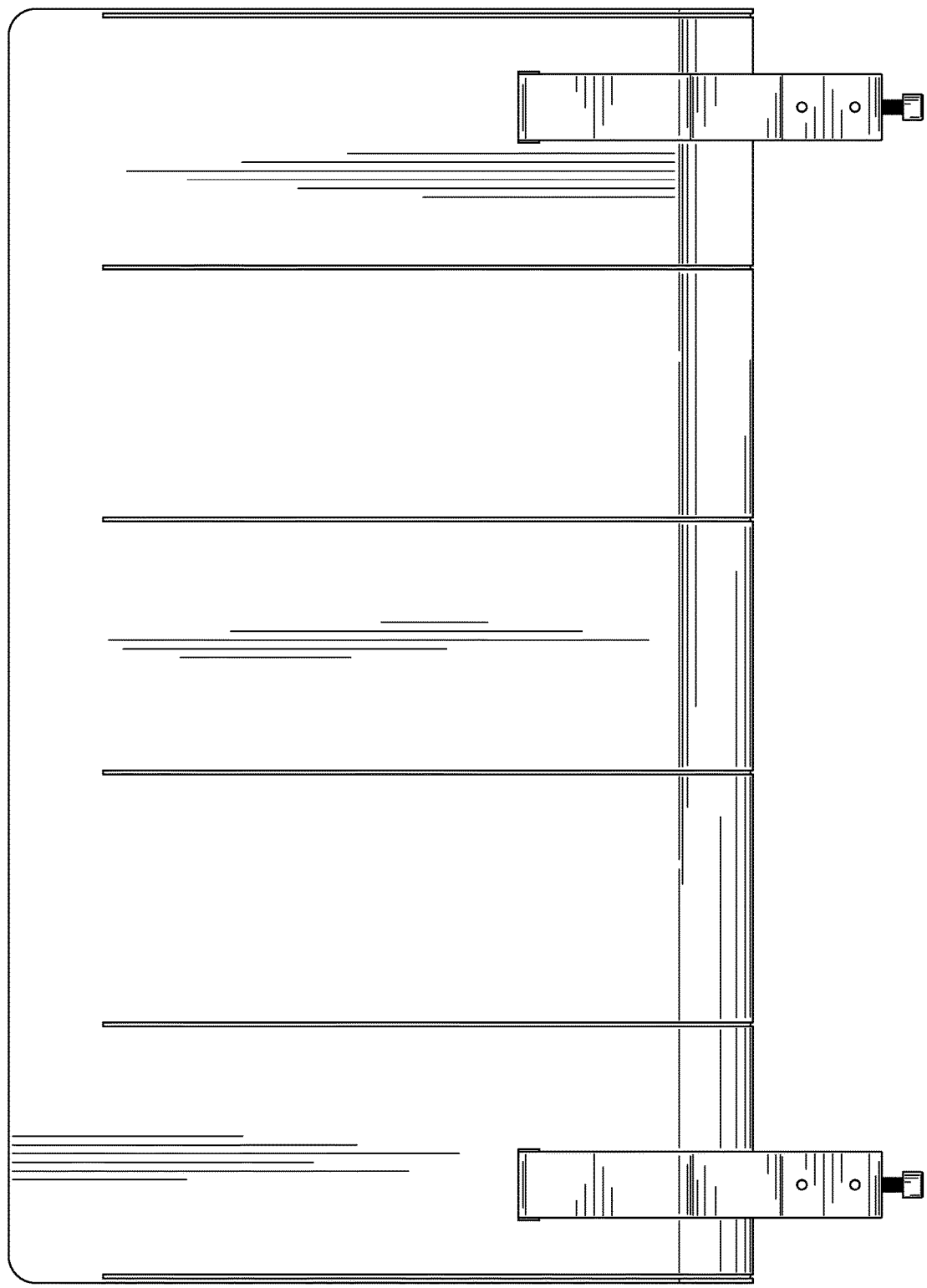
FIG. 51 is a rear view thereof.
Figure 53:
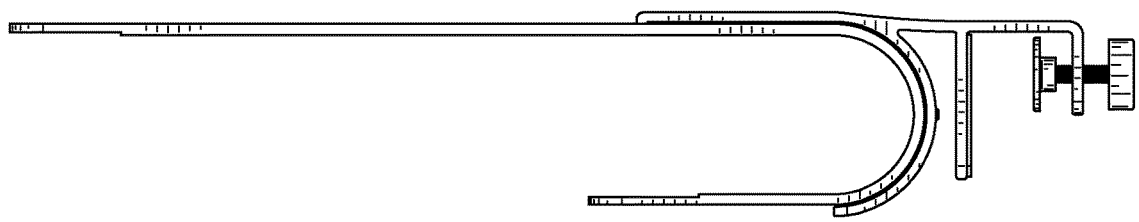
FIG. 53 is a right side view thereof.
Figure 52:
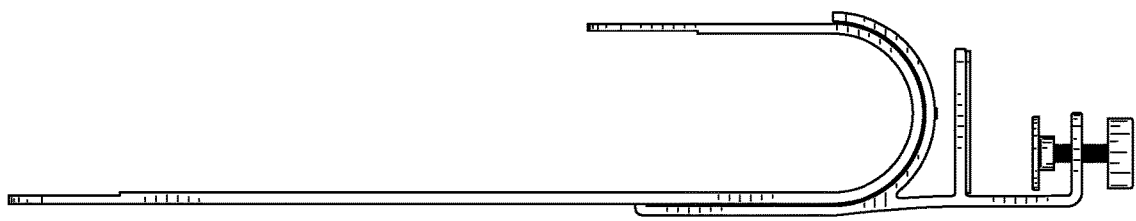
FIG. 52 is a left side view thereof.
Figure 54:
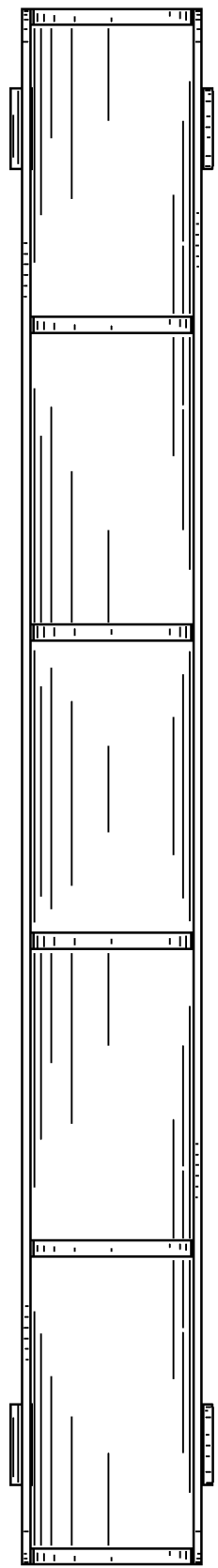
FIG. 54 is a top view thereof.
Figure 55:
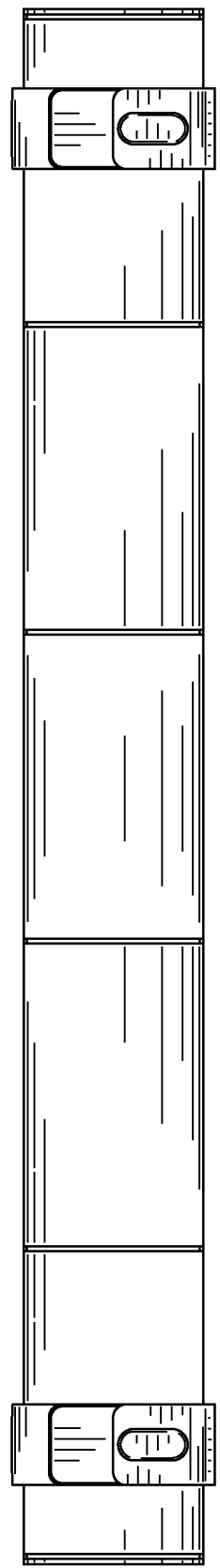
FIG. 55 is a bottom view thereof.

A first embodiment of an illustrative desk accessory 20 adapted for use with a desk 12 is shown in FIGS. 1-9A. The desk accessory 20 includes a frame 22 adapted to support at least one object relative to a tabletop 14 of the desk 12 located above an underlying floor 10 and a clamp 24 configured to selectively couple the desk accessory 20 to the tabletop 14 of the desk 12. A second embodiment of a desk accessory 220 is shown in FIGS. 10-12. A third embodiment of a desk accessory 320 is shown in FIGS. 13-15. A fourth embodiment of a desk accessory 420 is shown in FIGS. 16-18. A fifth embodiment of a desk accessory 520 is shown in FIGS. 19 and 20.

The desk accessory 20 includes a frame 22, a clamp 24, and a clamp controller 26 as shown in FIGS. 1-9A. The frame 22 is shaped to define at least one compartment space 60 adapted to receive the at least one object so as to support at least one object relative to the tabletop 14 of the desk 12. The clamp 24 is configured to couple with the tabletop 14 of the desk 12 to fix the desk accessory 20 to the tabletop 14 of the desk 12. The clamp controller 26 is configured to control movement of the clamp 24 to be able to selectively couple the desk accessory 20 to the desk 12.

Figure 3:
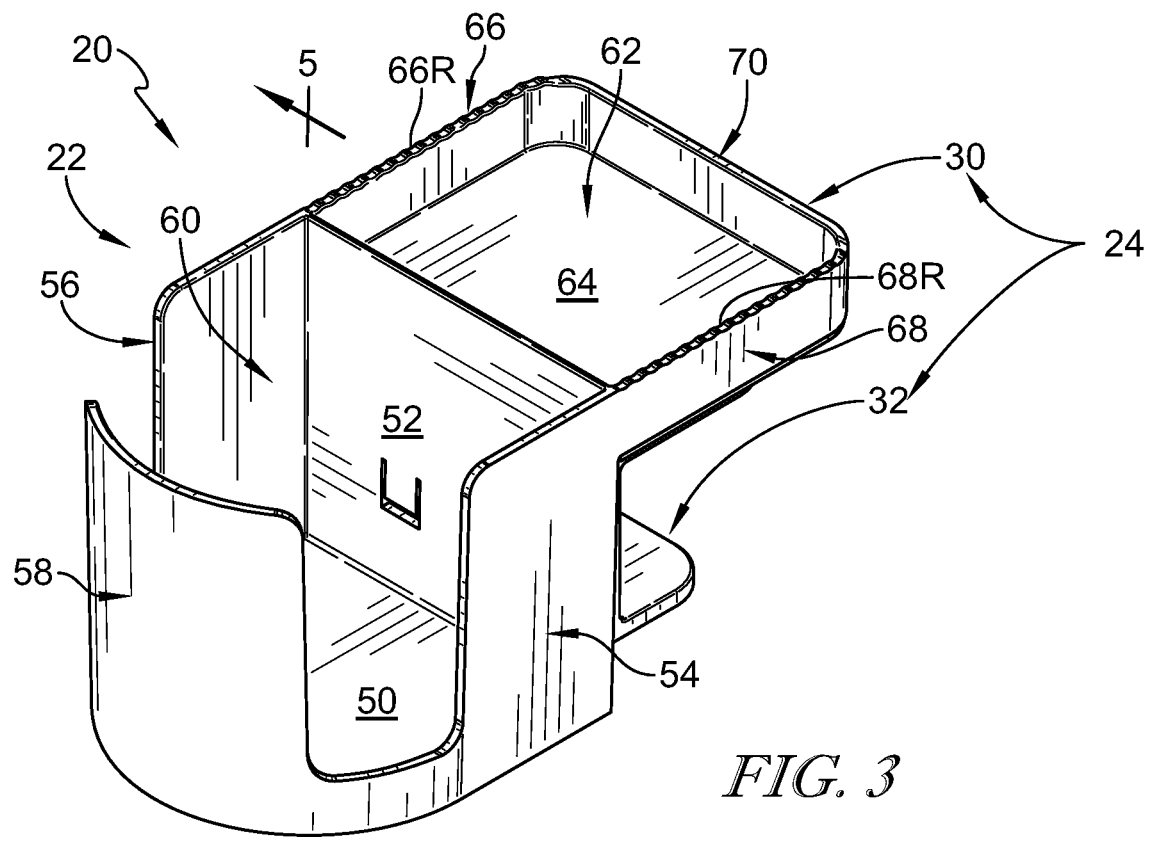
FIG. 3 is a front perspective view of the desk accessory of FIG. 1 showing the frame of the desk accessory is shaped to define a compartment space adapted to receive a cup, a mug, or a water bottle.
Figure 4:
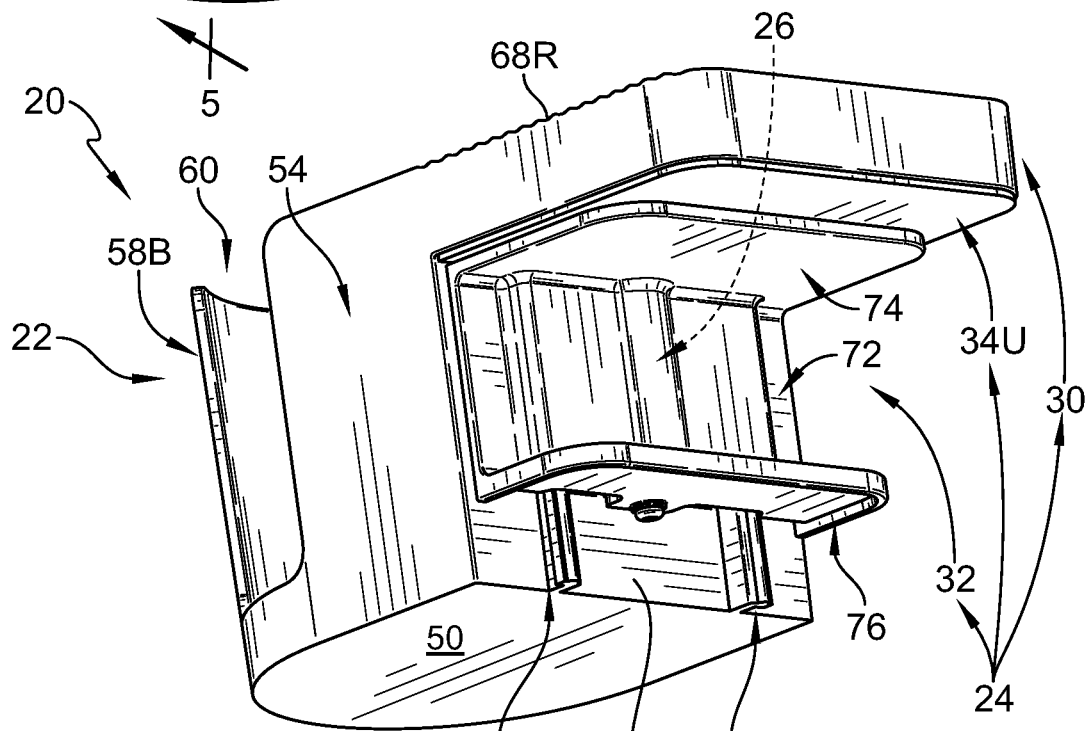
FIG. 4 is a rear perspective view of the desk accessory of FIG. 1 showing the upper clamp arm is integrally formed with the frame and the lower clamp arm includes a clamp head that extends along and is parallel to the upper clamp arm of the frame, a clamp handle that is spaced apart axially from the clamp head, and a guide plate that extends between and interconnects the clamp head and the clamp handle along a backside surface of the frame.
Figure 5:
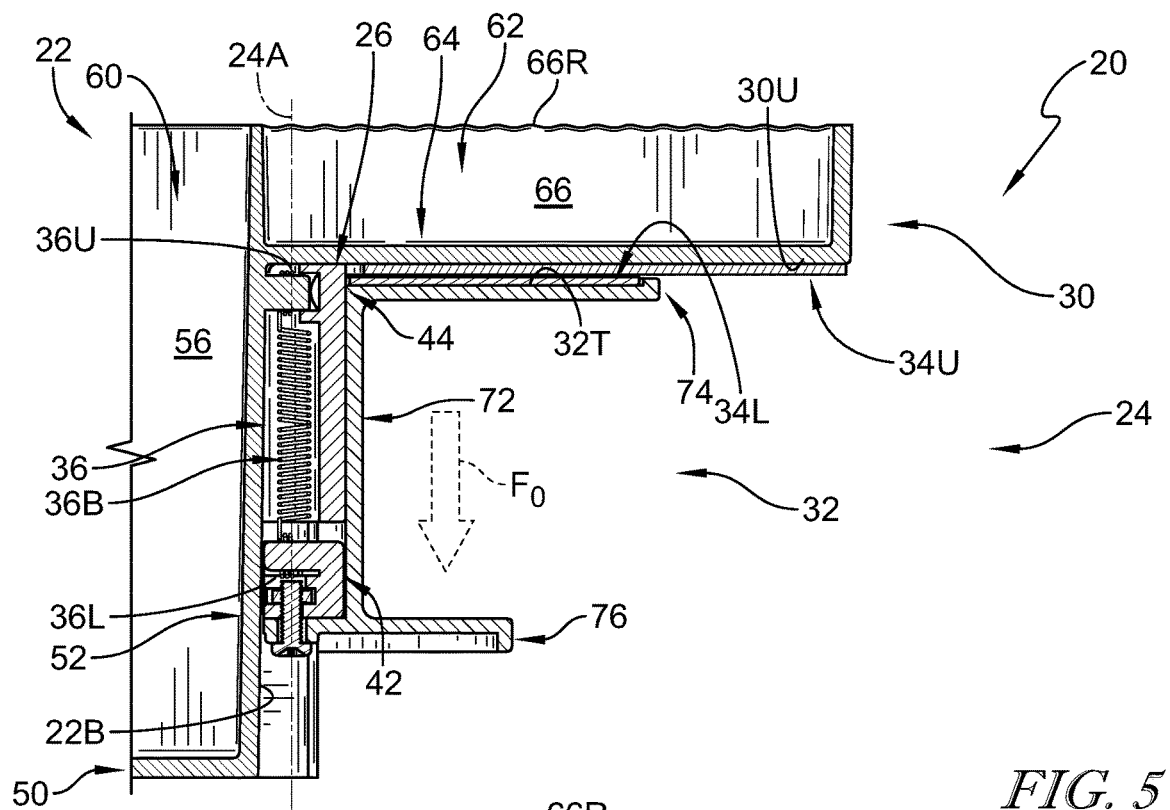
FIG. 5 is a cross-section view of the desk accessory of FIG. 3 taken along line 5-5 showing the clamp of the desk accessory in the closed position in which the lower clamp arm confronts the upper clamp arm.

The clamp 24 includes a stationary upper clamp arm 30 that extends from the frame 22 and a lower clamp arm 32 slidably coupled to the frame 22 below the stationary upper clamp arm 30 as shown in FIGS. 1-9A. The upper clamp arm 30 is configured to be arranged over a topside surface 14T of the tabletop 14 so that the frame 22 is located adjacent to an edge 14E of the tabletop 14. The lower clamp arm 32 is configured to slide relative to the frame 22 along an axis 24A between a closed position as shown in FIG. 5 and an open position FIG. 6.

Figure 6:
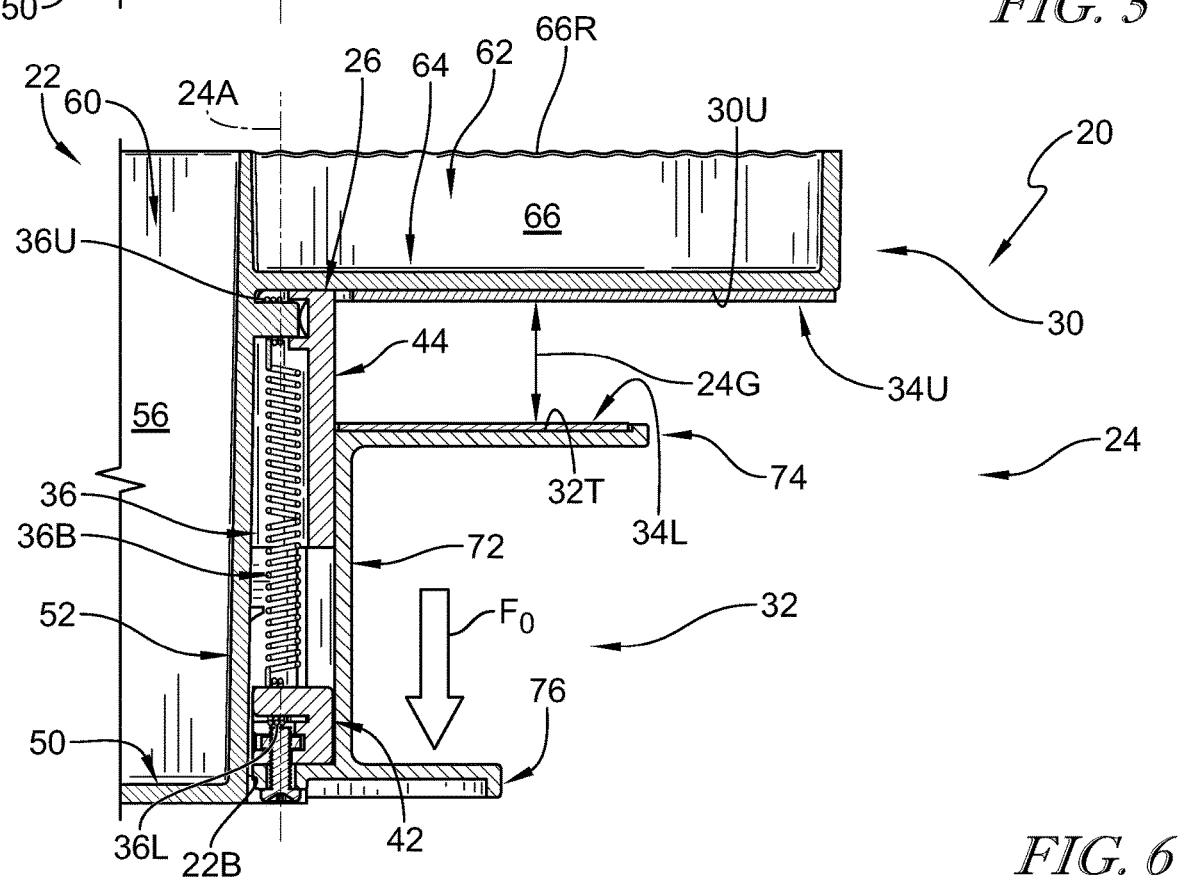
FIG. 6 is a cross-section view similar to FIG. 5 showing the user has applied the opening force to the lower clamp arm of the clamp to overcome the clamp force of the clamp controller and to cause the lower clamp arm to move to the open position in which the lower clamp arm is in spaced apart relation to the upper clamp arm to define the gap therebetween so that the edge of the tabletop may be inserted between the upper and lower clamp arms of the clamp.

In the closed position, the lower clamp arm 32 confronts the upper clamp arm 30 as shown in FIG. 5. In the open position, the lower clamp arm 32 is in spaced apart relation to the upper clamp arm 30 to define a gap 24G therebetween as shown in FIG. 6. The clamp controller 26 is configured to bias the lower clamp arm 32 toward the closed position. In this way, when the edge 14E of the tabletop 14 is located in the gap 24G between the upper and lower clamp arms 30, 32, the clamp controller 26 causes the clamp 24 to apply a clamp force $F_C$ on the tabletop 14.

Figure 1A:
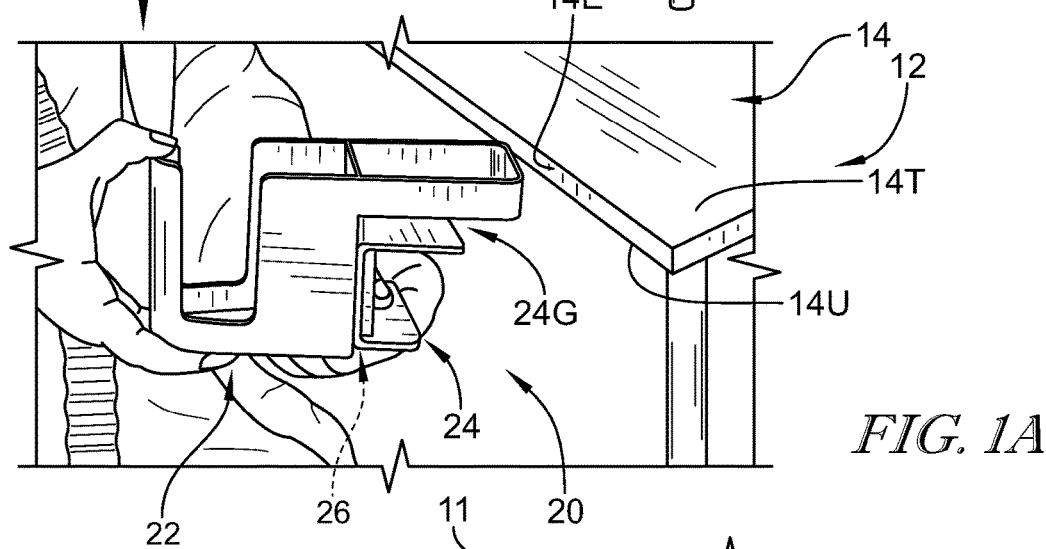
FIG. 1A is a detail view of FIG. 1 showing the user applying an opening force to the clamp controller of the desk accessory to cause a clamp of the desk accessory to open so that the desk accessory may be coupled to the edge of the tabletop.
Figure 1B:
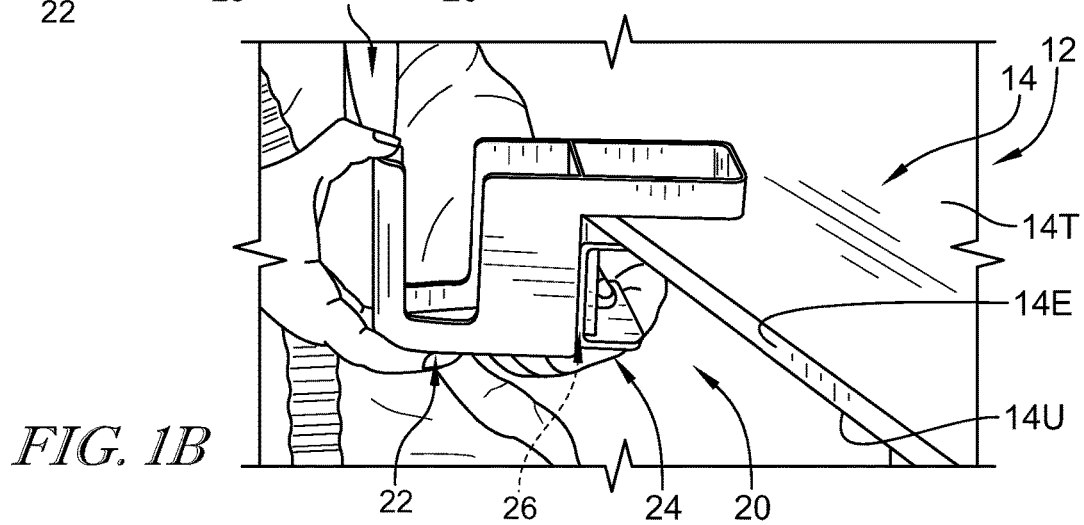
FIG. 1B is a view similar to FIG. 1A showing the user has moved the desk accessory over the edge of the table to couple the desk accessory to the desk so that the desk accessory is fixed relative to the desk.

The clamp force $F_C$ applied by the clamp 24 on the tabletop 14 fixes the desk accessory 20 relative to the tabletop 14 so that a user 11 may use the desk accessory 20 to support office supplies and/or other objects relative to the desk 12. If the desk 12 is a convertible sit to stand desk 12, the clamp force $F_C$ applied by the clamp 24 on the tabletop 14 fixes the desk accessory 20 relative to the tabletop 14 so that the desk accessory 20 moves therewith without any office supplies falling off the desk 12. The desk accessory 20 also provides additional office organization without taking up additional space on the tabletop 14 of the desk 12. The clamp controller 26 also allows the user 11 to easily change where the desk accessory 20 is coupled to the desk 12 and personalize his or her office space as shown in FIGS. 1A and 1B.

The clamp controller 26 includes at least one spring 36 as shown in FIGS. 5-8. The spring 36 is arranged to extend between and interconnect the frame 22 and the lower clamp arm 32 of the clamp 24. The spring 36 is configured to provide a closing force to the lower clamp arm 32 to urge the lower clamp arm 32 toward the closed position to cause the clamp 24 to apply the clamp force $F_C$ on the tabletop 14. In the illustrative embodiment, the closing force is equal to the clamp force $F_C$.

To begin coupling the desk accessory 20 to the tabletop 14 of the desk 12, the user 11 applies an opening force $F_O$ as shown in FIGS. 5 and 6. The opening force $F_O$ needs to be greater than the clamp force $F_C$, i.e. the closing force applied by the spring 36 to cause the lower clamp arm 32 to move from the closed position as shown in FIG. 5 to the open position as shown in FIG. 6.

The user 11 can adjust the size of the gap 24G between the upper and lower clamp arms 30, 32 depending on a thickness 15 of the tabletop 14 by increasing the amount of work applied to the lower clamp arm 32. This will change how far the lower clamp arm 32 is translated along the axis 24A, which will affect the size of the gap 24G. In this way, the desk accessory 20 may be coupled to different desks 12 all having different tabletop thicknesses 15. In the illustrative embodiment, the user applies the opening force $F_O$ to the lower clamp arm 32 to the gap 24G to be greater than the thickness 15 of the tabletop 14 as shown in FIG. 7.

Figure 7:
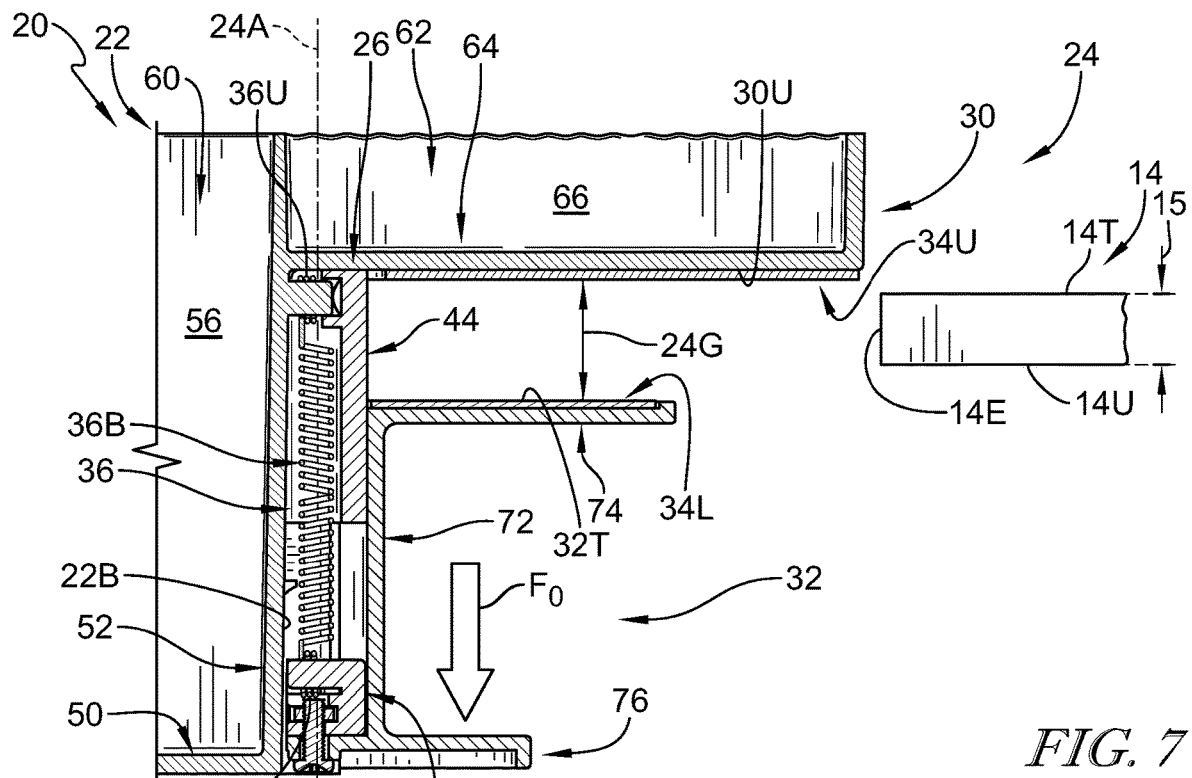
FIG. 7 is cross-section view similar to FIG. 6 showing the lower clamp arm still in the open position and the edge of the tabletop being inserted into the gap between the upper and lower clamp arms of the clamp.

While applying the opening force $F_O$, the user 11 aligns the gap 24G formed between the upper and lower clamp arms 30, 32 with the edge 14E of the tabletop 14 as shown in FIG. 7. The user 11 then moves the desk accessory 20 toward the tabletop 14 so that the edge 14E of the tabletop 14 is inserted into the gap 24G as shown in FIG. 8.

Figure 8:
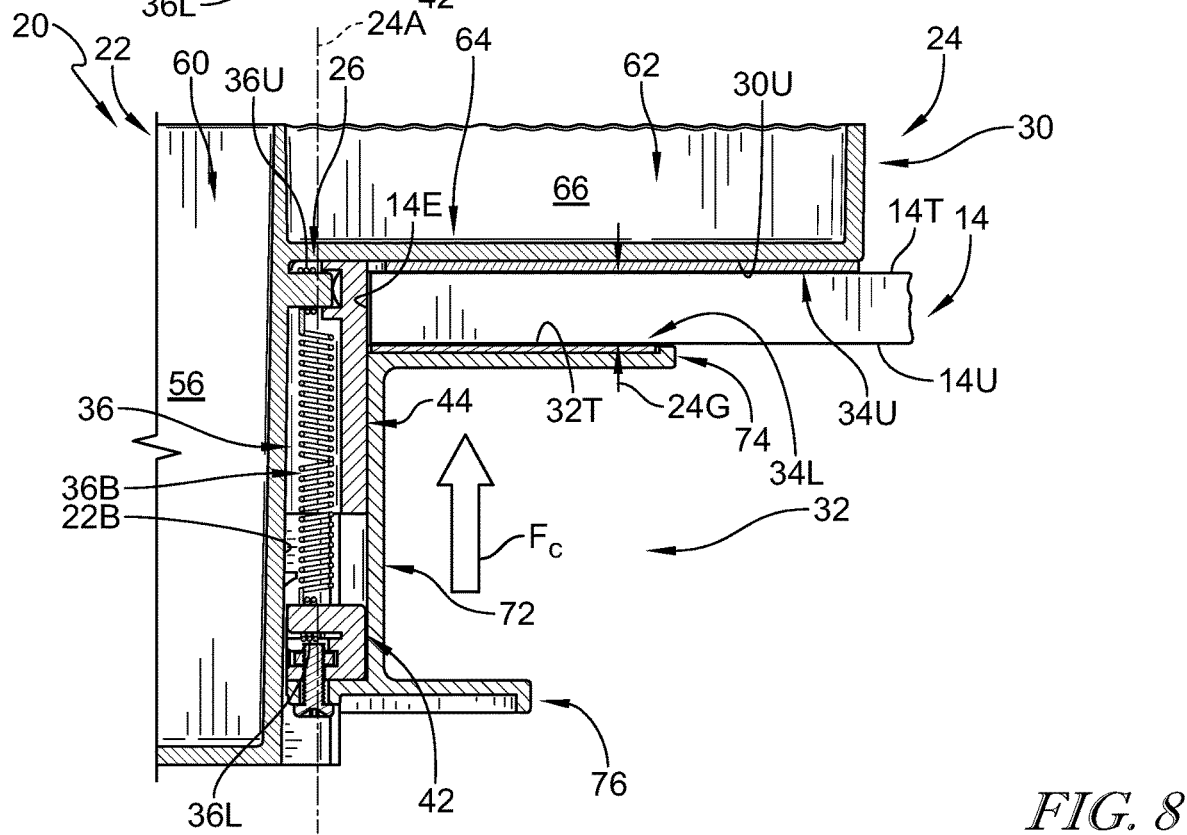
FIG. 8 is a cross-section view similar to FIG. 7 showing the user has released the lower clamp arm so that the clamp controller biases the lower clamp arm toward the closed position to cause the clamp to apply the clamp force on the tabletop.

With the tabletop 14 located in the gap 24G, the user 11 may then stop applying the opening force $F_O$ to cause the spring 36 to apply the clamp force $F_C$ as shown in FIG. 8. This causes the lower clamp arm 32 to move toward the closed position and engage the underside surface 14U of the tabletop 14. At this point, the gap 24G is equal to the thickness 15 of the tabletop 14.

To adjust the location of the desk accessory 20 on the desk 12, the user 11 need only reapply the opening force $F_O$ to cause the lower clamp arm 32 to move and increase the gap 24G between the upper and lower clamp arms 30, 32. The gap 24G only needs to increase enough so that the upper and lower clamp arms 30, 32 no longer engage with the tabletop 14 of the desk. In this way, the user 11 may move the desk accessory 20 to a different location on the desk 12 or attach the desk accessory 20 to another desk 12.

In the illustrative embodiment, the clamp 22 further includes an upper grip 34U coupled to the upper clamp arm 30 and a lower grip 34L coupled to the lower clamp arm 32 as shown in FIGS. 2 and 5-8. The upper grip 34U faces the lower clamp arm 32 is configured to engage the topside surface 14T of the tabletop 14. The lower grip 34L faces the upper grip arm 30 and is configured to engage the underside surface 14U of the tabletop 14. The upper and lower grips 34U, 34L engage the surfaces 14T, 14U of the tabletop 14 to minimize sliding of the desk accessory 20 relative to the desk 12 when the edge 14E of the tabletop 14 is located in the gap 24G and the lower clamp arm 32 is in the closed position.

Figure 9:
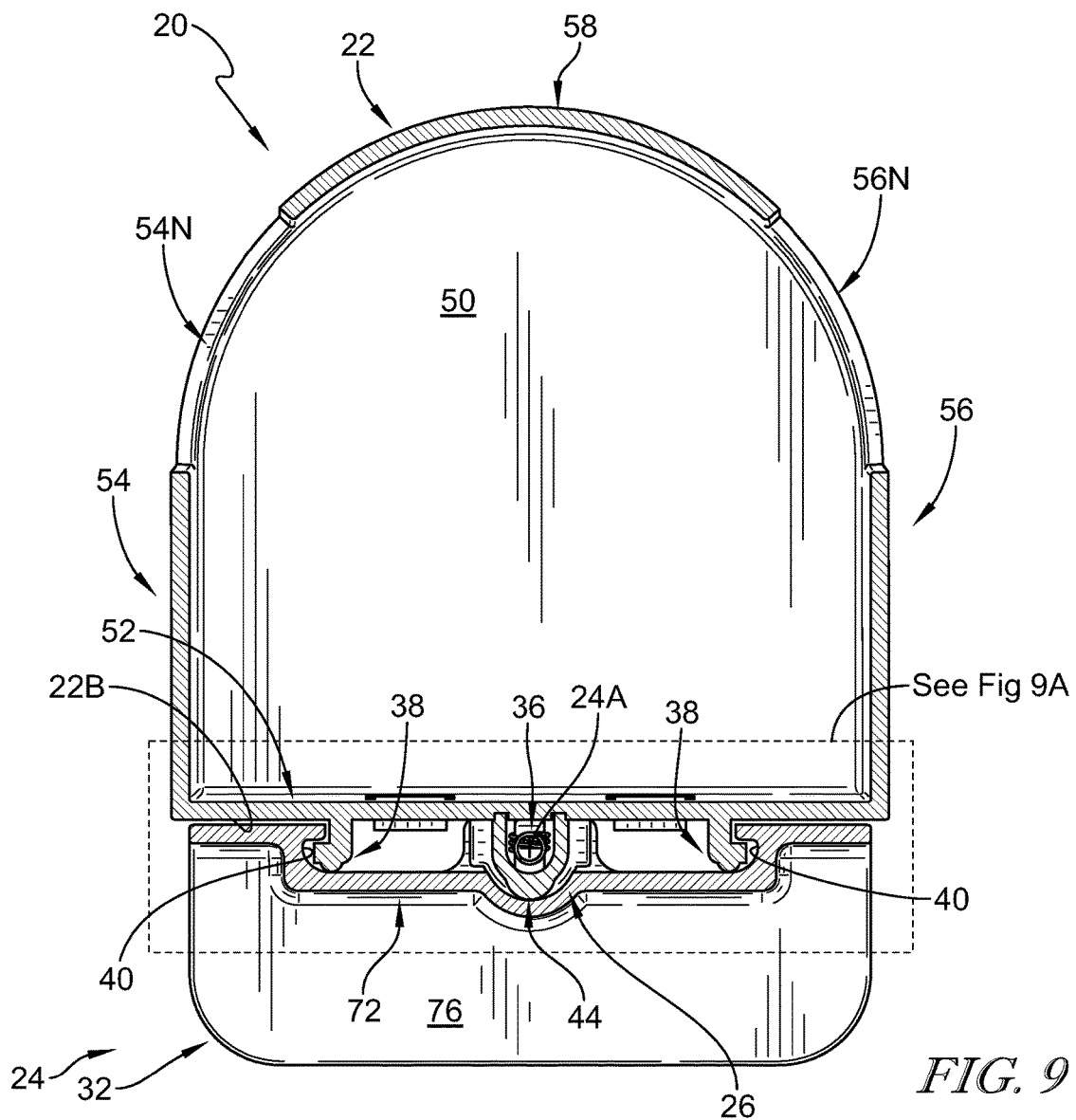
FIG. 9 is a cross-section view of the desk accessory of FIG. 3 taken along line 9-9 showing the guide plate of the lower clamp arm includes guide channels that receive guide rails formed on the backside surface of the frame so as to couple the lower clamp arm to the frame and to help guide movement of the lower clamp arm as the lower clamp arm slides between the closed position and the open position.
Figure 9A:
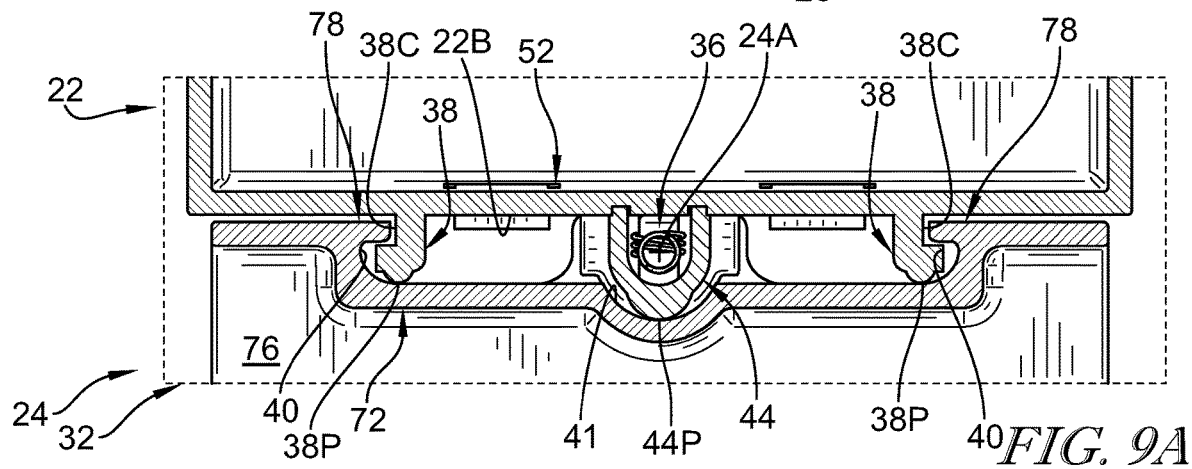
FIG. 9A is a detail view of FIG. 9 showing each of the guide rails include a protrusion that extends away from the guide rail and engages the lower clamp arm to position the lower clamp arm at a predetermined distance from the frame so that the guide rails do not directly engage with lower clamp arm in the guide channels.

The clamp controller 26 further includes guide rails 38 and guide channels 40 as shown in FIGS. 9 and 9A. The guide rails 38 each extend along a backside surface 22B of the frame 22 that faces the lower clamp arm 32. The guide channels 40 are formed in the lower clamp arm 32. Each of the guide rails 38 are located in one of the guide channels 40 to couple the lower clamp arm 32 to the frame 22. The guide rails 38 are configured to guide movement of the lower clamp arm 32 as the lower clamp arm 32 slides between the closed position and the open position.

In the illustrative embodiment, each guide rail 38 has an L-shape or J-shape when viewed along the axis 24A as shown in FIGS. 9 and 9A. The shape of the guide rail 38 forms another channel 38C that extends along the guide rail 38 relative to the axis 24A. The channel 38 is formed to receive a portion of the lower clamp arm 32 to slidably couple the lower clamp arm 32 to the frame 22 as shown in FIGS. 9 and 9A.

Each guide rail 38 is formed to include a protrusion 38P that extends away from the guide rail 38 and engages the lower clamp arm 32 as shown in FIG. 9A. The protrusions 38P engage the lower clamp arm 32 to position the lower clamp arm 32 at a predetermined distance from the frame 22 so that the guide rails 38 do not directly engage with lower clamp arm 32 in the guide channels 40 as shown in FIGS. 9 and 9A.

Instead, the protrusions 38P engage the lower clamp arm 32 to reduce the contact area between the frame 22 and the lower clamp arm 32. This reduces the friction between the frame 22 and the lower clamp arm 32 as the lower clamp arm 32 slides between the closed and open positions and allows the lower clamp arm 32 to more easily slide relative to the frame 22.

In the illustrative embodiment, the clamp controller 26 further includes a spring mount 42 and a spring cover 44 as shown in FIGS. 2 and 5-9A. The spring mount 42 is coupled to the lower clamp arm 32 in spaced apart relation to the upper clamp arm 30. The spring cover 44 is coupled to the frame 22 over the spring 36 to protect the spring 36 as the lower clamp arm 32 moves from the closed position to the open position.

The spring 36 has an upper end 36U coupled to the frame near the upper support arm 32, a lower end 36L coupled to the spring mount 42 on the lower clamp arm 30, and a body 36B that extends between the upper and lower ends 36U, 36L as shown in FIGS. 2 and 5-8. The spring cover 44 extends over the upper end 36U of the spring 36 and couples to the frame 22 to block removal of the spring 36 from the frame 22.

The spring cover 44 also extends around the body 36B of the spring 36 to shield the body 36B of the spring 36 when the lower clamp arm 32 is in the open position as shown in FIGS. 6-8. When the lower clamp arm 32 is in the open position, the spring cover 44 is exposed in the gap 24G instead of the spring 36. Then, when the tabletop 14 is inserted, the edge 14E engages the spring cover 44 instead of contacting the spring 36.

The spring cover 44 is also formed to include a protrusion 44P that engages the lower clamp arm 32 in a groove 41 as shown in FIG. 9A. Like the protrusions 38P on the guide rails 38, the protrusion 44P on the spring cover 44 engages the lower clamp arm 32 to help position the lower clamp arm 32 at the predetermined distance from the frame 22. Instead, the protrusion 44P also helps reduce the contact area between the frame 22 and the lower clamp arm 32, thereby reducing the friction between the frame 22 and the lower clamp arm 32 as the lower clamp arm 32 slides between the closed and open positions.

Turning again to the frame 22, the frame 22 is shaped to include a bottom wall 50 and sidewalls 52, 54, 56, 58 as shown in FIGS. 2-9. The bottom wall 50 and the sidewalls 52, 54, 56, 58 cooperate to define at least one compartment space 60.

In the illustrative embodiment, the compartment space 60 is shaped and sized to receive a cup or a mug. Each of the sidewalls 54, 56 include notches 54N, 56N as shown in FIG. 9. Each of the notches 54N, 56N are sized to receive a handle on a cup or a mug so that the cup or the mug fits into the compartment space 60.

The guide rails 38 extend from a back wall 52 of the frame 22 as shown in FIGS. 4, 9, and 9A. The back wall 52 defines the backside surface 22B of the frame 22.

In the illustrative embodiment, the upper clamp arm 30 is integrally formed with the frame 22 to form a single-piece component as shown in FIGS. 2-9. The upper clamp arm 30 is shaped to include a bottom panel 64 and edge walls 66, 68, 70 that extend from the bottom panel 64. The edge walls 66, 68 are flush with the sidewalls 54, 56 of the frame 22. The bottom panel 64, the edge walls 66, 68, 70, and the back wall 52 of the frame 22 cooperate to define another compartment space 62 as shown in FIGS. 2-8.

Figure 2:
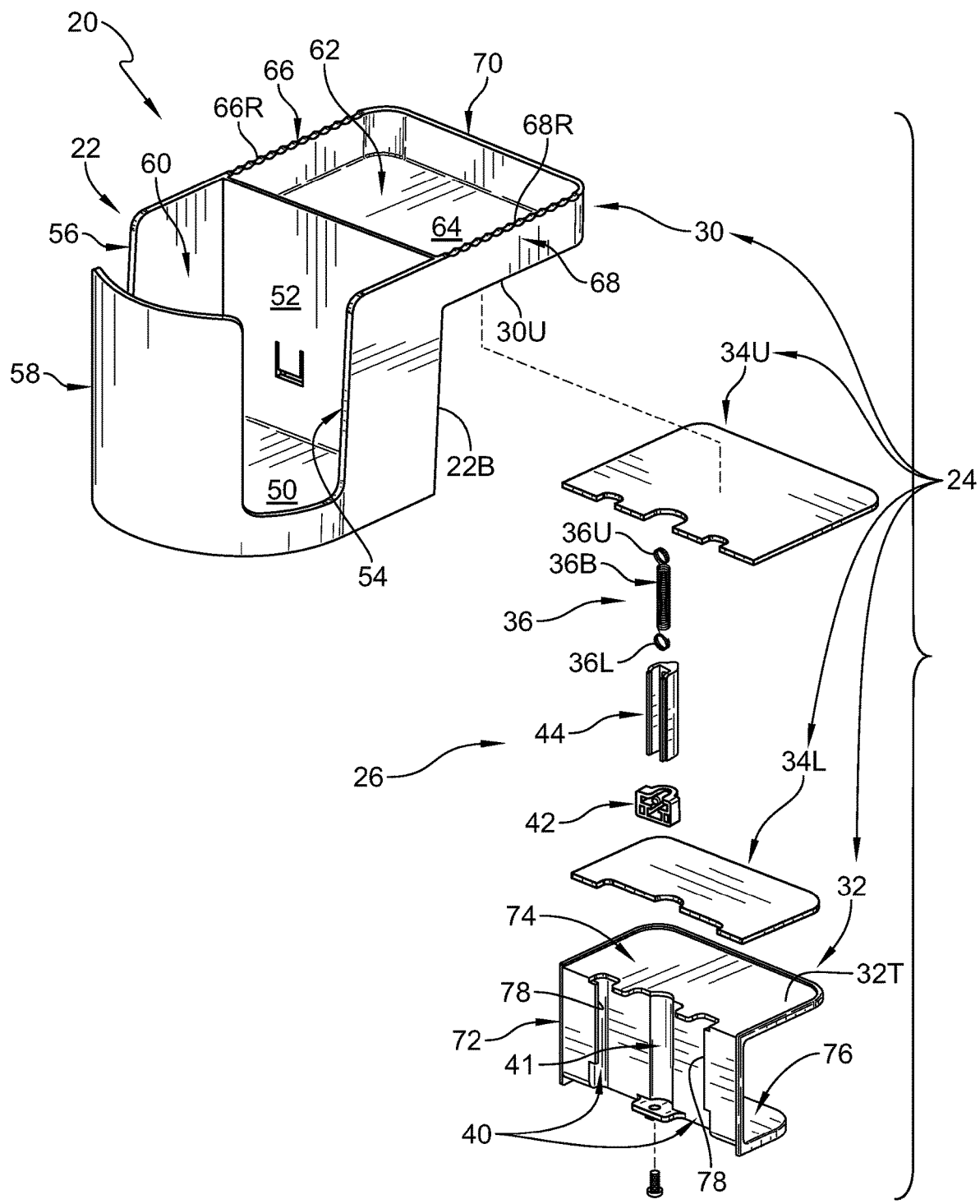
FIG. 2 is an exploded view of the desk accessory of FIG. 1 showing the desk accessory includes a frame adapted to support office supplies and/or other objects relative to a tabletop of a desk located above an underlying floor, the clamp configured to be coupled to the frame and including an upper clamp arm and a lower clamp arm configured to slide relative to the frame along an axis between a closed position as shown in FIG. 5 and an open position as shown in FIG. 6, and the clamp controller configured to bias the lower clamp arm toward the closed position to cause the clamp to apply the clamp force on the tabletop when the edge of the tabletop is located in a gap between upper and lower clamp arms of the clamp so that the desk accessory is fixed relative to the tabletop.

The edge walls 66, 68 are formed to include ridges 66R, 68R as shown in FIGS. 2-4. Each of the ridges 66R, 68R are configured to receive a pen or a pencil that a user may place on the upper clamp arm 32 to extend across the edge walls 66, 68. Each ridge 66R, 68R engages the pen or the pencil to block the pen or the pencil form rolling relative to the desk accessory 20.

In the illustrative embodiment, the bottom panel 64 of the upper clamp arm 30 forms the upper clamp head 64 that is configured to engage the topside surface 14T of the tabletop 14. The upper grip 34U is coupled to a underside surface 30U of the upper clamp arm 30. The lower grip 34L is coupled to a topside surface 32T of the lower clamp arm 32.

The lower clamp arm 32 includes a guide plate 72, a lower clamp head 74, and a clamp handle 76 as shown in FIGS. 4-8. The guide plate 72 extends axially relative to the axis 24A along the backside surface 22B of the frame 22. The guide plate 72 is extends parallel to the back wall 52 of the frame 22. The lower clamp head 74 extends from a first end of the guide plate 72 away from the frame 22. The lower clamp head 74 is parallel to the upper clamp arm 30. The clamp handle 76 extends from a second end of the guide plate 72 away from the frame 22. The second end of the guide plate 72 is spaced apart axially from the first end of the guide plate 72. The clamp handle 76 is configured to be engaged by the user 11 to apply the opening force $F_O$ to the lower clamp arm 32 as shown in FIGS. 5 and 6.

In the illustrative embodiment, the guide channels 40 are formed in the guide plate 72 of the lower clamp arm 32 as shown in FIG. 9A. The guide channels 40 form a track 78 that extends into the channel 38C of the guide rail 38. In this way, the lower clamp plate 32 and the frame 22 interlock to couple the lower clamp arm 32 to the frame 22, while still allowing the lower clamp arm 32 about the slide relative to the frame 22.

The guide plate 72 of the lower clamp arm 32 is also shaped to define the groove 41 as shown in FIG. 9A. The groove 41 extends along the guide plate 72 relative to the axis 24A. The protrusion 44P on the spring cover 44 extends into and engages the guide plate 72 of the lower clamp arm 32.

Another embodiment of a desk accessory 220 in accordance with the present disclosure is shown in FIGS. 10-12. The desk accessory 220 is substantially similar to the desk accessory 20 shown in FIGS. 1-9A and described herein. Accordingly, similar reference numbers in the 200 series indicate features that are common between the desk accessory 20 and the desk accessory 220. The description of the desk accessory 20 is incorporated by reference to apply to the desk accessory 220, except in instances when it conflicts with the specific description and the drawings of the desk accessory 220.

The desk accessory 220 includes a frame 222, a clamp 224, and a clamp controller 226 as shown in FIGS. 10-12. The frame 222 is shaped to define at least one compartment space 260 adapted to receive the at least one object so as to support at least one object relative to the tabletop 14 of the desk 12. The clamp 224 includes a stationary upper clamp arm 230 that extends from the frame 222 and a lower clamp arm 232 slidably coupled to the frame 222 below the stationary upper clamp arm 230 to change between the open and closed positions to couple the desk accessory 220 with the desk 12. The clamp controller 226 is configured to control movement of the clamp 224 between the open and closed positions to be able to selectively couple the desk accessory 220 to the desk 12.

In the illustrative embodiment, the frame 222 has a different shape than the frame 22 of the desk accessory 20 in the embodiment of FIGS. 1-9A. The frame 222 is larger in that the frame 222 is shaped to include multiple compartment spaces 260, 261 as shown in FIGS. 10 and 12. The frame 222 includes a bottom wall 250, a plurality of sidewalls 252, 254, 256, 258, and a partition wall 259 that cooperate to define the compartment spaces 260, 261.

Since the frame 222 of the desk accessory 220 is larger, the clamp force $F_C$ on the tabletop 14 may need to be greater to support extra weight of not only the frame 222, but the objects therein. Therefore, the clamp controller 226 includes two springs 236, 237 as shown in FIG. 12.

Both springs 236, 237 are arranged to extend between and interconnect the frame 222 and the lower clamp arm 232 of the clamp 224. The springs 236 are configured to provide the clamp force $F_C$ to the lower clamp arm 232 to urge the lower clamp arm 232 toward the closed position to cause the clamp 224 to apply the clamp force $F_C$ on the tabletop 14.

The clamp controller 226 further includes guide rails 238 and guide channels 240 as shown in FIGS. 11 and 12. The guide rails 238 each extend along a backside surface 222B of the frame 222 that faces the lower clamp arm 232. The guide channels 240 are formed in the lower clamp arm 232. Each of the guide rails 238 are located in one of the guide channels 240 to couple the lower clamp arm 232 to the frame 222. The guide rails 238 guide movement of the lower clamp arm 232 as the lower clamp arm 232 slides between the closed position and the open position.

In the illustrative embodiment, the frame 222 is formed to include support rails 239 that extend away from the frame toward the lower clamp arm 232. The support rails 239 extend axially along the backside surface 222B of the frame 222 relative to the axis 24A. In the illustrative embodiment, the support rails 239 are arranged between the two guide rails 238 as shown in FIG. 11.

The lower clamp arm 232 is formed to include grooves 241 as shown in FIG. 12. The grooves 241 are configured to receive the support rails 239 such that the support rails 239 engage the lower clamp arm 232 in the corresponding groove 241. The support rails 239 engage the lower clamp arm 232 to position the lower clamp arm 232 at a predetermined distance from the frame 222 so that the guide rails 238 do not directly engage with lower clamp arm 232 in the guide channels 240. In the illustrative embodiment, the guide rails 238 do not include protrusions like the guide rails 38 in the embodiment of FIGS. 1-9A.

Instead, the support rails 239 engage the lower clamp arm 232 to reduce the contact area between the frame 222 and the lower clamp arm 232. This reduces the friction between the frame 222 and the lower clamp arm 232 as the lower clamp arm 232 slides between the closed and open positions and allows the lower clamp arm 232 to more easily slide relative to the frame 222.

In the illustrative embodiment, the clamp controller 226 further includes spring mounts 242, 243 and spring covers 244, 245 for each of the springs 236, 237 as shown in FIG. 12. Each spring mount 242, 243 is coupled to the lower clamp arm 232 in spaced apart relation to the upper clamp arm 230. Each spring cover 244, 245 is coupled to the frame 222 over the corresponding spring 236 to protect the spring 236 as the lower clamp arm 232 moves from the closed position to the open position.

Turning again to the clamp 224, the clamp 224 includes the upper clamp arm 230, the lower clamp arm 232, a upper grip 234U configured to be coupled to the upper clamp arm 230, and a lower grip 234L configured to be coupled to the lower clamp arm 232 as shown in FIGS. 10-12. The upper grip 234U faces the lower clamp arm 232 is configured to engage the topside surface 14T of the tabletop 14. The lower grip 234L faces the upper clamp arm 230 and is configured to engage the underside surface 14U of the tabletop 14.

In the illustrative embodiment, the upper clamp arm 230 is integrally formed with the frame 222 to form a single-piece component. The upper clamp arm 230 is shaped to include a bottom panel 264 and edge walls 266, 268, 270 that extend from the bottom panel 264. The bottom panel 264, the edge walls 266, 268, 270, and the back wall 252 of the frame 222 cooperate to define another compartment space 262 as shown in FIGS. 10 and 12. In the illustrative embodiment, the edge walls 266, 268 include notches 266N, 268N that are configured to receive electrical cords so that the cords remain organized on the desk 12.

The lower clamp arm 232 includes a guide plate 272, a lower clamp head 274, and a clamp handle 276 as shown in FIGS. 11 and 12. The guide plate 272 extends axially relative to the axis 24A along the backside surface 222B of the frame 222. The guide plate 272 is extends parallel to the back wall 252 of the frame 222. The lower clamp head 274 extends from a first end of the guide plate 272 away from the frame 222. The lower clamp head 274 is parallel to the upper clamp arm 230. The clamp handle 276 extends from a second end of the guide plate 272 away from the frame 222 spaced apart axially from the first end of the guide plate 272. The clamp handle 276 is configured to be engaged by the user 11 to apply the opening force $F_O$ to the lower clamp arm 232.

In the illustrative embodiment, the guide channels 240 and the grooves 241 are formed in the guide plate 272 of the lower clamp arm 232 as shown in FIG. 12.

Another embodiment of a desk accessory 320 in accordance with the present disclosure is shown in FIGS. 13-15. The desk accessory 320 is substantially similar to the desk accessory 20 shown in FIGS. 1-9A and described herein. Accordingly, similar reference numbers in the 300 series indicate features that are common between the desk accessory 20 and the desk accessory 320. The description of the desk accessory 20 is incorporated by reference to apply to the desk accessory 320, except in instances when it conflicts with the specific description and the drawings of the desk accessory 320.

The desk accessory 320 includes a frame 322, a clamp 324, and a clamp controller 326 as shown in FIGS. 13-15. The frame 322 is shaped to define at least one compartment space 360 adapted to receive the at least one object so as to support at least one object relative to the tabletop 14 of the desk 12. The clamp 324 includes a stationary upper clamp arm 330 that extends from the frame 322 and a lower clamp arm 332 slidably coupled to the frame 322 below the stationary upper clamp arm 330 to change between the open and closed positions to couple the desk accessory 320 with the desk 12. The clamp controller 326 is configured to control movement of the clamp 324 between the open and closed positions to be able to selectively couple the desk accessory 320 to the desk 12.

In the illustrative embodiment, the frame 322 has a circular shape as shown in FIGS. 13-15. The frame 322 includes a bottom wall 350, a back wall 352, and a curved outer wall 358 as shown in FIGS. 13 and 15. The bottom wall 350, back wall 252, and curved wall 358 cooperate to define a compartment space 360.

In the illustrative embodiment, the compartment space 360 is a sized to receive a mobile device or a smart phone. The curved outer wall 358 includes notches 358N that are configured to receive electrical cords.

The clamp 324 includes the upper clamp arm 330, the lower clamp arm 332, a upper grip 334U configured to be coupled to the upper clamp arm 330, and a lower grip 334L configured to be coupled to the lower clamp arm 332 as shown in FIGS. 13-15. The upper grip 334U faces the lower clamp arm 332 is configured to engage the topside surface 14T of the tabletop 14. The lower grip 334L faces the upper grip arm 330 and is configured to engage the underside surface 14U of the tabletop 14.

In the illustrative embodiment, the upper clamp arm 330 is integrally formed with the frame 322 to form a single-piece component. The upper clamp arm 330 also has a circular shape including a bottom panel 364 and a circular edge wall 370 that extends from the bottom panel 364. The bottom panel 364, the edge wall 370, and the back wall 352 of the frame 322 cooperate to define another compartment space 362 as shown in FIGS. 13 and 15.

The lower clamp arm 332 includes a guide plate 372, a lower clamp head 374, and a clamp handle 376 as shown in FIGS. 11 and 12. The guide plate 372 extends axially relative to the axis 24A along the backside surface 322B of the frame 322. The guide plate 372 is extends parallel to the back wall 352 of the frame 322. The lower clamp head 374 extends from a first end of the guide plate 372 away from the frame 322. The lower clamp head 374 is parallel to the upper clamp arm 330. The clamp handle 376 extends from a second end of the guide plate 372 away from the frame 322 spaced apart axially from the first end of the guide plate 372. The clamp handle 376 is configured to be engaged by the user 11 to apply the opening force $F_O$ to the lower clamp arm 332.

The clamp head 374 has the same circular contour as the upper clamp arm 330 as shown in FIGS. 14 and 15. The outer edge of the clamp head 374 follows the same shape as the edge wall 370 of the upper clamp arm 330. In the illustrative embodiment, the clamp head 374 has the same surface area as the bottom panel 364 of the upper clamp arm 330.

The clamp controller 326 includes a spring 336, guide rails 338, guide channels 340, a spring mount 342, and a spring cover 344 as shown in FIG. 15. The spring 336 is arranged to extend between and interconnect the frame 322 and the lower clamp arm 332 of the clamp 324. The spring 336 is configured to provide the clamp force $F_C$ to the lower clamp arm 332 to urge the lower clamp arm 332 toward the closed position to cause the clamp 324 to apply the clamp force $F_C$ on the tabletop 14.

The guide rails 338 each extend along a backside surface 322B of the frame 322 that faces the lower clamp arm 332. The guide channels 340 are formed in the guide plate 372 of the lower clamp arm 332. Each of the guide rails 338 are located in one of the guide channels 340 to couple the lower clamp arm 332 to the frame 322. The guide rails 338 guide movement of the lower clamp arm 332 as the lower clamp arm 332 slides between the closed position and the open position.

Another embodiment of a desk accessory 420 in accordance with the present disclosure is shown in FIGS. 16-18. The desk accessory 420 is substantially similar to the desk accessory 20 shown in FIGS. 1-9A and described herein. Accordingly, similar reference numbers in the 400 series indicate features that are common between the desk accessory 20 and the desk accessory 420. The description of the desk accessory 20 is incorporated by reference to apply to the desk accessory 420, except in instances when it conflicts with the specific description and the drawings of the desk accessory 420.

The desk accessory 420 includes a frame 422, a clamp 424, and a clamp controller 426 as shown in FIGS. 16-18. The frame 422 is shaped to define a plurality of compartment spaces 460, 461 adapted to receive the at least one object so as to support at least one object relative to the tabletop 14 of the desk 12. The clamp 424 includes a stationary upper clamp arm 430 that extends from the frame 422 and a lower clamp arm 432 slidably coupled to the frame 422 below the stationary upper clamp arm 430 to change between the open and closed positions to couple the desk accessory 420 with the desk 12. The clamp controller 426 is configured to control movement of the clamp 424 between the open and closed positions to be able to selectively couple the desk accessory 420 to the desk 12.

In the illustrative embodiment, the frame 422 forms file hooks 458, 459 as shown in FIGS. 16-18. The frame 422 includes a bottom walls 450, 451, a back wall 452, a front wall 458, and a divider wall 459 as shown in FIGS. 16-18. The walls 450, 451, 452, 458, 459 cooperate to define compartment spaces 460, 461.

The clamp 424 includes the upper clamp arm 430, the lower clamp arm 432, a upper grip 434U configured to be coupled to the upper clamp arm 430, and a lower grip 434L configured to be coupled to the lower clamp arm 432 as shown in FIGS. 16-18. The upper grip 434U faces the lower clamp arm 432 is configured to engage the topside surface 14T of the tabletop 14. The lower grip 434L faces the upper grip arm 430 and is configured to engage the underside surface 14U of the tabletop 14.

In the illustrative embodiment, the upper clamp arm 430 is integrally formed with the frame 422 to form a single-piece component. The upper clamp arm 430 also has a circular shape including a bottom panel 464 and a circular edge wall 470 that extends from the bottom panel 464. The bottom panel 464, the edge wall 470, and the back wall 452 of the frame 422 cooperate to define another compartment space 462 as shown in FIGS. 16-18. In the illustrative embodiment, the outer edge wall 470 includes notches 470N that are configured to receive electrical cords.

The lower clamp arm 432 includes a guide plate 472, a lower clamp head 474, and a clamp handle 476 as shown in FIGS. 17 and 18. The guide plate 472 extends axially relative to the axis 24A along the backside surface 422B of the frame 422. The guide plate 472 is extends parallel to the back wall 452 of the frame 422. The lower clamp head 474 extends from a first end of the guide plate 472 away from the frame 422. The lower clamp head 474 is parallel to the upper clamp arm 430. The clamp handle 476 extends from a second end of the guide plate 472 away from the frame 422 spaced apart axially from the first end of the guide plate 472. The clamp handle 476 is configured to be engaged by the user 11 to apply the opening force $F_O$ to the lower clamp arm 432.

The clamp controller 426 includes a springs 436, 437, guide rails 438, guide channels 440, spring mount 442, 443, and spring covers 444, 445 as shown in FIG. 18. The springs 436, 437 are arranged to extend between and interconnect the frame 422 and the lower clamp arm 432 of the clamp 424. The springs 436, 437 are configured to provide the clamp force $F_C$ to the lower clamp arm 432 to urge the lower clamp arm 432 toward the closed position to cause the clamp 424 to apply the clamp force $F_C$ on the tabletop 14.

The guide rails 438 each extend along a backside surface 422B of the frame 422 that faces the lower clamp arm 432. The guide channels 440 are formed in the guide plate 472 of the lower clamp arm 432. Each of the guide rails 438 are located in one of the guide channels 440 to couple the lower clamp arm 432 to the frame 422. The guide rails 438 guide movement of the lower clamp arm 432 as the lower clamp arm 432 slides between the closed position and the open position.

Another embodiment of a desk accessory 520 in accordance with the present disclosure is shown in FIGS. 19 and 20. The desk accessory 520 is substantially similar to the desk accessory 20 shown in FIGS. 1-9A and described herein. Accordingly, similar reference numbers in the 500 series indicate features that are common between the desk accessory 20 and the desk accessory 520. The description of the desk accessory 20 is incorporated by reference to apply to the desk accessory 520, except in instances when it conflicts with the specific description and the drawings of the desk accessory 520.

The desk accessory 520 includes a frame 522, a clamps 524A, 525B, and clamp controllers 526A, 526B as shown in FIGS. 19 and 20. The frame 522 is shaped to define a compartment spaces 560 adapted to receive the at least one object so as to support at least one object relative to the tabletop 14 of the desk 12. The clamps 524A, 524B each include a stationary upper clamp arm 530 that extends from the frame 522 and a lower clamp arm 532 slidably coupled to the frame 522 below the stationary upper clamp arm 530 to change between the open and closed positions to couple the desk accessory 520 with the desk 12. The clamp controllers 526A, 526B are configured to control movement of the clamps 524A, 524B between the open and closed positions to be able to selectively couple the desk accessory 520 to the desk 12.

In the illustrative embodiment, the frame 522 forms includes a bottom wall 550, a back wall 552, and a front wall 558 as shown in FIGS. 19 and 20. The bottom wall 550, back wall 252, and curved wall 558 cooperate to define the compartment space 560. In the illustrative embodiment, the back wall 552 forms a divider between adjacent desks 12.

Each clamp 524A, 524B includes the upper clamp arm 530 and the lower clamp arm 532 as shown in FIGS. 19 and 20. In the illustrative embodiment, the upper clamp arm 530 coupled to the frame 222.

In the illustrative embodiment, the clamp controllers 526A, 526B are set screws configured to be manually changed by the user 11 to move the lower clamp arm 532 between the closed and open positions. To adjust the position of the lower clamp arm 532, the user screws the clamp controllers 526A, 526B in a first direction to cause the lower clamp arm 532 to move to the open position. To close the clamps 224A, 224B, the user 11 screws the clamp controllers 526A, 526B in an opposite second direction to cause the lower clamp arm 532 to move to the closed position.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A desk accessory comprising
a frame adapted to support at least one object relative to a tabletop of a desk located above an underlying floor, the frame shaped to define at least one compartment space adapted to receive the at least one object,
a clamp including a stationary upper clamp arm that extends from the frame and a lower clamp arm slidably coupled to the frame below the stationary upper clamp arm, the upper clamp arm configured to be arranged over a topside surface of the tabletop so that the frame is located adjacent to an edge of the tabletop, and the lower clamp arm configured to slide relative to the frame along an axis between a closed position in which the lower clamp arm confronts the upper clamp arm and an open position in which the lower clamp arm is in spaced apart relation to the upper clamp arm to define a gap therebetween, and
clamp controller means for biasing the lower clamp arm toward the closed position to cause the clamp to apply a clamp force on the tabletop when the edge of the tabletop is located in the gap between the upper and lower clamp arms so that the desk accessory is fixed relative to the tabletop,
wherein the clamp controller means includes at least one spring force element arranged to extend between and interconnect the frame and the lower clamp arm and configured to provide a closing force to the lower clamp arm to urge the lower clamp arm toward the closed position to cause the clamp to apply the clamp force on the tabletop,
wherein the lower clamp arm includes a guide plate that extends axially relative to the axis along a backside surface of the frame that faces the lower clamp arm, a lower clamp head that extends from a first end of the guide plate away from the frame parallel to the upper clamp arm, and a clamp handle that extends from a second end of the guide plate away from the frame, and the second end of the guide plate spaced apart axially from the first end of the guide plate, and the clamp handle configured to be engaged by a user to apply an opening force to the lower clamp arm that is greater than the closing force applied by the spring to cause the lower clamp arm to move from the closed position to the open position,
wherein the clamp controller means further includes a pair of guide rails that each extend away from the backside surface of the frame toward the lower clamp arm and axially along the backside surface of the frame and a pair of guide channels formed in the guide plate of the lower clamp arm that extend axially along the guide plate and open toward each other, and wherein each guide rail of the pair of guide rails is located in one guide channel of the pair of guide channel to couple the lower clamp arm to the frame and to guide movement of the lower clamp arm as the lower clamp arm slides between the closed position and the open position.

2. The desk accessory of claim 1, wherein the clamp controller means includes two spring force elements each arranged to extend between and interconnect the frame and the lower clamp arm and configured to provide the closing force to the lower clamp arm to urge the lower clamp arm toward the closed position to cause the clamp to apply the clamp force on the tabletop.

3. The desk accessory of claim 1, wherein the upper clamp arm is integrally formed with the frame to form a single-piece component.

4. The desk accessory of claim 3, wherein the upper clamp arm is shaped to define at least one compartment space adapted to receive at least one object.

5. The desk accessory of claim 1, wherein the clamp includes a lower grip coupled to a topside surface of the lower clamp arm that faces the upper clamp arm, the lower grip configured to engage an underside surface of the tabletop to minimize sliding of the desk accessory relative to the desk when the edge of the tabletop is located in the gap and the lower clamp arm is in the closed position.

6. The desk accessory of claim 5, wherein the clamp further includes an upper grip coupled to an underside surface of the upper clamp arm that faces the lower clamp arm and the upper grip is configured to engage the topside surface of the tabletop to minimize sliding of the desk accessory relative to the desk when the edge of the tabletop is located in the gap.

7. A desk accessory comprising
a frame adapted to support at least one object relative to a tabletop of a desk located above an underlying floor,
a clamp including an upper clamp arm that extends from the frame and a lower clamp arm slidably coupled to the frame below the stationary upper clamp arm and configured to slide relative to the frame along an axis between a closed position in which the lower clamp arm confronts the upper clamp arm and an open position in which the lower clamp arm is in spaced apart relation to the upper clamp arm to define a gap therebetween, and
clamp controller means for biasing the lower clamp arm toward the closed position to cause the clamp to apply a clamp force on the tabletop when the edge of the tabletop is located in the gap between the upper and lower clamp arms,
wherein the upper clamp arm is integrally formed with the frame to form a single-piece component.

8. The desk accessory of claim 7, wherein the clamp controller means includes at least one spring force element arranged to extend between and interconnect the frame and the lower clamp arm and configured to provide a closing force to the lower clamp arm to urge the lower clamp arm toward the closed position to cause the clamp to apply the clamp force on the tabletop.

9. The desk accessory of claim 8, wherein the lower clamp arm includes a guide plate that extends axially relative to the axis along a backside surface of the frame, a lower clamp head that extends from a first end of the guide plate away from the frame parallel to the upper clamp arm, and a clamp handle that extends from a second end of the guide plate away from the frame, and the second end of the guide plate spaced apart axially from the first end of the guide plate, and the clamp handle configured to be engaged by a user to apply an opening force to the lower clamp arm that is greater than the closing force applied by the spring to cause the lower clamp arm to move from the closed position to the open position.

10. The desk accessory of claim 8, wherein the clamp controller means further includes at least one guide rail that extends from a backside surface of the frame that faces the lower clamp arm and at least one guide channel formed in the lower clamp arm, and wherein the at least one guide rail is located in the at least one guide channel to couple the lower clamp arm to the frame and to guide movement of the lower clamp arm as the lower clamp arm slides between the closed position and the open position.

11. The desk accessory of claim 7, wherein the clamp includes a lower grip coupled to a topside surface of the lower clamp arm that faces the upper clamp arm, the lower grip configured to engage an underside surface of the tabletop to minimize sliding of the desk accessory relative to the desk when the edge of the tabletop is located in the gap and the lower clamp arm is in the closed position.

12. The desk accessory of claim 7, wherein the clamp includes an upper grip coupled to an underside surface of the upper clamp arm that faces the lower clamp arm and the upper grip is configured to engage the topside surface of the tabletop to minimize sliding of the desk accessory relative to the desk when the edge of the tabletop is located in the gap.

13. The desk accessory of claim 1, wherein each guide rail of the pair of guide rails has an L-shape when viewed along the axis to form a guide rail channel that extends along each guide rail relative to the axis and receives a portion of the lower clamp arm to couple the lower clamp arm to the frame.

14. The desk accessory of claim 13, wherein each guide rail of the pair of guide rails is formed to include a protrusion that extends away from the corresponding guide rail toward the lower clamp arm and engages the lower clamp arm to position the lower clamp arm at a predetermined distance from the frame so as to reduce the contact area between the frame and the lower clamp arm thereby reducing the friction between the frame and the lower clamp arm as the lower-clamp arm slides between the closed position and the open position.

15. The desk accessory of claim 1, wherein the clamp controller means further includes a spring mount coupled to the lower clamp arm in spaced apart relation to the upper clamp arm and spring cover coupled to the frame over the at least one spring force element so that the at least one spring force element is located between the backside surface of the frame and the spring cover.

16. The desk accessory of claim 15, wherein the spring cover has a protrusion that extends from the spring cover and engages the guide plate of the lower clamp arm to position the lower clamp arm at a predetermined distance from the frame so as to reduce the contact area between the frame and the lower clamp arm thereby reducing the friction between the frame and the lower clamp arm as the lower clamp arm slides between the closed position and the open position.

17. The desk accessory of claim 1, wherein the at least one spring force element has an upper end coupled to the frame near the upper support arm, a lower end coupled to the lower clamp arm, and a body that extends between the upper and lower ends that is between the backside of the frame and the guide plate of the lower clamp arm.

18. A desk accessory comprising
a frame adapted to support at least one object relative to a tabletop of a desk located above an underlying floor,
a clamp including an upper clamp arm that extends from the frame and a lower clamp arm slidably coupled to the frame below the stationary upper clamp arm and configured to slide relative to the frame along an axis between a closed position in which the lower clamp arm confronts the upper clamp arm and an open position to which the lower clamp arm is in spaced apart relation to the upper clamp arm to define a gap therebetween, and
clamp controller means for biasing the lower clamp arm toward the closed position to cause the clamp to apply a clamp force on the tabletop when the edge of the tabletop is located in the gap between the upper and lower clamp arms,
wherein the clamp controller means includes at least one spring force element arranged to extend between and interconnect the frame and the lowerclamp arm, a pair of guide rails that each extend away from a backside surface of the frame toward the lower clamp arm and axially along the backside surface of the frame, and a pair of guide channels formed in the lower clamp arm that extend axially along the lower clamp arm and open toward each other, and wherein each guide rail of the pair of guide rails is located in one guide channel of the pair of guide channel to couple the lower clamp arm to the frame and to guide movement of the lower clamp arm as the lower clamp arm slides between the closed position and the open position.

19. The desk accessory of claim 18, wherein each guide rail of the pair of guide rails has an L-shape when viewed along the axis to form a guide rail channel that extends along each guide rail relative to the axis and receives a portion of the lower clamp arm to couple the lower clamp arm to the frame.

20. The desk accessory of claim 18, wherein each guide rail of the pair of guide rails is formed to include a protrusion that extends away from the corresponding guide rail toward the lower clamp arm and engages the lower clamp arm to position the lower clamp arm at a predetermined distance from the frame so as to reduce the contact area between the frame and the lower clamp arm thereby reducing the friction between the frame and the lower clamp arm as the lower clamp arm slides between the closed position and the open position.

* * * * *